United States Patent
Hehn et al.

(10) Patent No.: US 10,908,619 B2
(45) Date of Patent: *Feb. 2, 2021

(54) DISTRIBUTED LOCALIZATION SYSTEMS AND METHODS AND SELF-LOCALIZING APPARATUS

(71) Applicant: Verity Studios AG, Zurich (CH)

(72) Inventors: Markus Hehn, Zurich (CH); Markus Waibel, Zurich (CH); Raffaello D'Andrea, Wollerau (CH)

(73) Assignee: Verity AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,895

(22) Filed: May 13, 2019

(65) Prior Publication Data
US 2019/0277941 A1 Sep. 12, 2019

Related U.S. Application Data

(63) Continuation of application No. 15/917,544, filed on Mar. 9, 2018, now Pat. No. 10,302,737, which is a (Continued)

(51) Int. Cl.
*G05D 1/10* (2006.01)
*G01S 5/02* (2010.01)
(Continued)

(52) U.S. Cl.
CPC .............. *G05D 1/101* (2013.01); *G01S 1/024* (2013.01); *G01S 1/20* (2013.01); *G01S 5/0289* (2013.01);
(Continued)

(58) Field of Classification Search
CPC ..... H04W 84/18; H04W 4/026; H04W 4/027; H04B 1/7163; G01S 5/0289; G01S 1/20; G01S 1/024; G01S 5/14; G05D 1/101
See application file for complete search history.

(56) References Cited

U.S. PATENT DOCUMENTS 5,548,512 A  8/1996  Quraishi
6,354,946 B1  3/2002  Finn
(Continued)

FOREIGN PATENT DOCUMENTS

EP  1219047 B1  5/2010
EP  1334372 B1  3/2013
(Continued)

OTHER PUBLICATIONS

International Search Report and Written Opinion of the International Searching Authority for application No. PCT/IB2016/051272, dated Aug. 17, 2016.
(Continued)

*Primary Examiner* — Wayne H Cai
(74) *Attorney, Agent, or Firm* — Haley Guiliano LLP

(57) ABSTRACT

A self-localizing apparatus uses timestampable signals transmitted by transceivers that are a part of a distributed localization system to compute its position relative to the transceivers. Transceivers and self-localizing apparatuses are arranged for highly accurate timestamping using digital and analog reception and transmission electronics as well as one or more highly accurate clocks, compensation units, localization units, position calibration units, scheduling units, or synchronization units. Transceivers and self-localizing apparatuses are further arranged to allow full scalability in the number of self-localizing apparatuses and to allow robust self-localization with latencies and update rates useful for high performance applications such as autonomous mobile robot control.

20 Claims, 22 Drawing Sheets

Related U.S. Application Data continuation of application No. 15/173,556, filed on Jun. 3, 2016, now Pat. No. 9,945,929, which is a continuation of application No. 15/063,104, filed on Mar. 7, 2016, now Pat. No. 9,885,773.

(60) Provisional application No. 62/168,704, filed on May 29, 2015, provisional application No. 62/129,773, filed on Mar. 7, 2015.

(51) Int. Cl.
| | | |
|---|---|---|
| *H04W 4/02* | (2018.01) | |
| *H04W 84/18* | (2009.01) | |
| *G01S 1/02* | (2010.01) | |
| *G01S 1/20* | (2006.01) | |
| *G01S 5/14* | (2006.01) | |
| *H04B 1/7163* | (2011.01) | |

(52) U.S. Cl.
CPC .............. *G01S 5/14* (2013.01); *H04B 1/7163* (2013.01); *H04W 4/026* (2013.01); *H04W 4/027* (2013.01); *H04W 84/18* (2013.01)

(56) References Cited

U.S. PATENT DOCUMENTS

| | | |
|---|---|---|
| 6,466,168 B1 | 10/2002 | McEwan |
| 6,501,393 B1 | 12/2002 | Richards et al. |
| 6,585,597 B2 | 7/2003 | Finn |
| 6,661,342 B2 | 12/2003 | Hall et al. |
| 6,750,812 B2 | 6/2004 | Mizugaki et al. |
| 6,763,282 B2 | 7/2004 | Glenn et al. |
| 6,768,944 B2 | 7/2004 | Breed et al. |
| 6,868,314 B1 | 3/2005 | Frink |
| 6,879,878 B2 | 4/2005 | Glenn et al. |
| 6,895,301 B2 | 5/2005 | Mountz |
| 7,023,833 B1 | 4/2006 | Aiello et al. |
| 7,031,294 B2 | 4/2006 | Aiello et al. |
| 7,038,589 B2 | 5/2006 | Schmidt et al. |
| 7,069,111 B2 | 6/2006 | Glenn et al. |
| 7,246,746 B2 | 7/2007 | McNamara et al. |
| 7,403,783 B2 | 7/2008 | Cheok et al. |
| 7,555,370 B2 | 6/2009 | Breed et al. |
| 7,574,219 B2 | 8/2009 | Rofheart et al. |
| 7,592,944 B2 | 9/2009 | Fullerton et al. |
| 7,610,146 B2 | 10/2009 | Breed |
| 7,636,062 B2 | 12/2009 | Ward et al. |
| 7,768,394 B2 | 8/2010 | Amidi |
| 7,783,385 B2 | 8/2010 | Tamura |
| 7,839,916 B1 | 11/2010 | Luecke et al. |
| 7,962,285 B2 | 6/2011 | Breed |
| 7,974,264 B2 | 7/2011 | Rothschild |
| 7,979,172 B2 | 7/2011 | Breed |
| 7,983,694 B2 | 7/2011 | Cheok et al. |
| 8,010,133 B2 | 8/2011 | Cheok et al. |
| 8,031,690 B2 | 10/2011 | Aiello et al. |
| 8,040,859 B2 | 10/2011 | Chowdhury et al. |
| 8,160,609 B2 | 4/2012 | Alles et al. |
| 8,169,319 B2 | 5/2012 | Kaplan et al. |
| 8,203,487 B2 | 6/2012 | Hol et al. |
| 8,214,147 B2 | 7/2012 | Cheok et al. |
| 8,229,130 B2 | 7/2012 | Paradiso et al. |
| 8,248,263 B2 | 8/2012 | Shervey et al. |
| 8,284,100 B2 | 10/2012 | Vartanian et al. |
| 8,319,687 B2 | 11/2012 | Kahle |
| 8,660,571 B2 | 2/2014 | Hulkkonen et al. |
| 8,725,416 B2 | 5/2014 | Choi et al. |
| 9,195,360 B2 | 11/2015 | Lin |
| 9,282,429 B2 | 3/2016 | Duggan et al. |
| 9,294,181 B2 | 3/2016 | Park |
| 9,436,181 B2 | 9/2016 | Peeters et al. |
| 9,485,628 B2 | 11/2016 | Lee et al. |
| 9,488,978 B2 | 11/2016 | Callou et al. |
| 9,516,513 B2 | 12/2016 | Saegrov et al. |
| 9,548,799 B2 | 1/2017 | Hsu et al. |
| 9,646,502 B1 | 5/2017 | Gentry |
| 2004/0002346 A1 | 1/2004 | Santhoff |
| 2005/0228613 A1 | 10/2005 | Fullerton et al. |
| 2006/0291537 A1 | 12/2006 | Fullerton et al. |
| 2008/0167051 A1 | 7/2008 | Cheok et al. |
| 2008/0234930 A1 | 9/2008 | Cheok et al. |
| 2009/0028218 A1* | 1/2009 | Hariton ............... H04L 1/205 375/130 |
| 2009/0081923 A1 | 3/2009 | Dooley et al. |
| 2009/0323716 A1 | 12/2009 | Chintalapudi et al. |
| 2012/0036198 A1 | 2/2012 | Marzencki et al. |
| 2012/0165012 A1 | 6/2012 | Fischer et al. |
| 2012/0290168 A1 | 11/2012 | De et al. |
| 2013/0023285 A1 | 1/2013 | Markhovsky et al. |
| 2013/0137423 A1 | 5/2013 | Das et al. |
| 2013/0234834 A1 | 9/2013 | Lampe et al. |
| 2014/0032035 A1 | 1/2014 | Thomson |
| 2014/0187257 A1 | 7/2014 | Emadzadeh et al. |
| 2014/0253388 A1 | 9/2014 | Jalali et al. |
| 2015/0116151 A1 | 4/2015 | Liu et al. |
| 2015/0156604 A1 | 6/2015 | Dowlatkhah et al. |
| 2015/0156637 A1 | 6/2015 | Li et al. |
| 2015/0193468 A1 | 7/2015 | Singh |
| 2015/0380803 A1 | 12/2015 | Hopkins et al. |
| 2016/0018509 A1 | 1/2016 | McCorkle |
| 2016/0025502 A1 | 1/2016 | Lacaze et al. |
| 2016/0044630 A1 | 2/2016 | Markhovsky et al. |
| 2016/0061957 A1 | 3/2016 | Li et al. |
| 2016/0069983 A1 | 3/2016 | Gonia et al. |
| 2016/0094250 A1 | 3/2016 | Mujtaba et al. |
| 2016/0105233 A1* | 4/2016 | Jalali ............... H04B 7/18504 342/359 |
| 2018/0109767 A1* | 4/2018 | Li ................... H04N 5/23206 |
| 2018/0229842 A1* | 8/2018 | Stabler ............... B64C 39/024 |

FOREIGN PATENT DOCUMENTS

| | | |
|---|---|---|
| JP | 2004-516463 | 6/2004 |
| JP | 2004-221704 | 8/2004 |
| JP | 2007-218857 | 8/2007 |
| JP | 2009-520193 | 5/2009 |
| JP | 2010-267143 | 11/2010 |
| JP | 2012-524273 | 10/2012 |
| JP | 2003-077085 | 3/2014 |
| WO | WO-2001/95278 A1 | 12/2001 |
| WO | WO-2002/091013 A2 | 11/2002 |
| WO | WO-2004/057361 A1 | 7/2004 |
| WO | WO-2005/081012 A1 | 9/2005 |
| WO | WO-2008/116168 A1 | 9/2008 |
| WO | WO-2011/003839 A1 | 1/2011 |
| WO | WO-2012/034832 A1 | 3/2012 |
| WO | WO-2014/089040 A1 | 6/2014 |
| WO | WO 2013047664 | 3/2015 |

OTHER PUBLICATIONS

Toda et al., Validation of Clock Synchronization Stability for Onboard Inter-Spacecraft Ranging and Timing Correction in Formation Flight, Collected Papers of General Conference 2009 of The Institute of Electronics, Information and Communication Engineers—Communication 1, Japan, the Institute of Electronics, Information and Communication Engineers, Mar. 4, 2009, p. 310, ISSN 1349-1369 (Japanese language, no English translation).

* cited by examiner

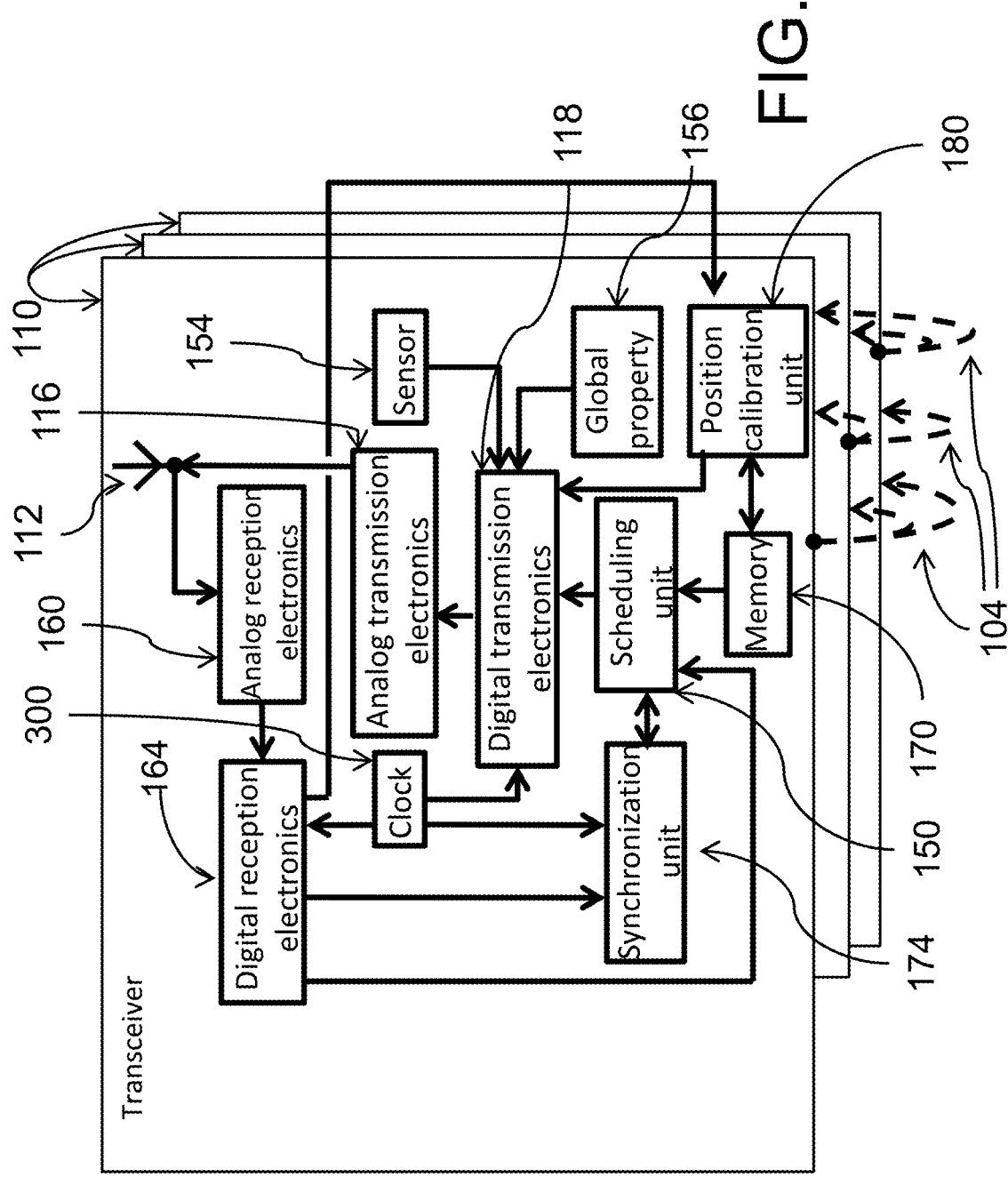

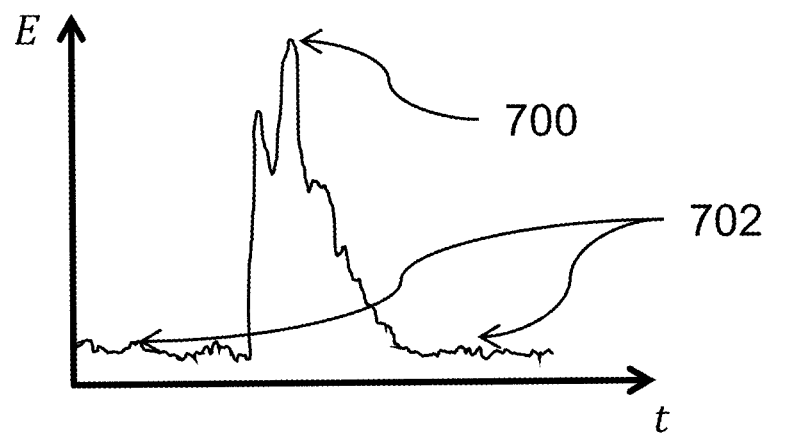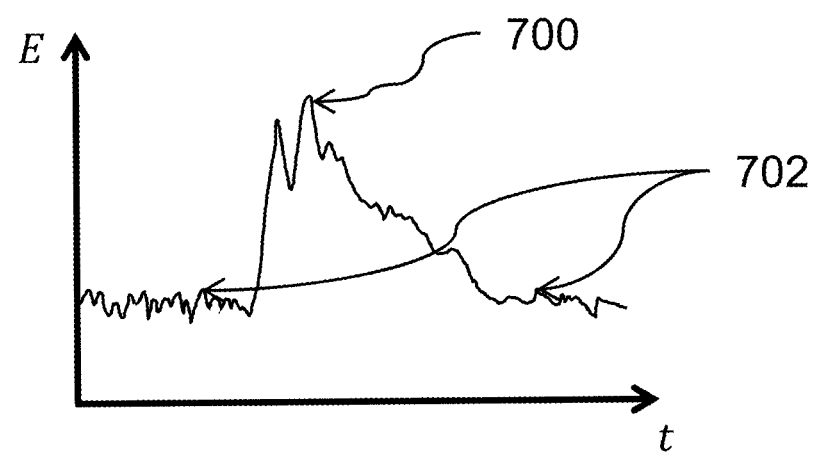
FIG. 7A

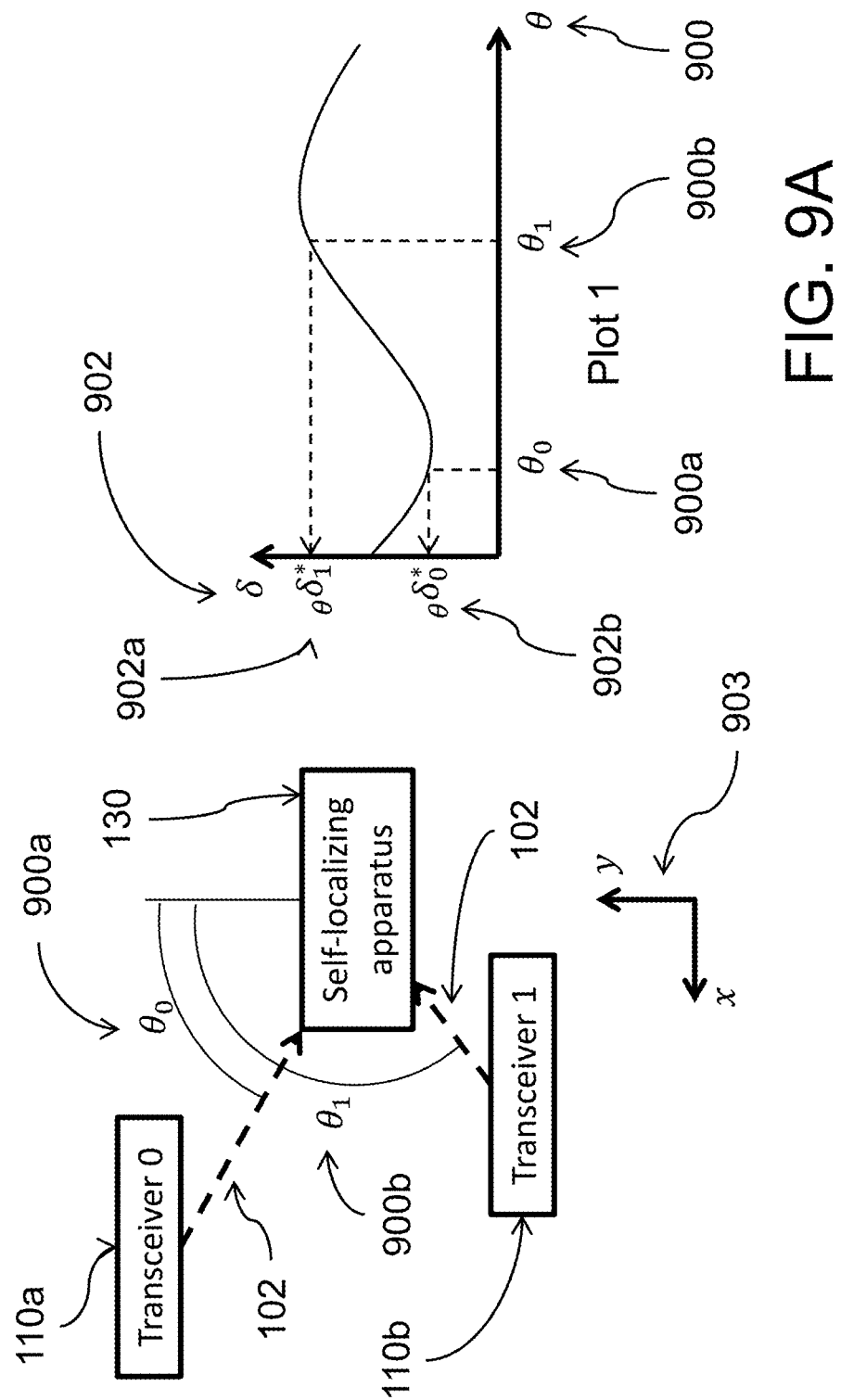

DISTRIBUTED LOCALIZATION SYSTEMS AND METHODS AND SELF-LOCALIZING APPARATUS

CROSS-REFERENCE TO RELATED APPLICATIONS

This application is a continuation of U.S. patent application Ser. No. 15/917,544, filed Mar. 9, 2018, which is a continuation of U.S. patent application Ser. No. 15/173,556, filed Jun. 3, 2016, now U.S. Pat. No. 9,945,929, which is a continuation of U.S. patent application Ser. No. 15/063,104, filed Mar. 7, 2016, now U.S. Pat. No. 9,885,773, which claims the benefit of U.S. Provisional Application No. 62/129,773, filed Mar. 7, 2015, and U.S. Provisional Application No. 62/168,704, filed May 29, 2015, all of which are hereby incorporated by reference herein in their entireties.

FIELD

The present disclosure relates to the field of localizing objects. The disclosure also relates to ultra wideband (UWB) localization systems and methods. The disclosure further relates to a self-localizing receiving apparatus.

BACKGROUND

Logistics and industrial automation increasingly rely on accurate localization to support and control manual and automated processes, with applications ranging from "smart things" through effective tracking and assistance solutions to robots such as automated guided vehicles (AGVs).

Ultra wideband (UWB) technology has been advocated as a localization solution suitable for asset tracking applications. Such applications are concerned with maintaining a centralized database of assets and their storage locations in a warehouse, hospital, or factory. When using UWB technology, assets, such as pallets, equipment, or also people may be equipped with tags that emit UWB signals at regular intervals. These signals may then be detected by UWB sensors installed in the warehouse, hospital, or factory. A central server then uses the UWB signals detected by the UWB sensors to compute the tag's location and update the centralized database.

Mobile robots are increasingly used to aid task performance in both consumer and industrial settings. Autonomous mobile robots in particular offer benefits including freeing workers from dirty, dull, dangerous, or distant tasks; high repeatability; and, in an increasing number of cases, also high performance. A significant challenge in the deployment of mobile robots in general and autonomous mobile robots in particular is robot localization, i.e., determining the robot's position in space. Current localization solutions are not well suited for many mobile robot applications, including applications where mobile robots operate in areas where global positioning system (GPS)-based localization is unreliable or inoperative, or applications that require operation near people.

Using current UWB localization solutions for robot localization would not enable a mobile robot to determine its own location directly. Rather, a robot equipped with a tag would first emit an UWB signal from its location, UWB sensors in its vicinity would then detect that UWB signal and relay it to a central server that would then compute the mobile robot's location, and then this location would have to be communicated back to the robot using a wireless link. This type of system architecture invariably introduces significant communication delays (e.g., latency) for controlling the mobile robot. This communication architecture also results in a relatively higher risk of lost signals (e.g., due to wireless interference) and correspondingly lower system robustness, which makes it unsuitable for many safety-critical robot applications (e.g., autonomous mobile robot operation). Furthermore, in this architecture the maximum number of tags and the tag emission frequency (i.e., the localization system's update rate) are invariably linked since multiple UWB signals may not overlap, which results in relatively lower redundancy (i.e., a limited number of tags allowed for an available network traffic load) and limited scalability (i.e., the system can only support a limited number of tags in parallel).

FIG. 2A is a block diagram overview of a centralized localization system as proposed in the prior art for use in asset tracking. In this system, tags 202 are moved within some environment, transmitting UWB signals 208 at various times. In this centralized system, mobile transmitters may operate independently and without synchronization. Stationary UWB sensors 204 are distributed throughout the environment. They have synchronized clocks. The UWB signals 208 transmitted by the tag 202 are received by the UWB sensors 204 that then communicate the signals' reception times to a centralized server 206. Based on the reception time at each UWB sensor 204, centralized server 206 computes the location of each tag 202. The system architecture shown in FIG. 2A is often advanced for asset tracking, where the location of all tags 202 should be known at a centralized location, and where tags 202 are not required to know their position. These properties make this system architecture unsuitable for situations where the objects being tracked are required to know their position; e.g., robots that make decisions based upon knowledge of their position. Furthermore, because each tag 202 is required to transmit signals 208, the update rate of the system is inversely proportional to the number of tags 202. This makes this system architecture unsuitable for situations where a large number of objects need to be tracked with a high update rate.

FIG. 2B is a block diagram overview of another localization system proposed in the prior art whereby mobile transceivers 252 communicate with stationary transceivers 254 through the two-way exchange of UWB signals 258. Such two-way communication with a stationary transceiver 254 enables the mobile transceiver 252 to compute the time-of-flight between itself and the stationary transceiver. In this architecture, communication between mobile transceivers 252 and stationary transceivers 254 must be coordinated, such that communications do not interfere. Knowledge of the time-of-flight to three or more stationary transceivers 254 enables each mobile transceiver 252 to compute its relative location within an environment using trilateration. Because each mobile transceiver 252 communicates with each stationary transceiver 254, the update rate of the system is inversely proportional to the number of mobile transceivers 252 and to the number of stationary transceivers 254. This architecture is therefore not suitable for systems where a large number of objects must be localized at a high frequency (e.g., tracking a group of robots, where position measurements are used in the robots' control loops to influence the robots' motions).

BRIEF DESCRIPTION OF THE DRAWINGS

Embodiments of the present disclosure are illustrated by way of example and not limitation in the figures of the accompanying drawings, in which like references indicate similar elements and in which:

FIG. 1B is a block diagram of illustrative transceivers in accordance with some embodiments of the present disclosure;

FIG. 7A shows illustrative plots of channel impulse responses of a channel in accordance with some embodiments of the present disclosure;

FIGS. 9A and 9B show illustrative plots exemplifying possible effects that relative position, orientation, and obstacles may have on the reception timestamp of an UWB signal in accordance with some embodiments of the present disclosure;

DETAILED DESCRIPTION

Figure 1A:
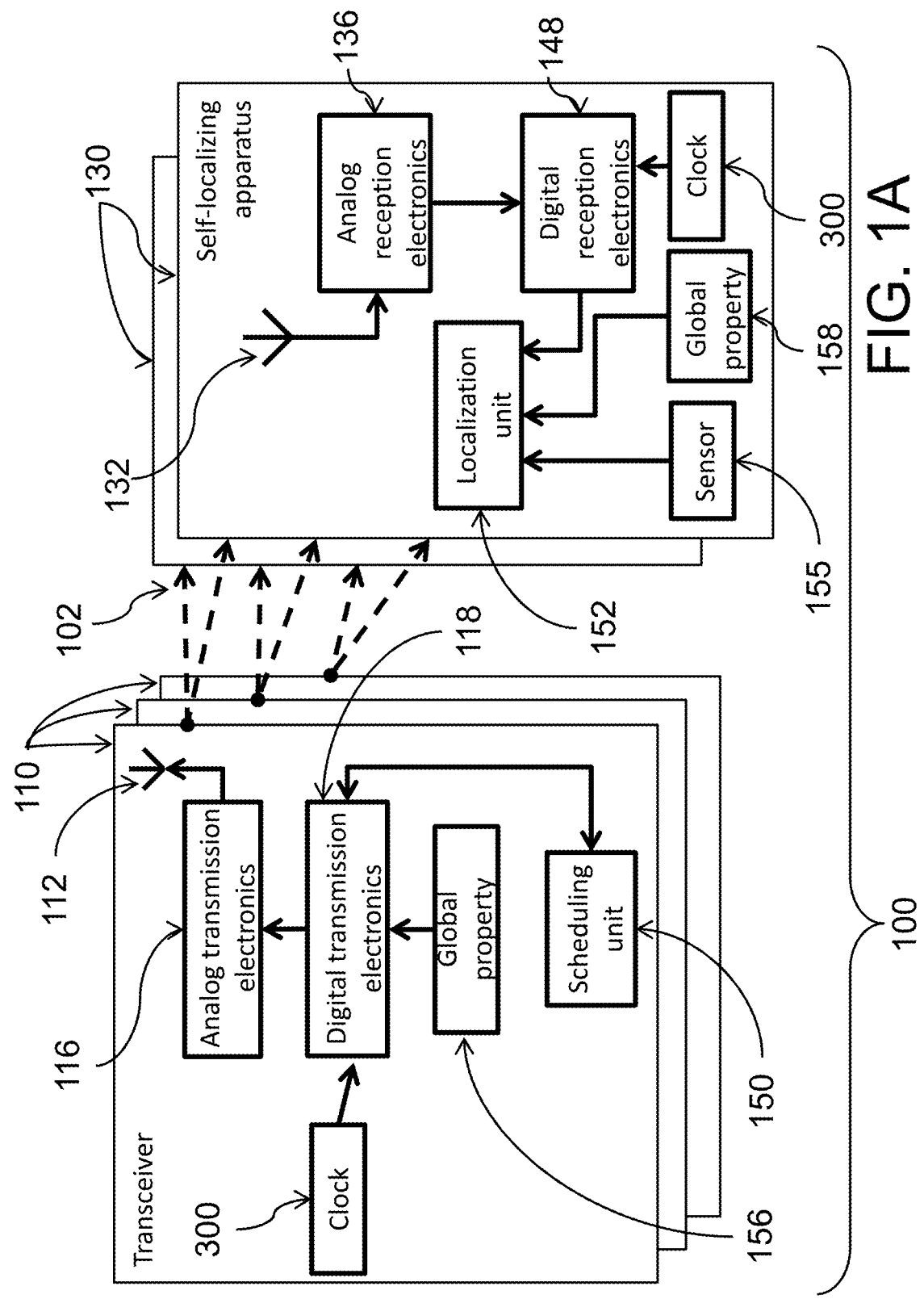
FIG. 1A is a block diagram of an illustrative localization system in accordance with some embodiments of the present disclosure.
Figure 2A:
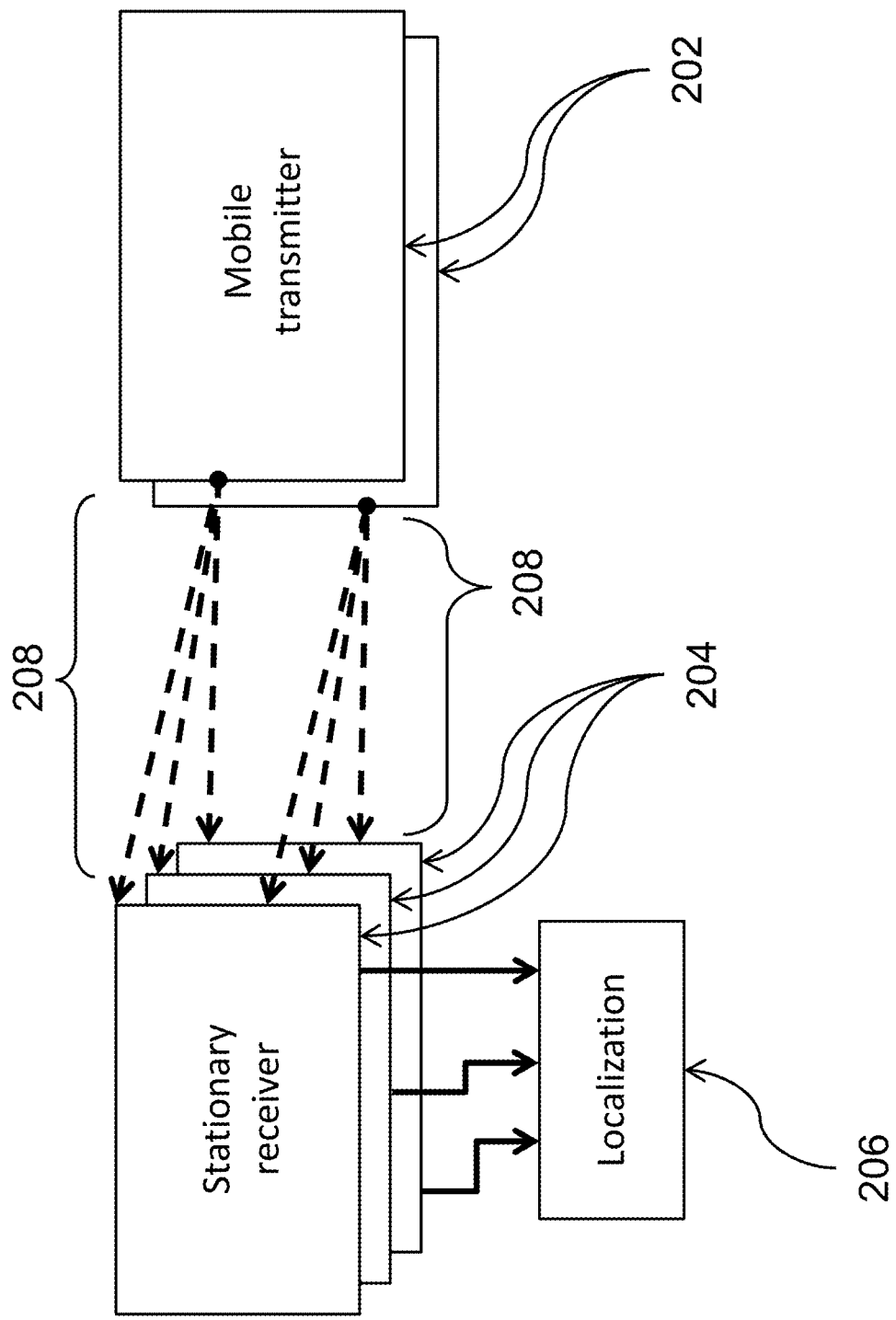
FIGS. 2A and 2B are block diagrams of two localization systems known in the prior art.
Figure 2B:
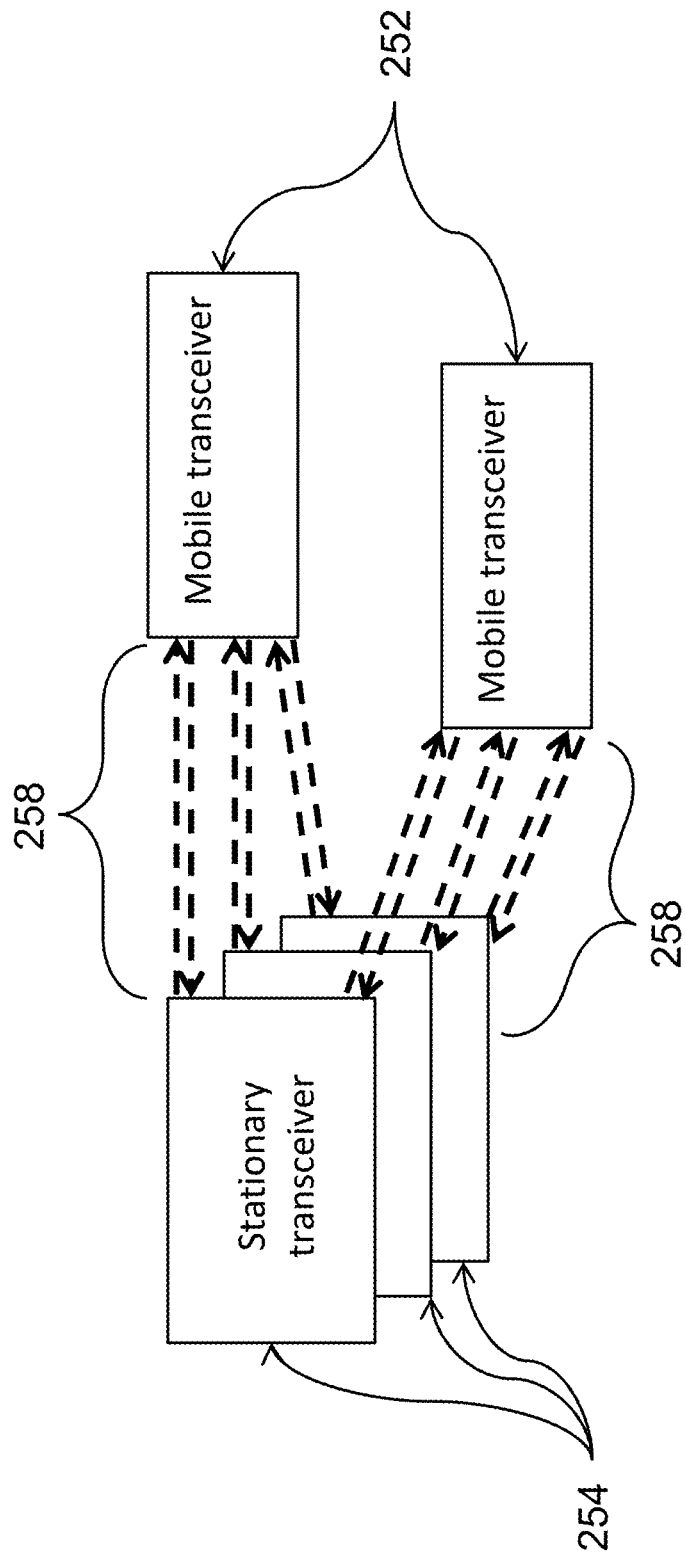

In accordance with the present disclosure, limitations of current systems for localizing have been reduced or eliminated.

Technical advantages of certain embodiments of the present disclosure relate to localizing objects in three-dimensional space. Technical advantages of certain embodiments improve the localizing accuracy. Technical advantages of certain embodiments improve the rate at which the localizing information may be obtained or updated.

Yet further technical advantages of certain embodiments relate to the reception of wireless signals used, for example, by a device to determine its own location. In some embodiments, the reception of localizing signals does not deteriorate when a direct line of sight cannot be established between a receiving device and a sufficiently large number of signal transmitters. For example, some embodiments allow operation in areas without good line of sight to GNSS satellites and indoors. In some embodiments, signals are not distorted by multipath, do not suffer multipath fading observed in narrowband signals, or do not suffer from reduced signal quality when lacking direct line of sight in indoor environments. For example, some embodiments do not show performance degradation in enclosed environments (e.g., indoors), in forests, or in dense urban environments, such as those where retaining a lock on a GNSS signals becomes more difficult.

Technical advantages of some embodiments may allow arrival of a plurality of transceiver messages at a receiver's antenna with adequate time separation, avoiding degraded signal detection and reduced performance of a localization system.

Technical advantages of some embodiments are such that they may be used in real-time or may be used by an unlimited number of receivers, to determine their 2D or 3D position, in GPS-denied environments or any environment where greater accuracy or system redundancy may be desired.

Technical advantages of some embodiments may increase performance of current mobile robots and allow new uses of mobile robots by enabling localization with higher update rates, with lower latency, or with higher accuracy than currently possible, resulting in more performant robot control.

Further technical advantages of some embodiments may allow a person, a mobile robot, or another machine to be equipped with a self-localizing apparatus that can determine its 3D position in space without the need to emit signals. This may increase localization performance and allow new uses of localization technology by providing regulatory advantages; by allowing scalability (e.g., the system may be used by an unlimited number of self-localizing apparatuses in parallel); by allowing higher redundancy (e.g., non-emitting apparatuses allow for more emitting transceivers for a given network traffic load); by enabling more efficient bandwidth usage (e.g., lower emissions, less interference); by increasing energy efficiency of UWB receivers (e.g., by not requiring energy for transmissions); by enhancing privacy of operation; and by making data available locally where it is needed, resulting in increased update rates, speed, and system robustness.

Further technical advantages of some embodiments may allow improved system performance by fusing data from several sources including UWB signals, readings of global properties from multiple locations, and onboard motion sensors.

Further technical advantages of some embodiments are linked to providing a distributed localization system. Such a system may provide increased robustness and safety for robot operation because it does not rely on sensor signals from a single source. It may also offer graceful performance degradation by providing redundancy; may allow identification and resolution of inconsistencies in data by providing redundant data; may provide higher performance by performing localization based on a comparison of the signals received from individual transceivers; and may allow for easy scalability by automatically adapting to adding/removing transceivers.

Yet further technical advantages of some embodiments allow for localization without direct line of sight between a transceiver and self-localizing apparatus. Moreover, further technical advantages allow for lower susceptibility to disturbance from radio frequency traffic, secure communications, and increasing resistance to interference, noise, and jamming.

Further technical advantages will be readily apparent to one skilled in the art from the following description, drawings, and claims. Moreover, while specific advantages have been enumerated above, various embodiments may include all, some, or none of the enumerated advantages. The listed advantages should not be considered as necessary for any embodiments.

The present disclosure uses timestampable signals. Timestampable signals are radio frequency (RF) signals, with each signal having a feature that can be detected and that can be timestamped precisely. Examples of features include a signal peak, a signal's leading edge, and a signal preamble. Examples of timestampable signals include RF signals with a distinct, well-defined, and repeatable frequency increase or frequency decrease with time. Further examples of timestampable signals include signal bursts, signal chirps, or signal pulses. Further examples of timestampable signals include signals with features suitable for phase correlation or amplitude correlation techniques (e.g., signals with codes that have low auto-correlation values).

In some embodiments, the timestampable signal are "open-loop", one-directional RF signals transmitted over a reception area. Examples include DCF77 time code signals, GPS P-code signals, and terrestrial trunked radio signals. In some embodiments, the apparatus is a non-emitting apparatus.

In some embodiments, the timestampable signals use a narrow frequency band. In some embodiments, a center or carrier frequency in the ISM band is used. In some embodiments, a center or carrier frequency in the range of 1 to 48 GHz is used. In some embodiments, a center or carrier frequency in the range of 2.4 to 12 GHz is used. In some embodiments, a center or carrier frequency in the range of 3.1 to 10.6 GHz is used. In some embodiments, higher frequencies are used. Narrow band signals tend to suffer from multipath fading more than wide band signals (e.g., ultra wideband (UWB) signals). In narrow band signals, signal duration is typically longer than the delay variance of the channel. Conversely, with UWB signals the signal duration is typically less than the delay variance of the channel. For example, in the case of an UWB system with a 2 nanosecond pulse duration, the pulse duration is clearly much less than the channel delay variation. Thus, signal components can be readily resolved and UWB signals are robust to multipath fading.

In some embodiments, the timestampable signals are UWB signals. UWB signals are spread over a large bandwidth. As used herein, UWB signals are signals that are spread over a bandwidth that exceeds the lesser of 125 MHz or 5% of the arithmetic center frequency. In some embodiments, UWB signals are signals that are spread over a bandwidth that exceeds the lesser of 250 MHz or 10% of the arithmetic center frequency. In some embodiments, UWB signals are signals that are spread over a bandwidth that exceeds the lesser of 375 MHz or 15% of the arithmetic center frequency. In some embodiments, UWB signals are signals that are spread over a bandwidth that exceeds the lesser of 500 MHz or 20% of the arithmetic center frequency. In some embodiments, a bandwidth in the range of 400-1200 MHz is used. In some embodiments, a bandwidth in the range of 10-5000 MHz is used. In some embodiments, a bandwidth in the range of 50-2000 MHz is used. In some embodiments, a bandwidth in the range of 80-1000 MHz is used. Ultra wideband technology allows an initial radio frequency (RF) signal to be spread in the frequency domain, resulting in a signal with a wider bandwidth, ordinarily wider than the frequency content of the initial signal. UWB technology is suitable for use in a localization system because it can transmit very short-duration pulses that may be used to measure the signal's arrival time very accurately and hence allow ranging applications. UWB signals may be advantageous for use in localization systems because of their capability to penetrate obstacles and to allow ranging for hundreds of meters while not interfering with conventional narrowband and carrier waves used in the same frequency bands.

In some embodiments, the arrival time of timestampable signals can be measured to within 0.6 nanoseconds relative to a clock. In some embodiments, the arrival time of timestampable signals can be measured to within 1, 2, 3, 4, 5, 6, 7, 8, 9, 10, 11, 12, 13, 14, or 15 nanoseconds relative to a clock.

In some embodiments, the transmission times of two subsequent timestampable signals are separated by 1-500 microseconds. In some embodiments, the transmission times of two subsequent timestampable signals are separated by 400-2000 microseconds. In some embodiments, the transmission times of two subsequent timestampable signals are separated by 1-1000 milliseconds. In some embodiments, combinations of time separations are used. In some embodiments, no time separation is used.

In some embodiments, the signal's mean equivalent isotropically radiated power (EIRP) density is smaller than −40 dBm/MHz at all frequencies. In some embodiments, the signal's mean EIRP density is smaller than −80, −70, −60, −50, −30, −20, or −10 dBm/MHz at all frequencies.

In some embodiments, the transmitted signal's maximum power is smaller than 0.1 mW per channel. In some embodiments, the transmitted signal's maximum power is smaller than 1.0 mW per channel. In some embodiments, the transmitted signal's maximum power is smaller than 100 mW per channel. In some embodiments, the transmitted signal's maximum power is smaller than 500 mW per channel. In some embodiments, the transmitted signal's maximum power is smaller than 10 W per channel.

In some embodiments, the less limiting of a signal's EIRP density and a signal's maximum power applies. In some embodiments, the more limiting of a signal's EIRP density and a signal's maximum power applies. In some embodiments, one of a limit on a signal's EIRP density and a limit on a signal's maximum power applies. In some embodiments, both of a limit on a signal's EIRP density and a limit on a signal's maximum power applies. In some embodiments, a limit applies to narrow band signal. In some embodiments, a limit applies to broadband signal.

In some embodiments, a transceiver's typical effective range is between 1 m and 50 m. In some embodiments, a transceiver's typical effective range is between 1 m and 100 m. In some embodiments, a transceiver's typical effective range is between 1 m and 500 m. In some embodiments, a transceiver's typical effective range is between 1 m and 1000 m. In some embodiments, a transceiver's typical effective range is between 1 m and 5000 m. In some embodiments, the apparatus may only receive UWB signals from a subset of transceivers.

In some embodiments, a maximum data rate of 50 Mbps is used. In some embodiments, a maximum data rate of 5 Mbps is used. In some embodiments, a maximum data rate of 1 Mbps is used.

In some embodiments, chirp spread spectrum (CSS) signals are used. In some embodiments, frequency-modulated continuous-wave (FMCW) signals are used.

Some embodiments include a localization unit. In some embodiments, the localization unit can compute at least one of (i) an orientation or orientation information, (ii) a position, or (iii) a motion of the self-localizing apparatus.

In some embodiments, the localization unit computes the location of the self-localizing apparatus based on the reception times of the UWB signals and the known locations of the transceivers. In some embodiments, a time of arrival scheme is used. In some embodiments, a time difference of arrival scheme is used. Multilateration requires the localization unit to compute the time-difference between the reception times of two UWB signals. By subtracting the known time-difference of the signals' transmission times from the difference in their reception times (also referred to as a "TDOA measurement"), a localization unit may compute the difference in distance to the two transceivers, from which the signals were transmitted (e.g., transceiver two is 30 cm further away than transceiver one, since the reception of the signal from transceiver two was delayed by 1 ns in comparison to the signal from transceiver one). By computing the difference in distance between multiple transceivers, the localization unit may be able to compute the location of the self-localizing apparatus by solving a system of hyperbolic equations, or a linearized version thereof. Methods of solving this system of equations are well known to those skilled in the art and may include non-linear least squares, least squares, Newton iterations, gradient descent, etc. The method of multilateration requires the time-difference of the signals' transmission times to be known.

In some embodiments, the localization unit of the self-localizing apparatus may compute location iteratively. In some embodiments, rather than waiting for an UWB signal to be received from all transceivers, the localization unit iteratively updates the location estimate whenever an UWB signal is received. In some embodiments, when an UWB signal is received, an adjustment to the current location estimate is computed in dependence of the difference between its reception time and the reception time of a previously received UWB signal. In some embodiments, a known method of filtering (e.g., Kalman filtering, particle filtering) is used to compute or apply this update. In some embodiments, the adjustment is computed based on the variance of the current location estimate (e.g., if the current estimate is highly accurate, less adjustment will be applied). In some embodiments, the adjustment is computed based on the locations of the two transceivers from which the UWB signals were transmitted. In some embodiments, this adjustment is computed based on a measurement model, describing the probability distribution of a TDOA measurement based on the current location estimate and the locations of the two transceivers. In some embodiments, this enables more or less adjustment to be applied depending on how accurate the TDOA measurement is determined to be (e.g., if a first transceiver lies on a line connecting the current location estimate with a second transceiver, the TDOA measurement resulting from the two transceivers may be considered unreliable, and thus less adjustment applied).

In some embodiments, the localization unit updates a location estimate based on a system model, describing the probability distribution of the self-localizing apparatus' location. In some embodiments, this system model may be based on other estimated states (e.g., the velocity or heading of the self-localizing apparatus). In some embodiments, this system model may be based on input history (e.g., if an input command should yield a motion in the positive x-direction according to system dynamics, it is more probable the new location estimate lies in the positive x-direction, than in the negative x-direction).

In some embodiments, this system model may be based on measurements from a sensor or global property. In some embodiments, the localization unit may compute the location of the self-localizing apparatus based on a global property. In some embodiments, the localization unit may compute the location of the self-localizing apparatus based on the difference between a global property measured by the self-localizing apparatus and a global property measured by one or more of the transceivers (e.g., if both self-localizing apparatus and transceiver measure air pressure, the relative altitude difference between the two can be computed according to the known relationship between altitude and air pressure).

In some embodiments, the localization unit may use a history of location estimates and a system model to compute further dynamic states of the body, for example, velocity or heading. For example, if the history of location estimates indicates motion, velocity can be estimated. A further example is if the history of location estimates indicates motion in the positive y-direction, and the system model indicates that only forward motion is possible (e.g., a skid-steer car), the orientation can be determined as oriented in the positive y-direction.

In some embodiments, the location is a 1D location, a 2D location, a 3D location, or a 6D location (i.e., including position and orientation).

In some embodiments, the relative location computed by the localization unit is computed with an accuracy of 1 m, 20 cm, 10 cm, or 1 cm. In some embodiments, the time delay between the reception of an UWB signal and the computation of an updated position estimate provided by the localization unit is less than 50 ms, 25 ms, 10 ms, 5 ms, 2 ms, or 1 ms. In some embodiments, the system's update rate for full position updates or for partial position updates is more than 1 Hz, 5 Hz, 10 Hz, 50 Hz, 250 Hz, 400 Hz, 800 Hz, 1000 Hz, or 2000 Hz.

In some embodiments, a localization system comprises at least 1, 2, 3, 5, 7, 10, 25, 50, 100, or 250 anchors. In some embodiments, a localization system supports more than 1, 2, 3, 5, 10, 20, 40, 100, 200, 500, 1000, 5000, or 10000 self-localizing apparatuses.

A clock as used herein refers to circuitry, structure, or a device that is capable of providing a measure of time. The measure of time may be in any suitable units of time. For example, the measure of time may be based on a base unit of a second. As another example, the measure of time may be based on a counter that increments at a particular rate. In some embodiments, the clock comprises an internal oscillator used to determine the measure of time. In some embodiments, the clock determines the measure of time based on a received signal (e.g., from an external oscillator).

In some embodiments, each transceiver may use its own onboard clock. In some embodiments, a single clock may generate a clock signal transmitted to each transceiver via cables or wirelessly. In some embodiments, the clock signal may be dependent on at least one-time code transmitted by a radio transmitter, or on at least one of a terrestrial radio clock signal, a GPS clock signal, and a time standard. In some embodiments, the clock signal may be based on a GPS-disciplined oscillator, on a transmitter, or on a time estimate computed from at least two clocks to improve accuracy or long-term stability of the clock signal.

Clocks may, for example, use a crystal oscillator or a temperature compensated crystal. In some embodiments, enhanced clock accuracy may be obtained through temperature stabilization via a crystal oven (OCXO) or via analog (TCXO) compensation or via digital/micro-controller (MCXO) compensation. In some embodiments, a centralized synchronization unit is used. In some embodiments, an atomic oscillator (e.g., rubidium) is used as a clock.

In some embodiments, a clock is structured and arranged to have an Allan variance of at most $(1\times10^{-8})^2$ or $(1\times10^{-9})^2$ or $(5\times10^{-10})^2$ for averaging intervals between 5 milliseconds and 10 milliseconds or for averaging intervals between 5 milliseconds and 100 milliseconds or for averaging intervals between 1 milliseconds and 1 second.

The apparatus or transceiver may be equipped with analog and digital reception electronics. The reception electronics may amplify the received signal and convert it to a base signal, which may then be demodulated and passed on to a central processing electronics. An important design aspects of the receiver is to minimize noise and distortion. This may be achieved by carefully selecting reception electronics' components (especially those of the amplifier) and by optimizing the receiver's circuit design accordingly.

In some embodiments, the self-localizing apparatus is, or the self-localizing apparatus' antenna, analog reception electronics, and digital reception electronics are, structured and arranged to receive two UWB signals within a time window of 2, 10, or 50 seconds, wherein the time difference between the time stamps of the two UWB signals is within 0.6, 3, or 15 nanoseconds of the time difference between their reception times at the apparatus' antenna with reference to the apparatus' clock.

In some embodiments, the apparatus' digital reception electronics are further operable to perform the timestamping of the received UWB signals with reference to the apparatus' clock in less than 1 millisecond, 100 microseconds, or 10 microseconds.

The apparatus or transceiver may be equipped with analog and digital transmission electronics.

In some embodiments, a transceiver is, or transceiver's digital transmission electronics, analog transmission electronics, and antenna are, configured to transmit two UWB signals within a time window of 2, 10, or 50 seconds, or configured such that the time difference between the transmission of two UWB signals from the transceiver's antenna is within 0.6, 3, or 15 nanoseconds of the time difference between their scheduled transmission times with reference to the transceiver's clock.

In some embodiments, a scheduling unit is used to schedule UWB signal transmission times. It will be apparent to one skilled in the art that any error by transceivers in adhering to this transmission schedule may affect the accuracy of the location computed by a localization unit.

In some embodiments, the scheduled time refers to the time at which the first pulse of the signal leaves the transceiver's antenna. In some embodiments, the scheduled time refers to the beginning of a start-of-frame delimiter (i.e., the point at which the transmitted signal changes from the repeated transmission of a preamble code to the transmission of the start-of-frame delimiter). In some embodiments, the apparatus is structured and arranged to compare two UWB signals transmitted by the same transceiver.

In some embodiments, transceivers coordinate their transmissions at the packet level. In some embodiments, packet emission overlap is avoided. In some embodiments, packets are emitted in a round-robin fashion; at regular intervals; in a specific time sequence; or taking turns. In some embodiments, transceivers transmit packets simultaneously.

In some embodiments, each of three or more transceivers includes a scheduling unit. In some embodiments, a single scheduling unit is operationally coupled to three or more transceivers. In some embodiments, this operational coupling is a wired connection. In some embodiments, this operational coupling is a wireless connection. In some embodiments, this wireless operational coupling is implemented using UWB signals. In some embodiments, the scheduling unit uses a lower update rate than the UWB signal rate.

In some embodiments, the scheduling unit is operable to ensure a time separation of at least 5 microseconds, 10 microseconds, or 50 microseconds between one transceiver terminating its transmission and a different transceiver beginning its transmission. In some embodiments, the scheduling unit is operable to monitor the UWB signals. In some embodiments, the scheduling unit is operable to compute an improved scheduling. In some embodiments, the scheduling unit is operable to ensure a time separation of at least 1 microsecond, 5 microseconds, or 10 microseconds between the end of one UWB signal and the start of a second UWB signal emitted by the same transceiver. In some embodiments, the scheduling unit is operable to maintain a memory of the assignment of media access control addresses and scheduled transmission times.

In some embodiments, each of the three or more transceivers comprises a sensor. In some embodiments, the sensor is physically and operationally coupled to the transceiver. In some embodiments, the sensor is operable to provide data representative of the orientation, the position, or the movement of the transceiver. In some embodiments, the sensor is structured to detect a disturbance to the transceiver's position or orientation.

In some embodiments, the apparatus comprises a sensor, physically and operationally coupled to the apparatus and operable to provide data representative of the orientation of the apparatus. In some embodiments, the sensor is operable to provide data representative of the orientation, the position, or the movement of the apparatus. In some embodiments, the sensor is structured and arranged to provide data representative of the orientation of a self-localizing apparatus' antenna.

Data from a sensor may be processed by a localization unit or by a position calibration unit. For example, data related to a landmark may be compared with other data (e.g., data related to another landmark, data from memory, sensor data, data representative of a location) to improve a position estimate or a position calibration unit. As another example, a comparison of the position of a landmark relative to a transceiver detected by a first camera and the position of the same landmark relative to a self-localizing apparatus detected by a second camera may allow a localization unit to improve a localization estimate. A comparison may use data related to one or more landmarks. A comparison may use data related to observations by one or more visual sensors.

Typical examples of sensors that may be usefully employed as part of the present disclosure include an optical sensor, an accelerometer, a magnetometer, and a gyroscope.

In some embodiments, micro-electro-mechanical systems (MEMS) or piezoelectric systems may be used to allow achieving operating characteristics outlined in the present disclosure. Examples of such micro-sensors that can be usefully employed with the present disclosure include MEMS gyroscopes, MEMS accelerometers, piezoelectric gyroscopes, and piezoelectric accelerometers. In some embodiments, the use of micro-sensors allows using one or more inertial measurement units (IMUs), which may each combine multiple gyroscopes or accelerometers or use multiple-axis gyroscopes or accelerometers, in each subsystem. In some embodiments, such selection of micro-sensors allows creating or using a self-localizing apparatus suitable for highly dynamic movement that require low weight and low power consumption in spite of high performance. For example, a 3-axis MEMS gyroscope may be used to monitor a self-localizing apparatus' attitude and to allow triggering a signal if an attitude threshold is exceeded. As another example, a MEMS gyroscope may be used to control a small flying robot equipped with a self-localizing apparatus around hover in spite of its low time constant. Examples of optical sensors include infrared sensors, linear cameras, optic flow sensors, and imaging sensors, among others.

Some embodiments comprise a global property sensor, i.e., a sensor operable to provide data representative of a global property.

Examples of global properties include fields that have a determinable value at multiple or every point in a region, such as a gravitational force, an electromagnetic force, a fluid pressure, and a gas pressure. Further examples of global properties include an RF signal strength, a GPS signal, the Earth's magnetic field, the Earth's gravitational field, the atmosphere's pressure, landmarks, and radio time signals (e.g., those sent by DCF77 time code transmitters). Examples of landmarks include the horizon, the sun, moon or stars, mountains, buildings, and prominent environmental features. Prominent environmental features may include distinctive natural features such as mountains, distinctive buildings such as monuments, and others such as those used in simultaneous localization and mapping (SLAM). Further examples for landmarks include those used in Scale-Invariant Feature Transform (SIFT) and Speeded Up Robust Features (SURF). Note that in the present disclosure, GPS or GNSS may be used as a placeholder to describe any similar signals by other global navigation satellite systems such as e.g., GLONASS, Galileo, IRNSS, or BeiDou-2 as well as their improved versions such as real-time kinematic (RTK) GPS or DGPS.

In some embodiments, an apparatus and a transceiver are both configured to detect the same global property. In some embodiments, a transceiver is configured to communicate data representative of the global property at its location to an apparatus or to another transceiver, and the apparatus or the another transceiver is configured to compare the data with data representative of the same global property at the apparatus' or the another transceiver's location. In some embodiments, the global property can be associated with a global property model.

In some embodiments, the global property sensor is an orientation sensor. The orientation sensor may enable the transceiver to measure its orientation relative to a frame of reference common to the transceivers and the self-localizing apparatus. The transceiver may then transmit signals representative of its orientation included as data (payload) within the UWB signals. In some embodiments, a transceiver is capable of measuring its orientation and of transmitting this orientation as a payload of UWB signals.

In some embodiments, a position calibration unit may compute an estimate for the position of a transceiver. In some embodiments, the transceiver position is computed once (e.g., as part of a calibration routine during the localization system's setup). In some embodiments, the transceiver position is computed continuously (e.g., each time new data related to the transceiver's position becomes available). In some embodiments, the transceiver position unit is initialized with known, partially known, estimated, or partially estimated position information (e.g., initial transceiver distances, positions, or orientations may be measured or entered manually).

Position calibration may be achieved in various ways. For example, the position calibration unit may compute a transceiver's position based on time stamped UWB signals received from other transceivers with known locations. This may, for example, allow for the addition of an additional transceiver to an existing network of transceivers. In some embodiments, a position calibration unit operates analogously to a localization unit or vice versa. In some embodiments, a position calibration unit is operationally coupled to a compensation unit.

In some embodiments, a single position calibration unit may be used to compute the location of multiple transceivers relative to each other. This may, for example, allow initialization of a network of transceivers that do not yet have known locations. In some embodiments, multiple position calibration units are used (e.g., one for each transceiver).

In some embodiments, a position calibration unit is implemented offboard a transceiver. For example, the position calibration unit may be implemented on a laptop computer connected to the transceiver using a cable. This may, for example, allow for a more convenient interface for an operator.

In some embodiments, the synchronization unit is operable to synchronize at least one of (i) an offset of the first clock, and (ii) a rate of a first clock, based on a second clock. In some embodiments, the correction is computed or the synchronization is performed based on at least one of an average, a median, and a statistical property of a multitude of the localization system's clocks. In some embodiments, global properties that also provide timing information, such as those provided by GPS, DCF77, and further systems, are used. In some embodiments, the synchronization unit uses global properties that also provide timing information.

In some embodiments, the synchronization unit is operable to implicitly or explicitly account for timing errors introduced by at least one of (i) a first difference between the rate of the apparatus' clock and the rate of a first communicating transceiver's clock and (ii) a second difference between the rate of the apparatus' clock and the rate of a second, different communicating transceiver's clock.

In some embodiments, the synchronization unit is operable to perform the synchronization or to compute the clock correction based on a compensation computed by a compensation unit or data stored in a memory.

In some embodiments, the synchronization unit is operable to synchronize the onboard clock's rate such that the statistical mean error between the onboard clock's rate and the median of the two other transceivers' onboard clock rates is less 10 parts per million or 1 part per million or 100 parts per billion. In some embodiments, the synchronization unit is operable to synchronize the onboard clock's offset such that the statistical mean error between the onboard clock's offset and the median of the two other transceivers' onboard clock offset is less than 10 nanoseconds or 5 nanoseconds or 1 nanosecond. In some embodiments, this is achieved by implicitly or explicitly accounting for timing errors introduced by one or more of the transceiver's antenna, and the transceiver's analog and digital transmission electronics, or by computing clock corrections to the onboard clock's offset in dependence of the timestamped UWB clock synchronization signal and data provided by the transceiver's memory unit, or by altering a clock rate (e.g., but altering a voltage, a temperature, or a crystal trim of a clock).

In some embodiments, a compensation unit is used to correct for signal delays. In some embodiments, compensations are computed once (e.g., as part of a calibration routine) and stored in a memory. In some embodiments, compensations are computed dynamically or continuously during operation.

The compensation unit computes compensations for effects on the UWB signal from the moment of scheduling the transmission time of the UWB signal at the transceiver to the moment of timestamping the UWB signal at the transceiver's or apparatus' reception electronics. These include effects onboard the self-localizing apparatus or transceiver as well as effects during flight from transmitting to receiving antenna. Some examples of effects include: (1) obstacles in or near the direct signal path (e.g., obstacles in the lobe of the electromagnetic wave will also cause changes to the spectral shape), (2) transmitting medium (e.g., the transmission of different frequencies contained in the signal is not the same for all media), (3) variations in signal gain (e.g., calibration may be conducted for a specific gain, but it may be preferable to alter gains to meet specific requirements of a use case), (4) variations in signal power (e.g., in practice actual transmit power is not only affected by the signal gain, but also by losses between the transmitter's electronics and the antenna), (5) oscillator trim (e.g., capacitors used to fine tune the operating frequency of its crystal oscillator clock), (6) altering system components (e.g., calibration is specific to a particular combination of components, including antenna cables and connectors), (7) corrosion (e.g., signal may be affected by degradation of the system's components, especially antenna, cable, or connectors, over time), (8) external sources of interference (e.g., further receiver and transmitter antennae as well as digital equipment, AC power equipment, etc. may cause interference), (9) operating environment (e.g., changes in temperature, humidity, magnetic fields, and further factors may affect the operation of the electronics and hence affect spectral shape or its detection), (10) power supply (e.g., changes in the voltage supply may affect operation of the electronics), (11) mounting points (e.g., metal objects and structures close to the antenna may cause interference; antennae should be positioned at least one-quarter wavelength (e.g., >7.5 cm for a 1 GHz signal) from metal objects and structures), (12) spectral bandwidth (e.g., calibration is specific to the bandwidth used, which may need to be altered for use in different regions, e.g. to conform with a regulatory spectral mask), (13) multipath interference (e.g., signals reflected off different surfaces arriving at the receiver at slightly different times and strengths), and (14) aging of the system's components may also influence measured delays, particularly for clocks, which continue to age even after their first few weeks of operation, with aging rates of 0.1 PPB per day for the highest quality crystal clocks.

Compensation is typically achieved by correcting the reception time stamp or by correcting transmission time information (e.g., a transmission time stamp included in the UWB data as payload), e.g. based on signal quality or group delay. This correction may be computed and applied immediately (e.g., by computing corrections for or modifying individual timestamps) or in batch (e.g., by computing corrections for or modifying timestamps in batch). The compensation may use several data sources to determine the required correction; examples include (i) data representative of the location and orientation of the transceivers and the apparatus; (ii) data provided by onboard sensors; (iii) data stored in a memory; (iv) data provided by the synchronization unit; and (v) quality metrics provided by the digital reception electronics.

In some embodiments, the compensation unit compensates for effects of position, orientation, or movement of the apparatus' antenna relative to a transceiver's antenna. In some embodiments, the compensation unit compensates for effects of obstacles. In some embodiments, the compensation is performed by computing (i) data representative of a correction for a distance, time, or duration, (ii) data representative of a correction for a comparison of a first and a second distance, time, or duration, or (iii) data representative of a correction for a comparison of a multitude of distances, times, or durations. In some embodiments, the data representative of a correction is provided to the localization unit.

In some embodiments, the compensation unit may account for obstacles traversed by an UWB signal between the apparatus' antenna and the transmitter's antenna. Such obstacles and their locations relative to the transceivers, their properties, etc. may be known from blueprints or on-site measurements. Obstacles may also be determined as part of a calibration routine, during operation, entered manually, or a combination thereof (e.g., entered manually and adjusted during operation).

Determining obstacles during operation may, for example, be achieved using quality metrics related to the received signal. Since UWB signals cover a wide range of frequencies, and the transmission of electromagnetic waves depends on both the waves' frequency and the material they pass through, differences in the UWB signal's spectrum at the receiving apparatus may be used to indicate presence of obstacle's in or near the signal's path. For example, an attenuation or complete absence of a certain frequency range in the received spectrum may indicate the presence of an obstacle absorbing that specific frequency in the path between transceiver and receiver. Conversely, an increase of certain frequencies may indicate an obstacle near the signal's direct path, reflecting certain frequencies towards the receiver. However, even monitoring a simple change in the UWB signal's spectral shape over time may provide useful information and may, for example, be used as a measure of confidence for the ranging measurement when fusing data from multiple measurements into an estimator, both by the localization unit or by the compensation unit. This is particularly important for obstacles close to the transmitting or receiving antenna, including the transceiver's/apparatus own electronics and housing as well as its mounting points. This may, for example, also by achieved by comparing the relative distance between a transceiver and an apparatus computed from the travel time of an UWB signal with the relative distance between the transceiver and the apparatus as computed by the localization unit and using quality metrics (e.g., measurement noise, multiple measurements over time/by different apparatuses/in different relative orientations/at different distances/in different directions such as those that may be provided by the reception electronics, synchronization unit, compensation unit, or localization unit in real-time or from memory) to compute compensations. This may also be achieved by the three-dimensional reconstruction of obstacles (e.g., using simultaneous localization and mapping (SLAM)), in some embodiments by combining data from multiple ranging measurements. A large amount of ranging data, e.g. from operating multiple self-localizing apparatuses and transceivers for an extended period of time, may be used. Reconstruction may further be aided by assumptions on the obstacles (e.g., assuming constraints for their size, their orientation in space, their surface properties (e.g., planar surfaces), their material (e.g., homogeneous obstacles), etc.) or by using methods for point cloud matching (e.g., to detect known obstacles from a candidate library). Compensation for obstacles may also be aided by data from the reception electronics (e.g., peak shape/spectral shape) used in combination with models for the impact of obstacles or transmitting media on peak/spectral shape. Data related on obstacles, their impact on the UWB signal, or data related to computing compensation values may be stored in a memory for future use by the compensation unit, e.g. as a look-up table of compensation values for different regions of space.

In some embodiments, the compensation unit may also use information provided by further system components such as the reception electronics (e.g., quality metrics, group delay of the UWB signal), the localization unit (e.g., obstacles, prior estimate of the apparatus' location and orientation), the synchronization unit (e.g., information about the local clock's behavior), or data from memory (e.g., data related to previous UWB signals from the same transceiver, data related to properties or settings of the localization system or its components, data related to the communication architecture, data related to the setup of transceivers including their position, orientation, and mounting in space) as part of its computation. An interesting combination may result from the use of SLAM, which may be used as part of estimation performed by the localization unit and may help determine obstacles from reconstruction of the environment, which can then be used by the compensation unit. Another interesting combination may result from the use of sensors to detect an absence of movement. For example, a sensor may, in some embodiments be used to detect that a self-localizing apparatus is not moving (e.g., by determining that the output of an accelerometer sensor has stayed below a certain threshold for a certain amount of time). The compensation unit may use the detected absence of movement of the apparatus to compute improved compensations by averaging UWB signals over the duration of the absence of movement. Similarly, the localization unit may use the detected absence of movement to improve its localization estimate. As another example, central processing electronics in some embodiments may use a detected absence of movement to calibrate a MEMS gyroscope.

In some embodiments, the compensation unit may also account for the impact of the relative orientation, direction and distance of the apparatus' antenna relative to the transceiver's antenna. This is important due to the difficulty in creating omnidirectional antennae for UWB. This is also important because some apparatuses may be receiving signals from a larger number of transceivers, receiving signals at a higher update rate, or receiving signals with a higher quality than others, depending on their location in space relative to the transceivers, or on the communication architecture used. Corresponding data related to the computation of compensation values may be determined as part of a calibration routine or during use (e.g., provided by an operator), and improved using assumptions (e.g., radial symmetries) or using data from other system components as outlined above. They may then be stored in a memory for use, e.g. as a look-up table of compensation values for different pairwise combinations of relative antenna orientations, directions, and distances.

In some embodiments, the compensation unit may also account for the impact of the aging (e.g., corrosion) or other time-dependent changes (e.g., heating up/cooling down) of components. Corresponding data related to the computation of compensation values may be determined as part of a calibration routine or during use, and improved using assumptions (e.g., models such as a model of an antenna's radiation pattern) or using data from other system components as outlined above. They may then be stored in a memory unit for use, e.g. as a look-up table of compensation values for different changes as a function of time or as a function of sensor data.

In some embodiments, the compensation unit may also account for the impact of external sources of interference such as changes in the operating environment (ambient temperature, humidity, air pressure) that may affect both the operation of the electronics as well as the propagation characteristics of the UWB signal and which may be determined by a sensor. Further examples of external sources include indirect consequences of the operating environment or obstacles, such as multipath interference. Corresponding data related to the computation of compensation values may be determined as part of a calibration routine or during use, and improved using assumptions (e.g., models for the effect of humidity on UWB signal propagation), or using data from further system components as outlined above. They may then be stored in a memory for use, e.g. as a look-up table of compensation values for different changes as a function of environmental data communicated to the compensation unit (e.g., from an onboard or offboard weather station) or from the apparatus' onboard sensor.

In some embodiments, the compensation unit may also account for the impact of system settings or properties, such as variations in signal gain, signal power, oscillator trim, power supply voltage, spectral bandwidth, or altered system components. Again, corresponding data related to the computation of compensation values may be determined as part of a calibration routine or during use, and improved using assumptions (e.g., a model) or using data from further system components as outlined above. Performance of the compensation unit may be further improved by allowing the compensation unit access to corresponding system data and, if available, sensor readings (e.g., as detected onboard or as detected offboard and communicated to the compensation unit). They may then be stored in a memory unit for use, e.g. as a polynomial function of system settings of properties, or as a look-up table for settings/properties.

In some embodiments, the compensation unit may also account for the impact of system components. Other electronic components, including in particular amplifiers, analogue reception and transmission electronics, antennae, and power supply, also have an important impact on timing errors, signal quality, or group delay. While errors may be reduced through proper circuit design, and in particular by optimizing for free configurability of the transmitter's spectrum width, and free configurability of the transmitter's transmission power, a compensation unit may still be used instead of, or in addition to, optimizing circuit design. Since the transmission's spectral shape depends on the layout of the transceiver's circuit board as well as nearby external components, adjustable transmission spectral shape is another consideration to allow optimization of the transmitter's spectral mask. In addition to the signal's power, the performance of the localization system is also affected by the quality of the signal and by the signal's group delay. This may be improved by optimizing UWB antennae to preserve the integrity of the transmitted signals and in particular to maintain the sharp pulse profile used to transmit data. The design may be further optimized for specific applications by choosing onboard antenna connections that allow easy evaluation of different antenna options, creating distributed antennas to increase transmission range, designing systems with multiple antennae to increase throughput and reception reliability, optimizing the antenna's efficiency at transforming electromagnetic waves into electrical current and vice versa to reduce the system's power consumption, optimizing for low cost manufacturing (e.g., printing), which allows evaluation of a wide range of design options, and comparing the performance of directional and omni-directional antennae to optimize for the specific use case. Moreover, the design may be improved by selecting amplifiers and further components that are optimized for low noise and high thermal stability. Corresponding data related to the computation of compensation values may be determined as a function of properties of the above system components, e.g., as part of a calibration routine or during use, and improved using assumptions (e.g., models, data from spec sheets) or using data from further system components (e.g., calibration data stored in a memory) as outlined above.

In some embodiments, the compensation unit may use data from a memory or may infer data related to compensation values from past observations. For example, a compensation unit may compare data related to an UWB signal traveling between a self-localizing apparatus and a first transceiver with data related to an UWB signal traveling between a self-localizing apparatus and a second transceiver to compute an antenna delay associated with the self-localizing apparatus. As another example, a compensation unit may compare data related to multiple UWB signals traveling between multiple transceivers to compute idiosyncratic delays for each transceiver. As another example, a compensation unit may compare data related to UWB signals traveling between a self-localizing apparatus and multiple transceivers with data from a localization unit to compute idiosyncratic delays. As another example, a compensation unit may compare data related to UWB signals traveling between a self-localizing apparatus and a transceiver at a first point in time or at a first location with data related to UWB signals traveling between a self-localizing apparatus and a transceiver at a second point in time or at a second location to compute idiosyncratic delays. In some embodiments, similar comparisons may be used to allow the compensation unit to compute other compensations, including those listed in earlier examples.

Strategies similar to those outlined above for the compensation unit and UWB signals may also be used by the synchronization unit or for UWB clock synchronization signals.

It will be understood that while compensation and various aspects thereof are sometimes explained for signals travelling between an apparatus and a transceiver, explanations may be equally valid, and analogously used, for signals travelling between two apparatuses or two transceivers.

A control unit is used to generate control signals for actuators in dependence of data received from a localization unit (e.g., a position estimate) or of sensors (e.g., an onboard sensor) or of a global property (e.g., an atmospheric pressure).

The control unit can implement control laws that are well-established in the prior art or widely used. Examples of such control laws include PID control; model predictive control; sliding mode control; full state feedback; and backstepping control. Depending on the control law, the control unit may use state estimates provided by a localization unit.

A control unit may compute control signals for a single actuator. In some embodiments, a control unit computes different sets of control signals for different sets of actuators. For example, a control unit may compute a first set of control signals for two actuators of a first module or axis of a robot and a second set of control signals for a second module or axis of a robot.

Actuators may belong to the group of electric, magnetic, and mechanical motors moving or controlling a mechanism or system. Examples include a piezoelectric actuator, a brushless electric motor, and a servo motor.

In some embodiments, the apparatus' actuator is configured to move the apparatus in its three translational degrees of freedom. In some embodiments, the actuator is configured to move the apparatus in its three rotational degrees of freedom. In some embodiments, the actuator is structured and arranged to move a part of the apparatus, such as the antenna or an effector. In some embodiments, multiple actuators are used in conjunction.

In some embodiments, the apparatus' actuator is configured to move the apparatus' position by at least 30 cm. In some embodiments, the apparatus' actuator is structured and arranged to move the apparatus' position by at least 100 cm. In some embodiments, the apparatus' actuator is structured and arranged to move the apparatus' rotation by at least 30 degrees. In some embodiments, the apparatus' actuator is structured and arranged to move the apparatus' rotation by at least 90 degrees.

FIG. 1A shows a block diagram of an illustrative localization system 100 (sometimes referred to herein as a "network") that includes three transceivers 110 and two self-localizing apparatuses 130. Each of the three transceivers 110 transmits timestampable localization signals 102. In some embodiments, the three stationary transceivers 110 have known relative locations to each other. In some embodiments, the three transceivers 110 have synchronized clocks 300. Transceivers are sometimes referred to herein as "anchors" or "beacons". It will be understood that while three transceivers and two self-localizing apparatuses are illustrated in FIG. 1A, any suitable numbers of transceivers and self-localizing apparatuses may be used in localization system 100.

The two mobile self-localizing apparatuses 130 receive the timestampable signals 102. Each mobile self-localizing apparatus 130 may use signals 102 to compute its location relative to transceivers 110. In some embodiments, this is achieved by timestamping the signals 102, converting the timestamps to distances, and using these distances to compute the relative location. This conversion can use an estimation of the speed of the signals 102 in the transmission medium (e.g., the speed of light in air). This conversion may be accomplished using a localization unit 152. Localization unit 152 may compute the self-localizing apparatus' location relative to the known locations of transceivers 110 by trilateration or multilateration. Sufficiently accurate timestamping may be provided by digital reception electronics 148 and a clock 300.

Each transceiver 110 in FIG. 1A comprises analog electronic components and digital electronic components. An antenna 112 is coupled to analog transmission electronics 116. Analog transmission electronics 116 may generate an analog transmission signal from at least one digital data packet. Digital data packets are provided by digital transmission electronics 118. The analog transmission signal can be generated using an analog pulse generator. The analog transmission signal may also be amplified by an amplifier before being passed to antenna 112 for transmission.

In FIG. 1A, transmission electronics 116, 118 are used to convert payload data (sometimes called "payload") into signals 102 that may then be transmitted by transmitters 110. Here, an UWB signal 102 is used. A single UWB signal 102 transmitted by a single transceiver 110 can be received by a plurality of apparatuses 130. Each apparatus may use information gained from multiple signals 102 to compute its location without emitting signals of its own.

Clock 300 is coupled to transmission electronics 116, 118 and provides timing information for transmitting UWB signals 102. Clock 300 may include an onboard clock or may have a wireless or wired connection (not shown) that receives a time information from an offboard clock (not shown), e.g., at a remote location.

Transmissions (e.g., the UWB signals 102) from three transceivers 110 may be coordinated using a scheduling unit 150, which is operable to schedule the transmission of UWB signals 102. Scheduling unit 150 may provide sufficient time separation between UWB signals to prevent transceiver messages from arriving at a receiver's antenna 132 without adequate time separation, which can result in degraded signal detection and hence reduced performance of localization system 100. In some embodiments, scheduling unit 150 may implement an ALOHA protocol to reduce or prevent the effect of insufficient time separation. In some embodiments, signal transmission may follow a pre-programmed sequence, or scheduling may be performed centrally and a schedule communicated to each transceiver. In some embodiments, scheduling may be performed by each transceiver. For example, the scheduling for a transceiver may be based on information stored by the transceiver about the other transceivers (e.g., an ordered list or a broadcast schedule of the other transceivers in range).

Analog transmission electronics 116 is coupled to digital transmission electronics 118 and together they allow the transmission of UWB signals 102. Such transmissions may be performed such that the transmission of signal 102 from antenna 112 occurs accurately at a specified transmission time relative to clock 300. This can be achieved using digital transmission electronics 118. Digital transmission electronics 118 may coordinate its operation with scheduling unit 150. The transmission of a signal at a specified time is preferably performed such that a specific symbol is emitted from the antenna 112 at the specified time. For transmissions that follow the IEEE 802.15.4 standard, a common choice for the symbol to be transmitted at that time is the beginning of the start-of-frame delimiter, i.e., the point at which the transmitted signal changes from the repeated transmission of the preamble code to the transmission of the start-of-frame delimiter. Digital transmission electronics 118 may use the signal provided by the clock 300 as a reference in this transmission at said specified time; the transmission time can therefore be expressed relative to this clock.

The two self-localizing apparatuses 130 shown in FIG. 1A are each configured to receive the UWB radio signals 102 transmitted by transceivers 110 through an antenna 132, analog reception electronics 136, and digital reception electronics 148. The reception electronics 136, 148 may accurately determine the reception times at which the transmitted signals reach the antenna 132. Determining a signal's reception time ("timestamping") may be carried out by determining the time at which a symbol is detected. For transmissions that follow the IEEE 802.15.4 standard, a common choice for the symbol to be timestamped is the beginning of the start-of-frame delimiter (i.e., the point at which the transmitted signal changes from the repeated transmission of a preamble code to the transmission of the start-of-frame delimiter). Digital reception electronics 148 uses a signal provided by the apparatus' clock 300 as a reference in this timestamping process. The timestamp may be therefore expressed relative to this clock. In some embodiments, clock 300 comprises an onboard clock. Reception electronics 136, 148 may also provide additional metrics related to received signals 102. Quality metrics may, for example, include signal strength, reception time standard deviation, or noise properties of the signal. Quality metrics may be computed based on absolute values (e.g., an absolute signal strength) or based on relative values (e.g., a difference of signal strengths). Quality metrics may also be computed by comparing signals. For example, quality metrics may be computed based on comparisons of a signal over time, on comparisons between signals from different transceivers, on comparisons of signals received from different directions, on comparisons of signals with thresholds, on comparisons of signals with their expected property, and others. Comparisons may use individual signal properties (e.g., the peak power) or entire signals (e.g., the signal's spectral shapes). Quality metrics may, for example, be used to determine whether a signal 102 travelled in line of sight, or what material it may have traversed, or how it may have been reflected.

Each apparatus 130 may further comprise a global property sensor 158. Global properties may allow a more accurate computation of the relative location of a self-localizing apparatus 130 by providing additional reference data with respect to a reference point (e.g., a transceiver or a coordinate system). This can be achieved by equipping at least one transceiver 110 and a self-localizing apparatus 130 to detect the global property. The localization system's accuracy may be improved by a method comprising the steps of: (i) transmitting a transceiver's global property reading to an apparatus, by (ii) comparing the transceiver's reading of the global property at its location and the apparatus' reading of the global property at its location, by (iii) using a model of the global property ("global property model") to translate the comparison into data related to an orientation, position, or movement, and (iv) appropriately fusing that data with other sensor data by using an estimator. Steps (ii) and (iii) may be accomplished using a localization unit 152, such as the one shown as part of apparatus 130 in FIG. 1A. Global property models allow conversion of one or more readings of the global property into data that can be processed by the localization system (e.g., the equation describing atmospheric pressure as a function of altitude/height). Models can take various forms, such as functions or look-up tables.

The use of data from one or more global property sensors 156, 158 in addition to other data provided by the localization system 100 such as data from local, onboard sensors 155, may be particularly useful in the presence of systematic sensor errors or sensors with a high noise rate. For example, in an exemplary embodiment for an outdoor installation, an apparatus and multiple transceivers may be equipped to receive GPS signals in addition to UWB signals 102. This may allow the apparatus to not only determine its position relative to the transceivers, but also relative to a global reference frame using a localization unit 152. Additionally, this combination of localization modalities may allow detection of erroneous data by comparing readings from two independent measurement systems. The localization system may be further improved by equipping the transceivers and the apparatus with additional sensors 156, 158 to detect global properties, such as barometers. This may be particularly useful to allow a localization unit 152 to achieve more accurate, more reliable, or faster localization in the vertical direction, for which both GPS and UWB may provide poorer information because of unfavorable positioning of UWB transceivers (often all on the ground plane, below apparatuses) and GPS satellites (high in the sky, typically high above apparatuses).

Global signals may also be used to determine the relative orientation of a communicating transceiver's antenna 112 and a receiver's antenna 132, which can have an important influence on signal quality or group delay and hence on their computed relative location. Determining orientation can, for example, be achieved by detecting the gravity vector of the transceiver (e.g., using an accelerometer), communicating this information to the apparatus (e.g., as part of the payload of the UWB signal), and comparing it with the gravity vector detected by the apparatus (possibly corrected for the influence of apparatus' motion) using a model for each of the transceiver's and apparatus' antenna orientation relative to their accelerometer. This comparison can be performed by a compensation unit.

In addition to using a sensor for a global property 158 as outlined above, each self-localizing apparatus may also be equipped with an onboard sensor 155.

Localization unit 152 uses data to compute a location estimate. Data may include UWB signals 102, data from one or more onboard sensors 155, data from one or more offboard sensors 156, data from one or more global property sensors 156, 158, or other data. Data related to UWB signals 102 may include payload, timestamps, signal characteristics (e.g., signal strength, peak shape, etc.), or others. This may be achieved by computing an estimate of the position (and, possibly, orientation or motion) of the apparatus 130 based on fusing current values of the data and other information (e.g., knowledge of input history, a dynamic model of the apparatus) using an estimator.

Each individual received UWB signal 102 may be used recursively to provide an updated (posterior) position estimate by merging it with a previous (prior) estimate. In some embodiments, (extended) Kalman Filters, complementary filters, particle filters, Luenberger observers, or any other suitable technique can be used to recursively compute an estimate.

The localization unit 152 may collect several UWB signal receptions by storing them in memory and batch-processing them (either after receiving a predefined number of signals, or at fixed intervals). Batch-processing methods may be based on multilateration techniques by solving the time difference of arrival (TDOA) measures for the position of the apparatus 130.

In some embodiments, a combination of recursive and batch processing may be used.

A memory unit (not shown in FIG. 1A) may be used to store information, such as received UWB signals 102, for batch processing, the current location estimate, or parameters for the recursive computation and sensor fusion. Localization unit 152 may also use data (e.g., compensation values) from a compensation unit (not shown in FIG. 1A) or information about received UWB signals 102 generated by the digital reception electronics 148 (e.g., quality metrics).

A reason for variation in signal quality or group delay may be that transceivers and apparatuses are small and may operate in relative proximity to each other. This may result in a large variety of relative orientations, relative distances, and relative directions of transmitter antenna 112 to receiver antenna 132 used in a typical application and encountered during typical use, such as multiple transceivers situated on a plane with apparatuses operating above or below the plane, or multiple transceivers situated around a volume with apparatuses operating inside the convex hull of the volume.

Unlike in other localization systems, here signals 102 arriving at the apparatus can be of varying quality or can have different group delay. In some embodiments, localization unit 152 may be used to improve the location estimate over prior localization systems by using specifics of UWB signals as well as quality metrics related to the received UWB signal, such as those provided by reception components (e.g., UWB peak signal strength, UWB peak shape). This may, for example, be achieved by relating the measurement variance to a signal metric such that measurements with higher variance have a lower impact on the localization unit's state estimate. As another example, the localization unit may put more emphasis on data that is independent of the UWB signal (e.g., inertial sensors, global properties). As another example, the localization unit may entirely discard measurements from certain transceivers that do not meet a quality metric such as a minimum signal quality or group delay.

Unlike prior systems, localization unit 152 may here be situated on apparatus 130 because the UWB signals travelling from the transceivers to the apparatus can contain enough information to allow the apparatus to self-localize. For example, transceivers may be synchronized and their locations may be known to the apparatus.

A transceiver's position, orientation, or motion may change during use. Localization unit 152 may account for such changes. As outlined above, in some embodiments, transceivers in the network are assumed to have known locations. A change in these locations, such as that caused by an accidental movement of a single transceiver, may reduce localization performance. This may be avoided by equipping a transceiver 110 with a sensor (not shown) operable to detect such an accidental movement, such as an accelerometer. The transceiver may then monitor the sensor readings and, if it passes a certain threshold, communicate it to a localization unit (e.g., by transmitting the corresponding information as part of the transceiver's UWB signal 102). The localization unit can then correct for this change in the transceiver's position, orientation, or motion, e.g., by discarding measurements of the concerned transceiver for a period of time or by putting less emphasis on them as described above. A localization system may also detect this type of disturbance by equipping a transceiver to monitor its own location (e.g., by recording its location in a memory and by regularly re-evaluating its location, e.g., by rerunning a transceiver position calibration).

During typical use an apparatus 130 may operate close to and move around obstacles in the space. Localization unit 152 may account for that and other known factors affecting the quality of information furnished by an individual transceiver. For example, localization unit 152 may use a map of the relative location of transceivers and obstacles and an estimate of the apparatus' location in a space to determine that an UWB signal traveling from a certain transceiver to the apparatus has likely passed through an obstacle or been reflected. It may then use this information to correct its estimate of the location as described above, possibly taking into account further information such as the obstacle's properties (e.g., thickness, material, or shape of the obstacle).

The localization system may use approaches like multilateration or trilateration, which result in different sensitivity to measurement noise based on the spatial distribution of transceivers and the location of the apparatus. Localization unit 152 may account for the variation in the quality of information furnished by individual transceivers by accounting for their spatial distribution and correct its estimate of the location as outlined above by accounting for known topologies of the transceivers' or apparatus' relative locations or orientations (e.g., during position calibration and stored in a memory). Even partial knowledge, such as the antenna orientations of a subset of transceivers (e.g., as determined by transceivers' sensors and communicated to localization unit 152), may be valuable and may be used to improve estimates. Moreover, assumptions, such as assuming that all transceivers are positioned in a plane or that all transceivers are stationary, may significantly improve localization accuracy by providing additional constraints for data processing. Such prior knowledge, even if partial or very approximate, may be used to initialize the localization unit (e.g., to provide a prior for a localization unit's initial position estimate). Moreover, a global property detected by global property sensors 156 on multiple transceivers 110 may be used to improve localization accuracy by providing additional information for data processing.

In addition, accuracy of estimates computed by localization unit 152 may be significantly improved by sharing information between multiple transmitters or apparatuses. For example, obtaining ranging estimates from more than four transceivers at a self-localizing apparatus results in an over-determined system, which allows the self-localizing apparatus to significantly reduce localization error, e.g., by solving for a least-squares solution. As another example, multiple apparatuses may exchange or pool their data to improve their estimates in specific regions of the space or at specific times during their operation.

Global property sensors 156, 158 may further improve localization unit's 152 performance by providing additional data available at both transceivers 110 and apparatus 130.

Localization unit 152 may provide various outputs (e.g., positions, velocities) in various formats. In some embodiments, it outputs position and heading information in the NMEA 0183 format (a standard format used for GPS receivers).

FIG. 1B is a block diagram of illustrative transceivers 110 in accordance with some embodiments of the present disclosure. Each of transceivers 110 may include an antenna 112 that is coupled to both analog transmission electronics 116 and analog reception electronics 160. Some embodiments, a TX/RX-switch is used to connect the antenna to one or the other of electronics 116, 160. In some embodiments, transceivers 110 may be used in localization system 100 of FIG. 1A.

Analog reception electronics 160 is coupled to digital reception electronics 164 and together they allow the reception of UWB signals 102 transmitted by other transceivers 110. Analog and digital reception electronics 160, 164 may have similar capabilities to the ones on self-localizing apparatus 130 of FIG. 1A. For example, analog and digital reception electronics 160, 164 may convert UWB signals 102 into data (the payload), accurately determine the time at which the transmitted signal reached antenna 132, and may provide additional quality metrics related to received signal 102 such as signal strength, reception time standard deviation, and metrics for determining whether the signal travelled in line of sight or not, among others.

Digital reception electronics 164 are operationally coupled to a synchronization unit 174, which may be used to identify and compensate for a clock 300 of any one transceiver not running in perfect synchrony with the clocks of the other transceivers. Upon reception of an UWB radio signal, the received data, timestamp, and quality metrics are sent to synchronization unit 174. Synchronization unit 174 may compare the reception time stamp to previous reception time stamps, to transmission time information included in the data (payload) of the UWB transmission 102, and to transmission time information included in previous UWB transmissions 102. From this information, synchronization unit 174 may compute the current behavior of clock 300 such as, for example, its current clock rate, or the current rate of change of the clock rate. In addition, synchronization unit 174 may determine the time-of-flight of UWB signals between stationary transceivers by evaluating the discrepancy between locally measured reception timestamps, locally set transmission times, measured reception timestamps reported from other transceivers, and set transmission times of other transceivers. Through careful correction for errors such as differing clock offsets, clock rates, and signal propagation times, synchronization unit 174 may compute a correction to allow the transceivers to obtain a common, synchronized reference time. In some embodiments, synchronization uses UWB signals 104.

Time synchronization between the transceivers is beneficial because any offset in transceiver timing may translate into errors in the localization of the self-localizing apparatus.

Transceiver 110 of FIG. 1B may also include a sensor 154 and a global property sensor 156. Both of these sensors are coupled to digital transmission electronics 118. This enables signals representative of the measurements taken by sensor 154 and global property sensor 156 to be included in the data that is transmitted by digital transmission electronics 118, analog transmission electronics 116, and antenna 112 in the form of UWB signals 102.

Figure 6:
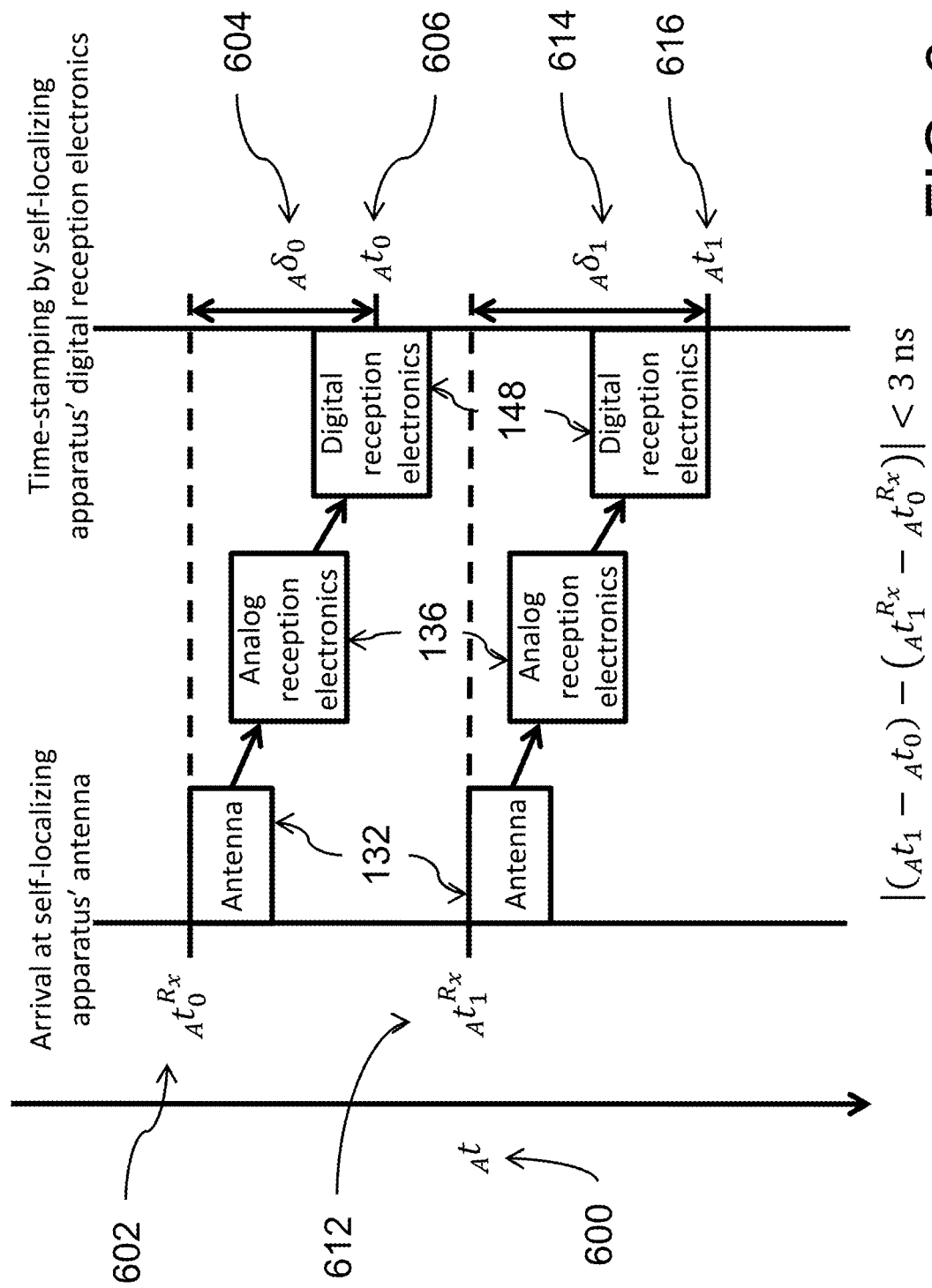
FIG. 6 is an illustrative timing diagram in accordance with some embodiments of the present disclosure.
Figure 9B:
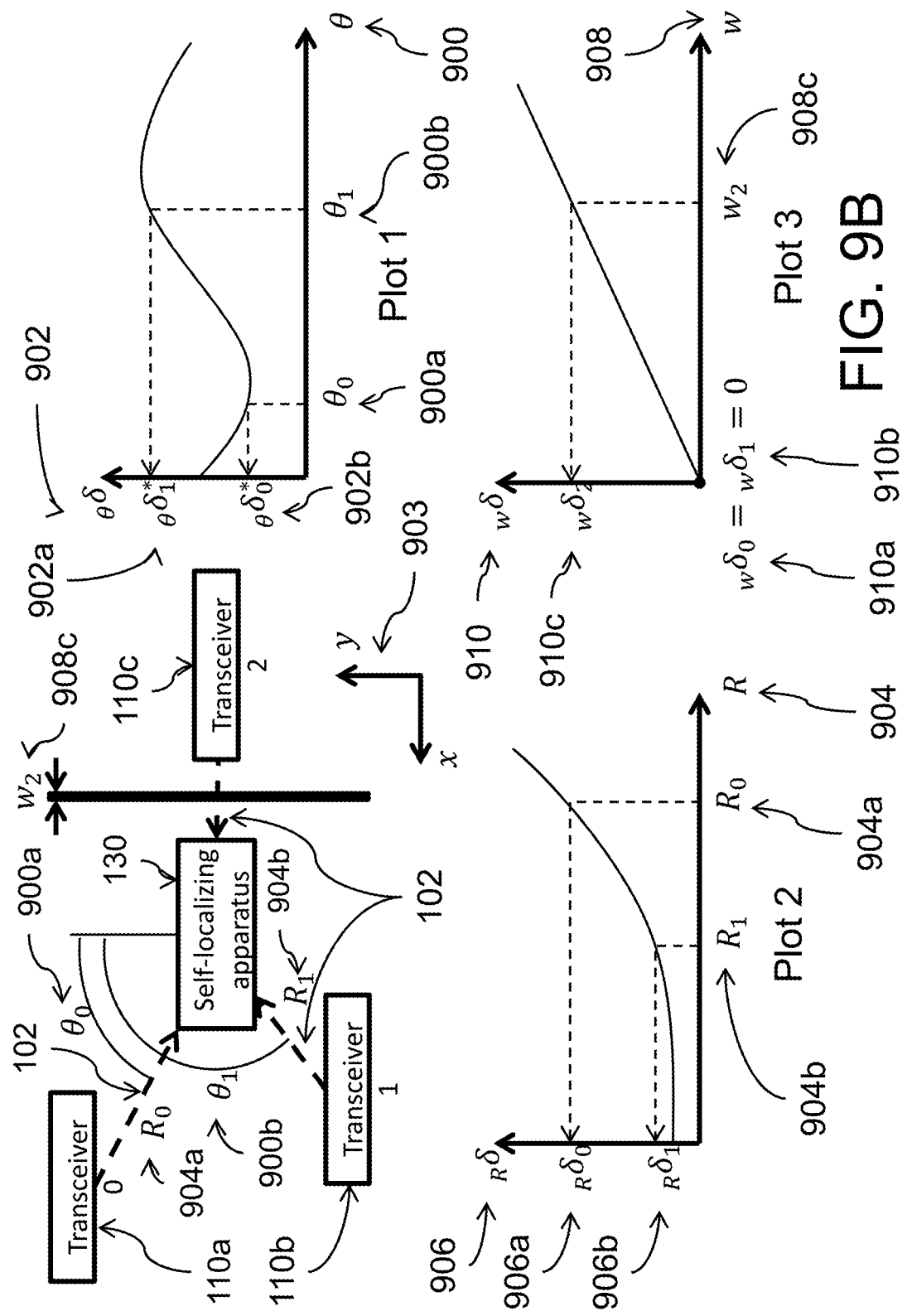

In some embodiments, a sensor 154 or a global property sensor 156 may be used to sense a transceiver's orientation. With knowledge of the transceiver's orientation, a self-localizing apparatus (e.g., apparatus 130) that receives that receives an UWB signal from that transceiver may be able to compensate for signal delays introduced by the relative orientation of the transceiver's antenna 112 to the self-localizing apparatus' antenna (e.g., antenna 132). This may, for example, be achieved by communicating the transceiver's detected orientation as part of its transmitted UWB signal. In FIG. 6 and FIGS. 9A and 9B, delays introduced by the relative orientation of antennas 112 and 132 are further described, and a method for compensating these delays is described.

Each transceiver 110 may be equipped with memory 170, which may be used to store data such as configuration data, desired signal amplification, synchronization data (e.g., offsets or rate corrections for clocks), or range accuracy calibration data. Memory 170 may also be used to buffer data after reception and before transmission. In some embodiments, memory 170 can be rewritten multiple times or is non-volatile memory.

The illustrative transceiver shown in FIG. 1B may also include a position calibration unit 180. Position calibration unit 180 may be used to compute an estimate for the position of a transceiver 110 (e.g., the transceiver's location relative to other transceivers). This may, for example, be achieved using techniques similar to those that may be used by a localization unit 152. For example, position calibration unit 180 may fuse data from an onboard sensor 154 and an onboard global property sensor 156 (connection not shown in FIG. 1B) with data from its memory 170 and with data from other transceivers received via the digital reception electronics 164 to obtain a position estimate. The computed position estimate may then be stored in a memory 170. It may also be communicated to other transceivers 110 or self-localizing apparatuses (e.g., apparatus 130 of FIG. 1A), e.g., as part of a signal sent through digital transmission electronics 118.

FIG. 1B shows illustrative transceivers that receive and process wireless signals 104 from other transceivers (sometimes referred to herein as "wireless transceivers" or "wireless UWB transceivers"). This is enabled by transceivers 110 having analog reception electronics 160 and digital reception electronics 164, which are operable to receive signals 104 transmitted by other transceivers 110.

A first transceiver 110 may use one or more signals 104 from a second transceiver 110 or from a plurality of other transceivers 110 to adjust its transmission schedule to, e.g., provide better time separation between transmissions. This may, e.g., be achieved by scheduling unit 150 storing in a memory 170 the times at which signals 104 were received from other transceivers 110 in the network (e.g., network 100 of FIG. 1A), and subsequently adjusting the local transmission schedule based on these times. In some embodiments, better time separation between transmissions results in reduced interference between signals 102 or 104. In some embodiments, measurement of the time separation between signals 102 may be a metric used for assessing or when improving the performance of a localization network 100.

In some embodiments, signals 104 may be used by a transceiver 110 to indicate the occurrence of an event. In some embodiments, signals 104 may be used by a transceiver 110 to trigger an action by other transceivers 110. In some embodiments, the action results in the scheduling of signals 102. In some embodiments, dynamic transmission scheduling may be used to react to the addition or removal of transceivers from the system, as further explained below. In some embodiments, the reaction of the localization network (e.g., network 100 of FIG. 1A) to the addition or removal (e.g., due to a fault) of transceivers may be used as a metric to assess the robustness of the network.

In some embodiments, the ability of transceivers 110 to receive signals 104 from other transceivers enables the transceivers' position calibration units 180 to compute the distances between transceivers 110. In some embodiments, this may be used to define a coordinate system and transceiver locations relative to this coordinate system. In some embodiments, a coordinate system may be defined manually. For example, an operator may select an origin, a direction of a positive x-axis, and a direction of a positive y-axis for a visualization of known relative locations of a transceiver network. In some embodiments, a coordinate system may be defined based on the transceivers' locations. For example, a first transceiver may define the origin, a second transceiver the direction of the positive x-axis, and a third transceiver the direction of the positive y direction. In some embodiments, a coordinate system may be defined by entering the (x, y, z) positions of transceivers for storage in a memory. In some embodiments, the accuracy with which a transceiver network can compute distances between anchors may be used as a metric to assess the performance of the network.

In some embodiments, signals 104 may be the same signals used by self-localizing apparatuses (e.g., signals 102). In some embodiments, signals 104 may be in some way different from signals 102. For example, signals 102 and signals 104 may have a different payload. In some embodiments, signals 104 may be transmitted at different times than signals 102. For example, signals 104 may be transmitted during installation or during a calibration phase of a localization system, and signals 102 may be emitted when the system is in operation. Signals 104 and 102 may also differ in further ways (e.g., their signal strength, preamble, etc.). In some embodiments, the use of signals 102 and signals 104 may differ. For example, transceivers may emit signals 102 at a different update rate from that used with signals 104, or the signal emission may follow a different schedule.

Figure 3:
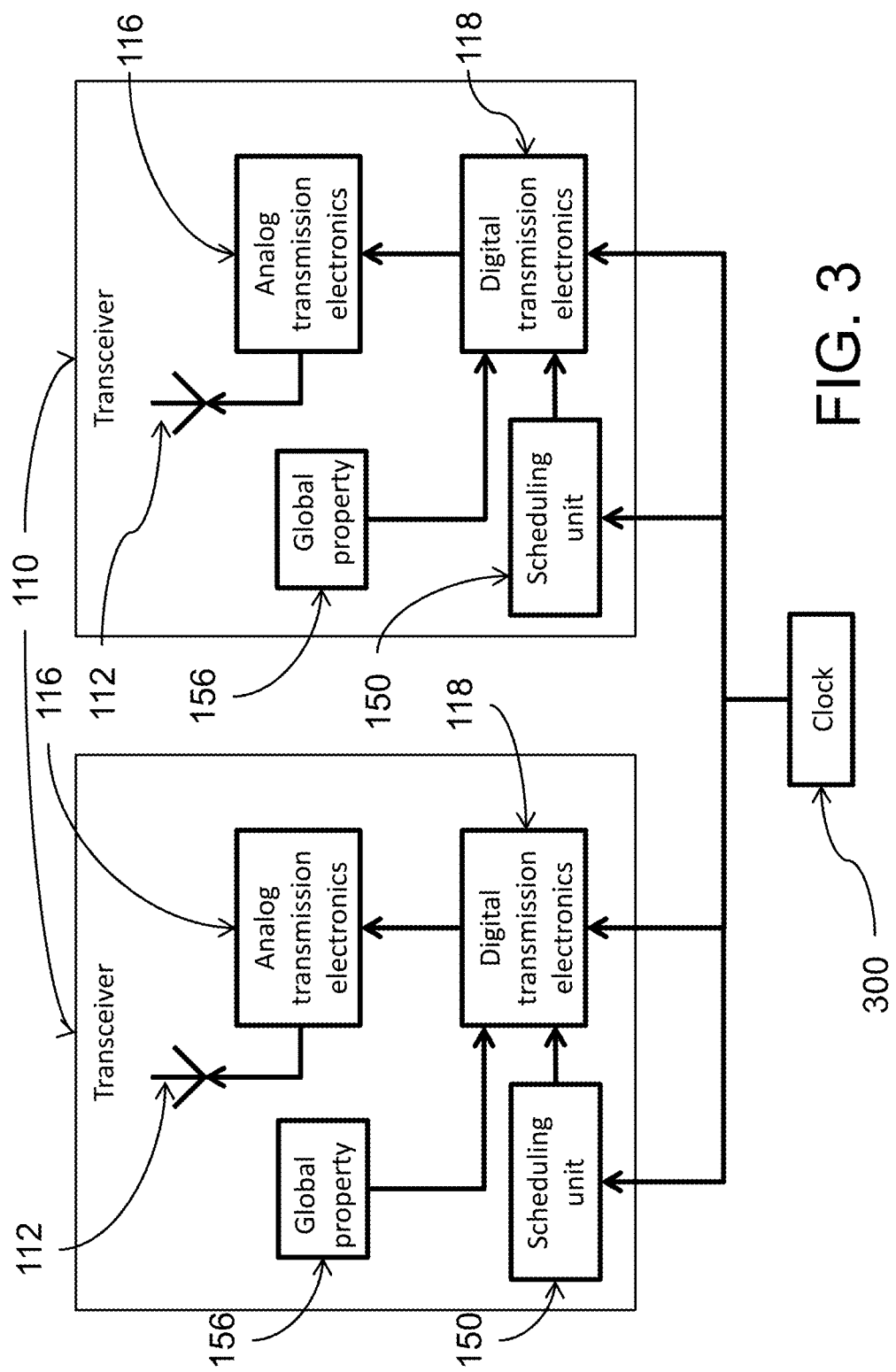
FIGS. 3 and 4 are block diagrams illustrating different system architectures for transceiver interconnection in accordance with some embodiments of the present disclosure.
Figure 4:
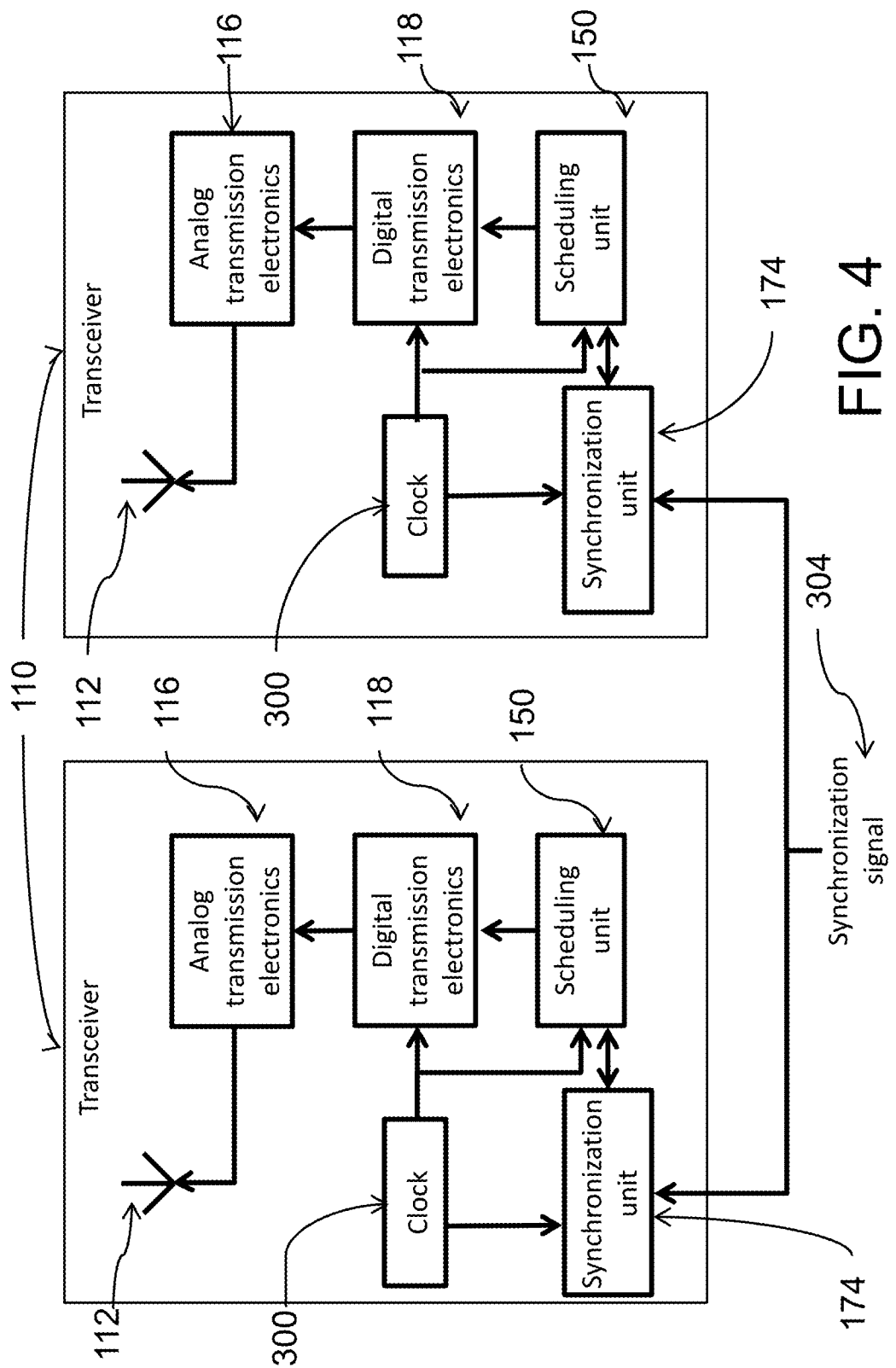

FIGS. 3 and 4 are block diagrams illustrating different system architectures that allow transceivers to synchronize the transmission of their UWB signals 102 in accordance with some embodiments of the present disclosure. The system architectures of FIGS. 3 and 4 may be used, for example, in system 100 of FIG. 1A.

FIG. 3 shows transceivers 110 that use a single, shared clock 300 and that are each equipped with their own scheduling unit 150. Alternatively, transceivers 110 may be configured to share a single clock 300 and a single scheduling unit 150 (not shown). This may be achieved by connecting a single clock and scheduling unit to each transceiver's digital transmission electronics 118.

FIG. 4 shows a different topology, with transceivers 110 each using their own clocks 300 and scheduling units 150. Here, an external synchronization signal 304, received by each transceiver's synchronization unit 174, is used to synchronize the transmission times of the transceivers' UWB signals.

Scheduling unit 150 determines the times at which UWB signals are transmitted by digital transmission electronics 118, analog transmission electronics 116, and antenna 112. The purpose of scheduling unit 150 is to schedule signal transmissions in such a fashion that collisions between signals from different stationary transceivers 110 are avoided as much as possible. For this purpose, a scheduling unit 150 may exchange information with a synchronization unit 174. This information is typically two-fold: Firstly, scheduling unit 150 may report at what times messages are being transmitted to the synchronization unit 174. Secondly, scheduling unit 150 may rely on information from the synchronization unit 174 about the synchronized reference time. In addition, scheduling unit 150 may be operationally connected to a memory (e.g., memory 170 depicted in FIG. 1B), which may provide information about the scheduling scheme and parameters that the scheduling unit requires to determine transmission times. Examples of scheduling schemes that scheduling unit 150 may implement are random access RA schemes, where transmission times are chosen randomly from a fixed distribution, and time division multiple access (TDMA) schemes, where individual transceivers are allocated certain transmission times. In schemes where the transmission times depend on signals from other transceivers, scheduling unit 150 would typically also be connected to digital reception electronics (e.g., digital reception electronics 164 depicted in FIG. 1B) in order to receive data from UWB transmissions of other transceivers.

In some embodiments, a fully distributed topology, where every transceiver contains a clock, a synchronization unit, and a scheduling unit, is used. In some embodiments, other topologies are used. In some embodiments, centralized topologies are used. For example, the topology shown in FIG. 3 depicts several transceivers sharing a single clock 300. In such a configuration, the system may be operated without synchronization units. Because the transceivers share the same single clock, they may be physically synchronized for example, by ensuring that the cable lengths the clock signal travels to individual transceivers are identical or their clock rates are given to be identical. Similarly, when each transmitter includes a clock, the clock synchronization may also be achieved by coupling synchronization unit 174 to a central synchronization signal 304 which provides a synchronization reference such as, for example, a low-frequency pulse signal to all synchronization units, as shown in FIG. 4. In addition, the individual scheduling units of the transceivers may be replaced by a single, central scheduling unit that centrally determines the transmission times for several anchors, as explained above. In some of the topologies, the transceivers may not include reception electronics because they do not require information transmitted from other transceivers.

In some embodiments, transceivers 110 may be connected in various wired or wireless communication topologies known in the art (mesh, P2P, etc.). In some embodiments, transceivers may communicate information related to the system's operation, such as positions, clock rates, clock offsets, signal shape, signal strength, synchronization, or calibration messages to each other or to receiving apparatuses.

Figure 5:
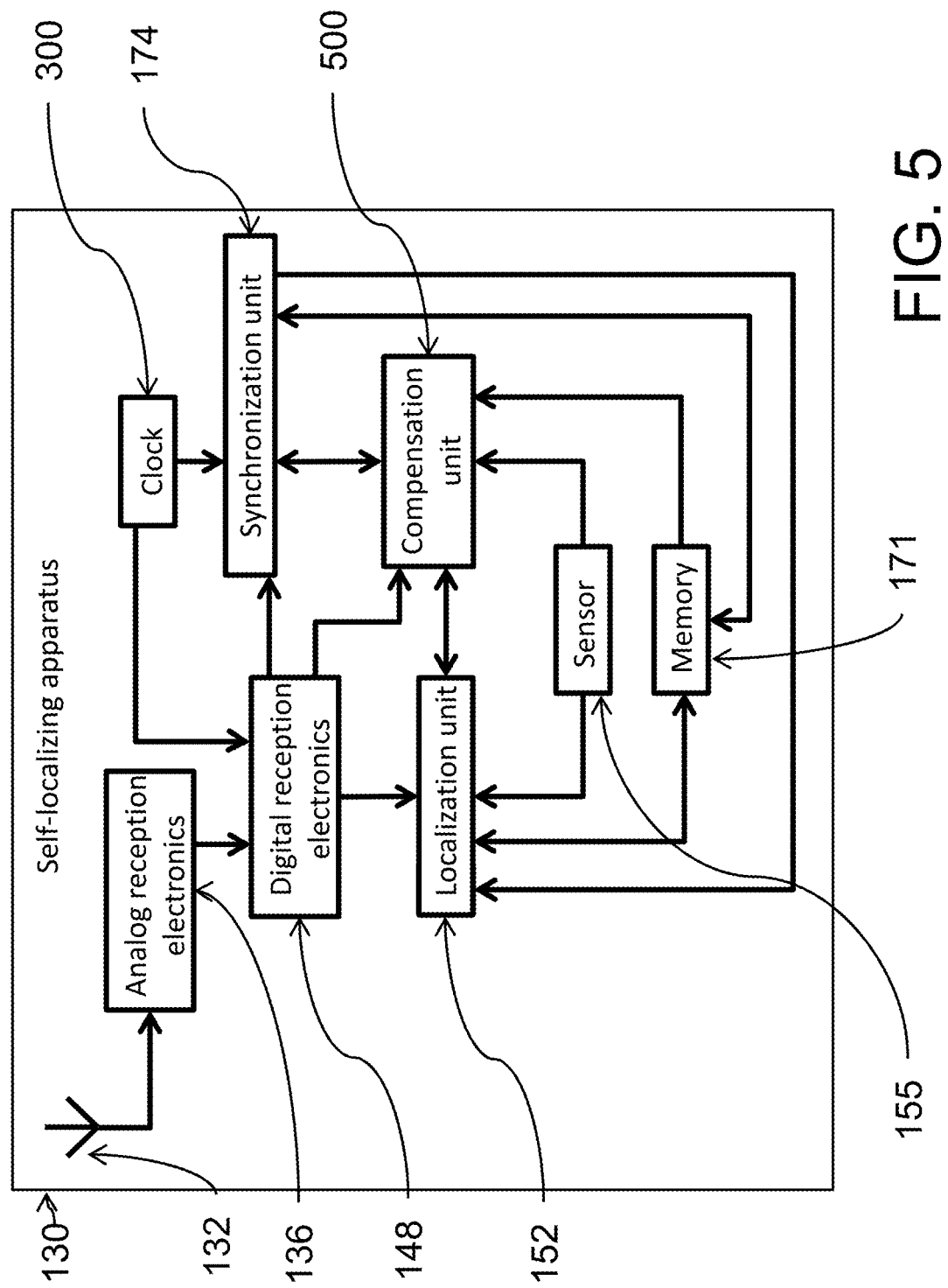
FIG. 5 is a block diagram of an illustrative self-localizing apparatus in accordance with some embodiments of the present disclosure.

FIG. 5 is a block diagram of an illustrative self-localizing apparatus 130 in accordance with some embodiments of the present disclosure. Self-localizing apparatus 130 comprises an antenna 132 for receiving UWB signals 102. Antenna 132 is operationally coupled to analog reception electronics 136, which may amplify the signal. Digital reception electronics 148 may then be used to timestamp the signal in reference to clock 300. A synchronization unit 174 may compare an input from clock 300 to inputs from other clocks (e.g., received as part of a synchronization signal or message from another part of the localization system and received by the digital reception electronics 148). Synchronization unit 174 may use this information to compute a clock correction for a clock rate or a clock offset, which it may communicate to localization unit 152 or compensation unit 500, or store in a memory 171. Additionally, information from compensation unit 500 may be used.

FIG. 6 is an illustrative timing diagram, which depicts the propagation of a received UWB signal through a self-localizing apparatus' antenna 132, analog reception electronics 136, and digital reception electronics 148 in accordance with some embodiments of the present disclosure. The interconnection of these components will be referred to as the reception pipeline. Each of these components introduces a delay to the propagation of the received signal. Time is shown on the vertical axis, where the notation $_At$ is used to indicate that time t is measured with reference to the clock of self-localizing apparatus A.

Considering a signal that arrives at time $_At_0^{Rx}$ 602 at antenna 132 of a self-localizing apparatus, the signal propagates through the reception pipeline, before its arrival is timestamped at time $_At_0$ 606 by digital reception electronics 148. The delay introduced by the pipeline (given by the difference between $_At_0$ 606 and $_At_0^{Rx}$ 602) is denoted $_A\delta_0$ 604 and is referred to as pipeline delay. Consider now a second signal that arrives at time $_At_1^{Rx}$ 612 at antenna 132 of the self-localizing apparatus and, after a pipeline delay of $_A\delta_1$ 614 through the reception pipeline, is timestamped at time $_At_1$ 616. The variation in pipeline delay between the two signals is given as $|_A\delta_1 - _A\delta_0|$. Note that this measurement is with respect to the clock of the self-localizing apparatus 130, and is thus independent of clock-rate offsets.

In some embodiments, the difference between pipeline delays 604 and 614 is less than 0.01, 0.6, 3, or 15 nanoseconds, which allows more accurate localization to be achieved.

Variation in pipeline delay is influenced by physical, measurable factors including the frequency response of the self-localizing apparatus' antenna 132, internal amplification and the accuracy and variation in the generation of timestamps by digital reception electronics 148. Since antennas are non-ideal electromagnetic devices, their frequency response is described by a reception-angle-dependent magnitude response corresponding to how much a radio signal is amplified or attenuated by the antenna, as well as a reception-angle-dependent phase response corresponding to how much a radio signal is delayed by the antenna. These responses are deterministic functions of the angle at which a signal is received and result in an electrical delay of the signal as it passes through antenna 132. In some embodiments, the signal's propagation through the analog reception electronics 136 and digital reception electronics 148 may be further delayed by internal amplification of the signal in order to achieve a consistent signal level, irrespective of received signal strength. Furthermore, the ability of digital reception electronics 148 to consistently and accurately timestamp the arrival of an UWB signal requires it to consistently and accurately identify the signal's "first-path". Errors in this identification, which are discussed below and illustrated further in FIG. 7A, result in a non-constant error in the timestamping process and thus a perceived delay in the signal's propagation time through the reception pipeline. In addition to systematic pipeline delays, in some embodiments random, external or unmodelled processes may also affect the pipeline delay, introducing non-systematic delays in the reception pipeline. In some embodiments, temperature is an example of such a process, whereby changes in temperature may influence the processing time required by digital reception electronics 148.

The effect of a non-constant pipeline delay is the introduction of non-constant error in the reception time of any UWB signal 102. It will therefore be apparent to one skilled in the art that a non-constant pipeline delay, as illustrated in FIG. 6, may correspond to a non-constant error in any time-of-arrival or time-distance-of-arrival measurement derived from the reception times of any UWB signals 102. A compensation unit 500 may, in some embodiments, compensate for this systematic, yet non-constant error, as illustrated in FIGS. 9A and 9B and discussed below.

FIG. 7A shows illustrative plots of channel impulse responses (CIR) of a channel through which an UWB signal 102 is received, with signal power E plotted against signal time delay t. A channel (sometimes referred to as a transmission channel) is a specific combination of frequency and bandwidth. For an UWB signal 102, the frequency is typically the center or carrier frequency. In the upper plot of FIG. 7A, CIR 700 is well defined and narrow in width. Furthermore, the noise floor 702, a property of the transmission channel, is low in comparison to the peak of the CIR 700. These features allow digital reception electronics (e.g., digital reception electronics 148, 164) to accurately and precisely detect the first path.

In the lower plot of FIG. 7A, CIR 700 is "wide" and not well defined. Furthermore, CIR 700 is less distinct from the noise floor 702. These features reduce the accuracy of the timestamping process, as performed by the digital reception electronics (e.g., digital reception electronics 148, 164). Such a CIR is typical for UWB signals that have passed through an obstacle or that have been subjected to a disturbance. Examples of obstacles include any medium that absorbs, distorts, disperses, or refracts the signal. Examples of disturbances include any other signal that interferes with the UWB signal. In some embodiments, a compensation unit (e.g., compensation unit 500) may partially or fully compensate for obstacles or disturbances due to the properties of the received signal.

The ability of the digital reception electronics (e.g., digital reception electronics 148, 164) to consistently and accurately timestamp UWB signals requires it to consistently and accurately identify the time at which the received signal's "first path" occurs. Multiple algorithms for this purpose are known, for example, "Leading Edge Detection" or "Search-Back".

In some embodiments, the accuracy of identifying this "first path", and thus the accuracy of the timestamping process, may be dependent on the strength of a signal received at an antenna (e.g., antenna 112, 132). The accuracy of timestamping may be affected by the ratio between the signal's strength and the level of noise floor 702, sometimes called a signal-to-noise ratio. A lower signal-to-noise ratio may result in a less defined peak in CIR 700. In some cases, the reception timestamp may be affected by geometric walking error, whereby the timestamp of a weaker signal is delayed in comparison to the timestamp of a stronger signal. Moreover, the accuracy of timestamping may depend on the shape of the CIR of the received signal.

Figure 7B:
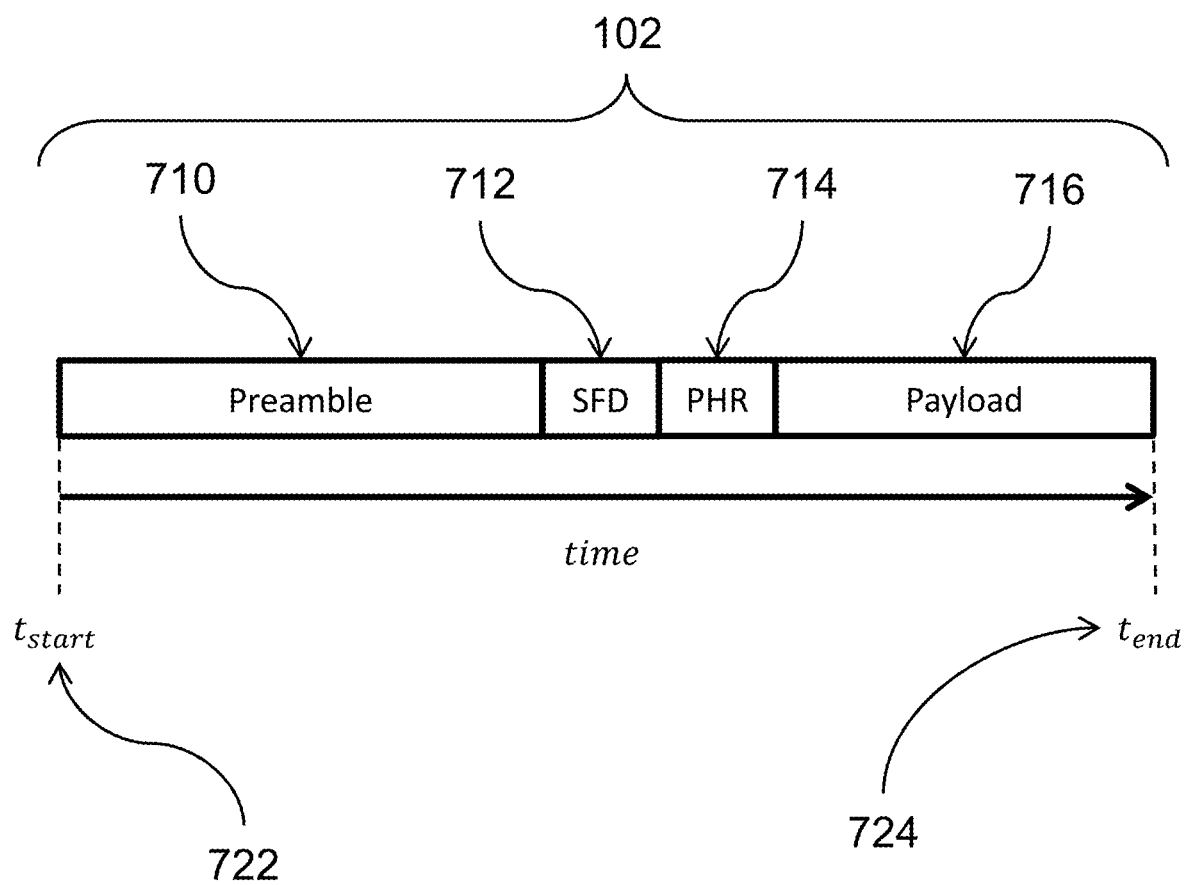
FIG. 7B is a diagram of an illustrative structure of an UWB signal in accordance with some embodiments of the present disclosure.

FIG. 7B shows an illustrative structure of an UWB signal 102 in accordance with some embodiments of the present disclosure. In some embodiments, the structure of UWB signal 102 is similar to that defined in IEEE standard 802.15.4. The same standard describes other aspects of UWB systems, such as the signal transmission process. The transmission of an UWB signal 102 begins a time $t_{start}$ 722 with the transmission of a preamble sequence 710. This sequence is typically predefined and known to both the transmitter (e.g., a transceiver 110) and receiver (e.g., a self-localizing apparatus 130) of UWB signal 102. In some embodiments, a preamble sequence 710 may be stored in memory. In some embodiments, a preamble sequence 710 may be configurable during system operation. In some embodiments, a preamble sequence 710 may be encoded by the interconnection of digital or analog electronic components.

In some embodiments, preamble 710 defines a sequence in which UWB radio pulses are transmitted on a specific transmission channel and with a specific rate. This rate may sometimes be referred to as the pulse repetition frequency. The pulse repetition frequency is typically known to both the transmitter and receiver of an UWB signal 102. In some embodiments, the pulse repetition frequency may be stored in memory. In some embodiments, the pulse repetition frequency may be configurable during system operation. In some embodiments, the pulse repetition frequency may be encoded by the interconnection of digital or analog components.

A receiver is typically capable of receiving an UWB signal 102 if it is configured to operate on the same channel, with the same preamble sequence 710, and with the same pulse repetition frequency as the transmitter of said UWB signal 102. In some embodiments, this may be achieved through appropriate configuration of the receiver's analog reception electronics (e.g., analog reception electronics 136) or digital reception electronics (e.g., digital reception electronics 148) or of the transmitter's analog transmission electronics (e.g., transmitter's analog transmission electronics 116) or digital transmission electronics (e.g., digital transmission electronics 118). In some embodiments, appropriate selection of channel or preamble 710 or pulse repetition frequency may enable receivers to receive UWB signals 102 from a specific subset of transmitters. In some embodiments, appropriate selection of channel or preamble 710 or pulse repetition frequency may enable transmitters to transmit UWB signals 102 to a specific subset of receivers. In some embodiments, appropriate selection of channel or preamble 710 or pulse repetition frequency may allow multiple UWB signals 102 to be transmitted simultaneously, with reduced interference or with no interference.

After transmission of the preamble 710, the transmitter transmits a start frame delimiter 712, to indicate the beginning of the UWB signal's data portion. After transmission of the start frame delimiter 712, the transmitter transmits a physical-layer header (PHR) 714, containing information pertaining to the encoding of the UWB signal's payload 716 (e.g., data rate). After transmission of physical header 714, the UWB signal's payload 716 is transmitted. In some embodiments, the payload is empty. In some embodiments, the payload contains information from a global property sensor 156. In some embodiments, payload 716 contains information from a position calibration unit 180. In some embodiments, the payload 716 contains information to facilitate synchronization by a synchronization unit (e.g., a synchronization unit 174). In some embodiments, payload 716 contains information to enable the scheduling of future transmissions by a scheduling unit (e.g., scheduling unit 150). In some embodiments, payload 716 contains information pertaining to prior transmitted or received UWB signals (e.g., UWB signals 102 or 104). In some embodiments, payload 716 contains other information. In some embodiments, payload 716 may contain multiple pieces of information. In some embodiments, payload 716 contains error-checking information that may be used to evaluate the integrity of the received payload 716. Transmission of UWB signal 102 ends at time $t_{end}$ 724 after transmission of the payload 716.

Through the detection and reception of an UWB signal's preamble 710, a receiver is able to detect the transmission of a start frame delimiter (SFD) 712. In some embodiments, the time at which the start frame delimiter 712 is detected is time stamped by the receiver's digital reception electronics (e.g., digital reception electronics 148). After detection of the start frame delimiter 712, the receiver is able to detect the physical header 714. Information encoded in physical header 714 may be used by the receiver to decode information encoded in the UWB signal's payload 716.

In some embodiments, payload 716 may be checked for errors. In some embodiments, payload 716 may be used within other units of the receiver. In some embodiments, payload 716 may be used to calculate a time difference. In some embodiments, payload 716 may be used to calculate a distance. In some embodiments, payload 716 may be compared with a measurement from the receiver's global property sensor (e.g., global property sensor 158). In some embodiments, the payload may be stored in a memory (e.g., memory 170, 171).

As will be apparent to one skilled in the art, while the present embodiments disclose a specific signal's structure similar to that defined in IEEE standard 802.15.4, many other signal structures are equally valid and may be used with the present disclosure.

Figure 8:
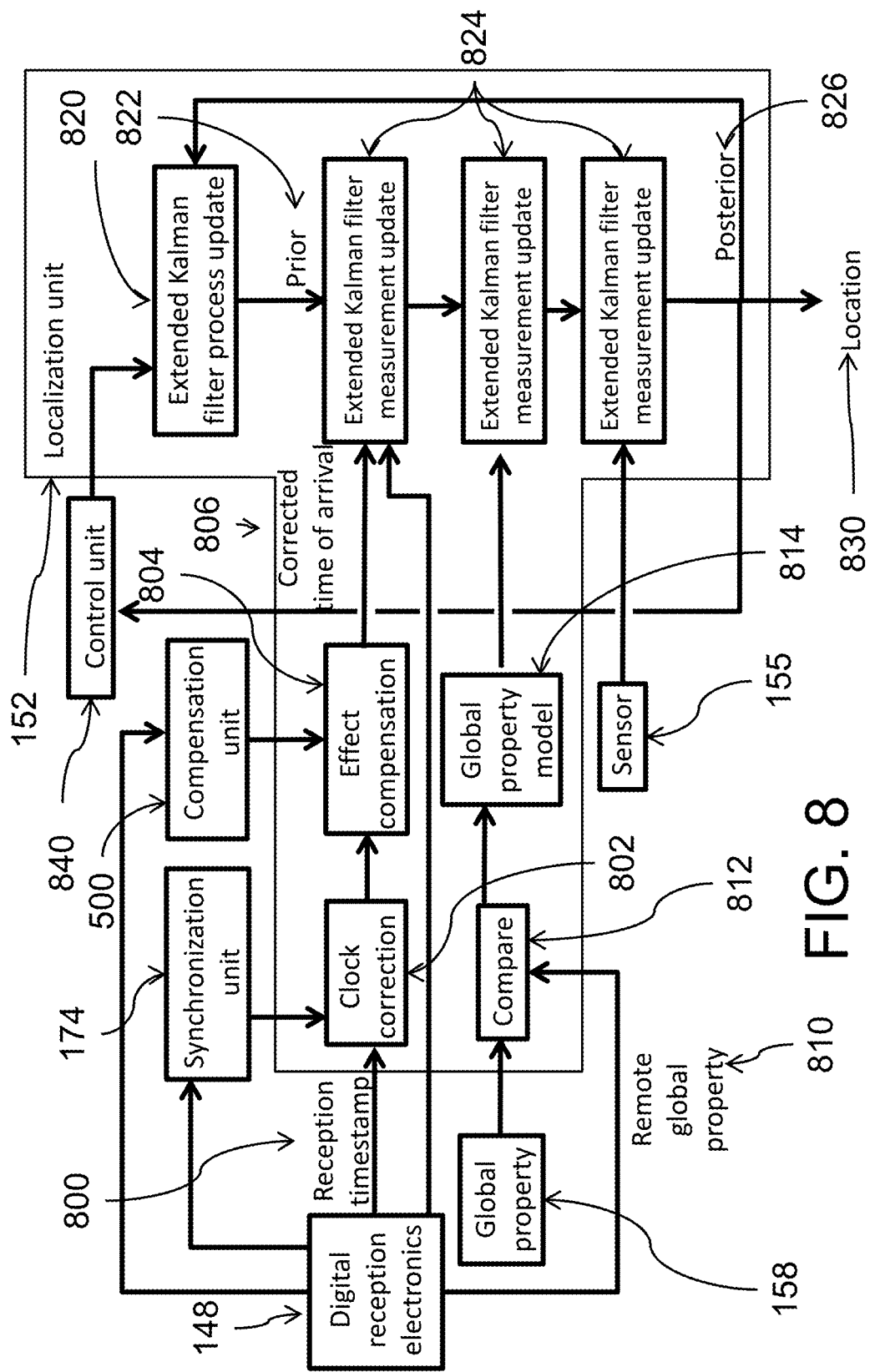
FIG. 8 is a block diagram of an illustrative localization unit 152, which includes a location update process, in accordance with some embodiments of the present disclosure.

FIG. 8 is a block diagram of an illustrative localization unit 152, which includes a location update process, in accordance with some embodiments of the present disclosure. The localization algorithm depicted in FIG. 8 takes the form of an extended Kalman filter (EKF). Localization unit 152 may be used with any suitable apparatus 130 of the present disclosure. At the beginning of a cycle, localization unit 152 performs a process update step 820, where it uses the previously estimated state of the apparatus and, if available, data from control unit 840 that is indicative of the signal sent to one or more actuators (e.g., actuator 1004 of FIG. 10). The result of this step is a prior estimate 822 (e.g., an estimate of the current state of an apparatus 130 that does not take into account any newly taken measurements). This prior estimate is then fused with available measurements. The prior estimate, measurements, and other data used by the localization unit 152 may be temporarily stored in a memory (not shown in FIG. 8).

A first kind of measurement is the reception of an UWB signal 102. In this case, the timestamp of the received signal 800 is first processed by a clock correction 802 (using data from synchronization unit 174) and an effect compensation 804 (using data from compensation unit 500). The resulting corrected time of arrival 806 represents an estimate of when the UWB signal reached an apparatus' antenna 132, which may then be fused with the prior estimate in an EKF measurement update step.

As stated above, the resulting corrected time of arrival 806 represents an estimate of when an UWB signal 102 reached the apparatus' antenna 132. In some embodiments, transmission information is included in the payload of the received UWB signal, which represents when the signal was transmitted and by which transceiver 110. The transmission information, together with the corrected time of arrival, is a measure for the distance between apparatus 130 and the transceiver 110. In localization unit 152, the corrected time of arrival and the transmission information may then be fused with the prior estimate in an EKF measurement update step 824.

A second kind of measurement, if new data is available, is data representative of a local measurement of a global property (e.g., from global property sensor 158). This data is then compared to data representative of remote measurement(s) (provided by digital reception electronics 148) of that global property (e.g., from global property sensor 158), and a global property model 814 provides information on how this comparison relates to the location, orientation, or motion of an apparatus 130. This information may then be fused into the state estimate in an EKF measurement update step 824. An example of a global property is the signal strength of a wireless signal. The free-space path loss of a radio frequency signal of frequency f transmitted over a distance d is:

$$FSPL(dB)=20 \log 10(d)+20 \log 10(f)+K,$$

with K being a constant that depends on the units used for d and f Through this equation, the distance of the self-localizing apparatus to the source of the wireless signal may be related to the distance of the transceiver(s) 110 to the same source.

A third kind of measurement, if new data is available, is from sensors such as sensors 154, 155. Such measurements may also be fused into the state estimate in an EKF measurement update step 824.

Synchronization unit's 174 estimate of the local clock behavior and the compensation unit's (not shown) estimate of compensation values may depend on the estimated location computed by the localization unit 152. This dependence may be resolved by first using the prior location estimate to compute clock behavior and compensation values, and by then computing a new posterior location estimate. This dependency may also be resolved by estimating the clock behavior or clock correction, compensation values, and location in parallel, or iteratively by alternating between 1) the computation of new clock behavior or clock correction and compensation value computation using the current location estimate; and 2) location estimation using the current clock and compensation values until the computed values have substantially converged.

FIGS. 9A and 9B show illustrative phenomena that can affect the accuracy of an UWB range measurement in accordance with some embodiments of the present disclosure. In some embodiments, these phenomena are partially or fully compensated for by a compensation unit (e.g., compensation unit 500).

FIG. 9A illustrates the compensation for a varying reception angle 900. Because physical antennas are non-ideal, electromagnetic devices, their frequency response is influenced by both the antenna gain (i.e., how much a radio signal is amplified or attenuated) as well as by the antenna phase response (i.e., how much a radio signal is delayed). This frequency response varies with angle 900 at which a radio signal is received. Therefore, UWB signals received at angle $\theta_0$ 900a will be amplified and delayed differently to UWB signals received at angle $\theta_1$ 900b.

This is illustrated in FIG. 9A, which shows two stationary transceivers 110a, 110b, and a self-localizing apparatus 130 within an environment. UWB signals 102 from transceiver 0 110a arrive with angle $\theta_0$ 900a at self-localizing apparatus 130, while signals 102 from transceiver 1 110b arrive with angle $\theta_1$ 900b at self-localizing apparatus 130. As previously discussed, the frequency response of the antenna is a function of reception angle 900 and thus results in signals from transceiver 0 110a having a different delay to signals received from transceiver 1 110b. This varying signal delay causes a varying delay in the signal timestamp and an error in the estimated distance to each transceiver. Being a function of reception angle, these delays are deterministic. In some embodiments, a compensation unit may be utilized to reduce or remove the effect of reception angle on the estimated distance.

An illustrative compensation is shown in Plot 1 of FIG. 9A, which shows reception angle $\theta$ 900 on the x-axis and delay $\delta$ 902 on the y-axis. This mapping allows the signal delay to be computed based on a known reception angle $\theta$ and thus compensated for by subtracting its effect from the generated reception timestamp using a compensation unit (e.g., compensation unit 500). In some embodiments, this function is a mathematical expression allowing delay $\delta$ to be computed for an arbitrary reception angle $\theta$. In some embodiments, this compensation may be computed by means of a lookup table, where known values of reception angle $\theta$ and delay $\delta$ are stored in a data structure (e.g., using a memory 171), and interpolation is used to estimate the delay $\delta$ for an arbitrary reception angle $\theta$ (e.g., using a compensation unit 500).

In some embodiments, one may observe the effect of the antenna's frequency response by positioning a self-localizing apparatus 130 within an environment covered by stationary transceivers 110, and then rotating the self-localizing apparatus around the origin point of its body coordinate system and observing a change in estimated distance to each of the stationary transceivers 110. These observations may be measured by apparatus 130 and used to compensate for the signal delay.

FIG. 9B illustrates further effects that may affect the accuracy of estimated distances. Three stationary transceivers 110 and a self-localizing apparatus 130 are located within an environment. Signals 102 from transceiver 0 110a arrive at self-localizing apparatus 130 with angle $\theta_0$ 900a, having traveled distance $R_0$ 904a, while signals 102 from transceiver 1 110b arrive at self-localizing apparatus 130 with angle $\theta_1$ 900b, having traveled distance $R_1$ 904b. Here, in addition to the delays due to relative orientation, as presented in FIG. 9A, the strength of each signal 102 is inversely proportional to the square of the distance travelled. In FIG. 9B, the distance $R_0$ 904a is larger than the distance $R_1$ 904b. Thus, the signal 102 from transceiver 0 110a may be weaker when received by self-localizing apparatus 130. The signal 102 may thus have a lower signal-to-noise ratio. In some embodiments, the signal 102 will require amplification prior to timestamping. Amplification may delay the signal timestamping ("amplification delay"). In some embodiments, amplification delay may be compensated by a compensation unit (e.g., compensation unit 500). In some embodiments, other comparable delays may also be compensated by a compensation unit. This may, for example, be used if the received signal strength is reduced (e.g., due to low transmission power, due to the previously described variable antenna gain, due to obstacles, etc.).

In some embodiments, a compensation unit (e.g., compensation unit 500) may compensate for these delays as shown in Plot 2 in FIG. 9B, which shows distance R 904 on the x-axis and delay $\delta$ 906 on the y-axis. This mapping allows the signal delay to be calculated based on a known distance R, and thus compensated for by subtracting its effect from the generated reception timestamp. In some embodiments, this function is a mathematical expression allowing delay $\delta$ to be computed for an arbitrary distance R by the compensation unit. In some embodiments, this compensation may be computed by means of a lookup table, where known values of distance R and delay $\delta$ are stored in a data structure (e.g., using memory 171), and interpolation is used to estimate the delay $\delta$ for an arbitrary distance R (e.g., using compensation unit 500).

In embodiments where received signal strength can be measured by the self-localizing apparatus, this mapping may be replaced with a mapping from received signal strength (related to distance through the inverse square law; and to antenna gain at reception angle $\theta$) to the delay $\delta$. The mapping may, for example, be stored in a memory (e.g., memory 171). In some embodiments, this compensation mapping may also consider delays introduced due to antenna phase response at reception angle $\theta$.

In addition to illustrating delay due to increased distance R, FIG. 9B further shows transceiver 2 110c, positioned such that signals 102 from transceiver 2 110c must propagate through some obstacle, prior to reaching self-localizing apparatus 130. Propagation through this obstacle introduces a deterministic delay to signal 102 based on its width $w_2$ 908c. This is due to the speed of light (and thus the speed of UWB signal 102) varying depending upon the medium through which the signal is propagating. Furthermore, depending on the obstacle's construction (e.g., the material from which it is made), the obstacle may reduce the strength of the signal 102 received by the self-localizing apparatus 130, or distort the received waveform. In some embodiments, a compensation unit 500 can compensate for these effects; for example, by using prior knowledge of the environment, by interpreting the characteristics of the received signal 102, including signal strength, noise floor, or CIR shape (see, e.g., FIG. 7A), etc.

Consider, for example, the case where a signal 102 is transmitted by transceiver 2 110c and travels through a solid glass window of thickness $w_2$=1 cm before being received at the antenna 132 of self-localizing apparatus 130. Due to its density, the speed of light is approximately 33% slower in glass than in air, and thus signal 102 travels slower through the glass, resulting in a slightly delayed arrival at antenna 132 of self-localizing apparatus 130. This delayed arrival translates to an error in distance measurement. In the prior example, for every 1 cm of glass, ~5 mm of distance error is incurred.

In some embodiments, a compensation unit (e.g., compensation unit 500) compensates for deterministic distance errors, for example those exemplified in FIGS. 9A and 9B.

Figure 10:
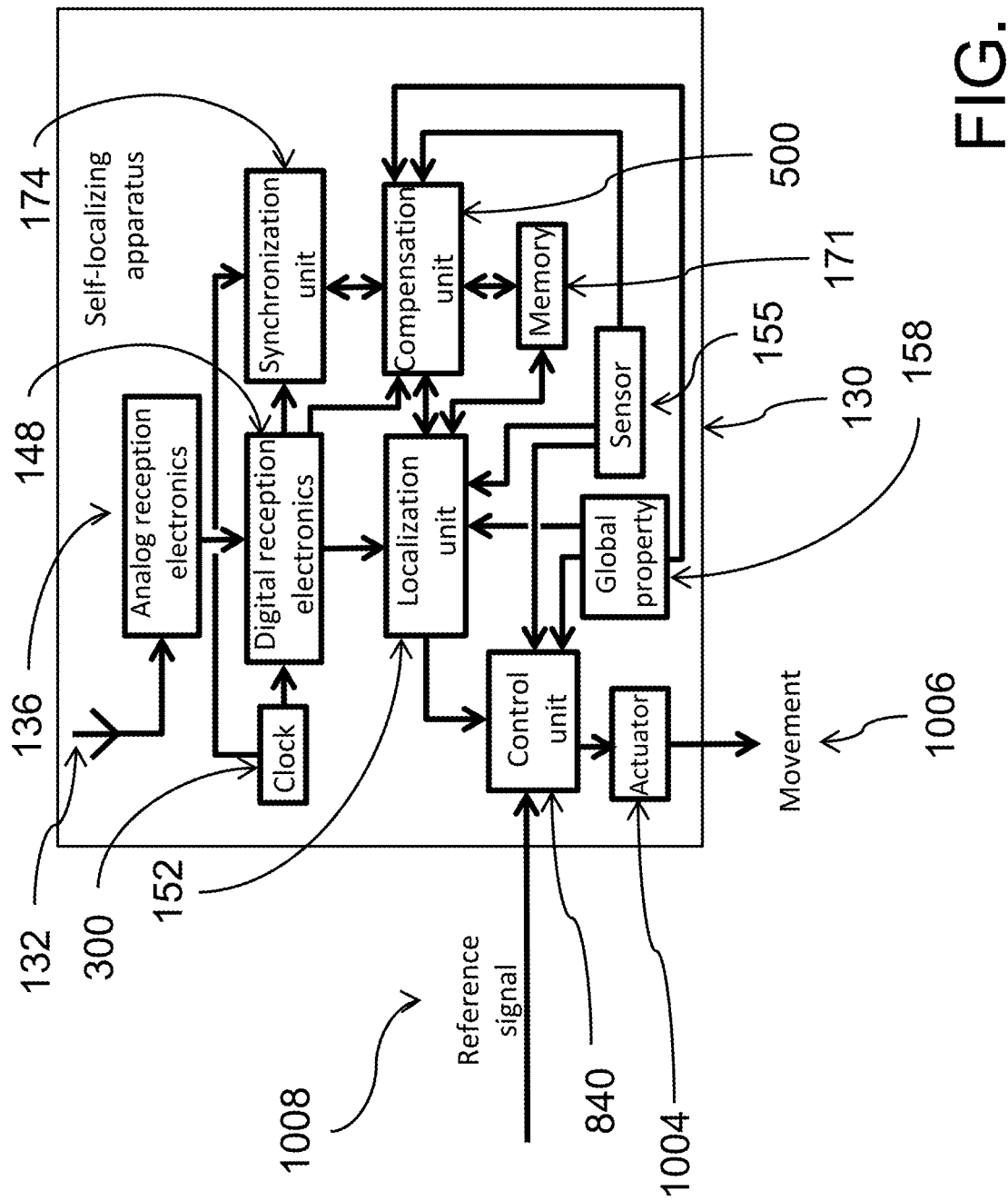
FIG. 10 is a block diagram of an illustrative self-localizing apparatus capable of actuation in accordance with some embodiments of the present disclosure.

FIG. 10 is a block diagram of an illustrative self-localizing apparatus 130 that is capable of actuation in accordance with some embodiments of the present disclosure. In some embodiments, apparatus 130 may be integrated with a mobile robot (e.g., mobile robot 1100 of FIG. 11. Various system components including the localization unit 152, compensation unit 500, scheduling unit 150, synchronization unit 174, reception electronics 136, 148, transmission electronics 116, 118, and control unit 840 can be used with apparatus 130 of FIG. 10. In addition, other system components, such as a data transceiver or a data access point may be used (see FIG. 15). Control unit 840 computes actuator commands (e.g., for a mobile robot, see FIG. 11). It may implement various controllers (see FIG. 12).

Figure 11:
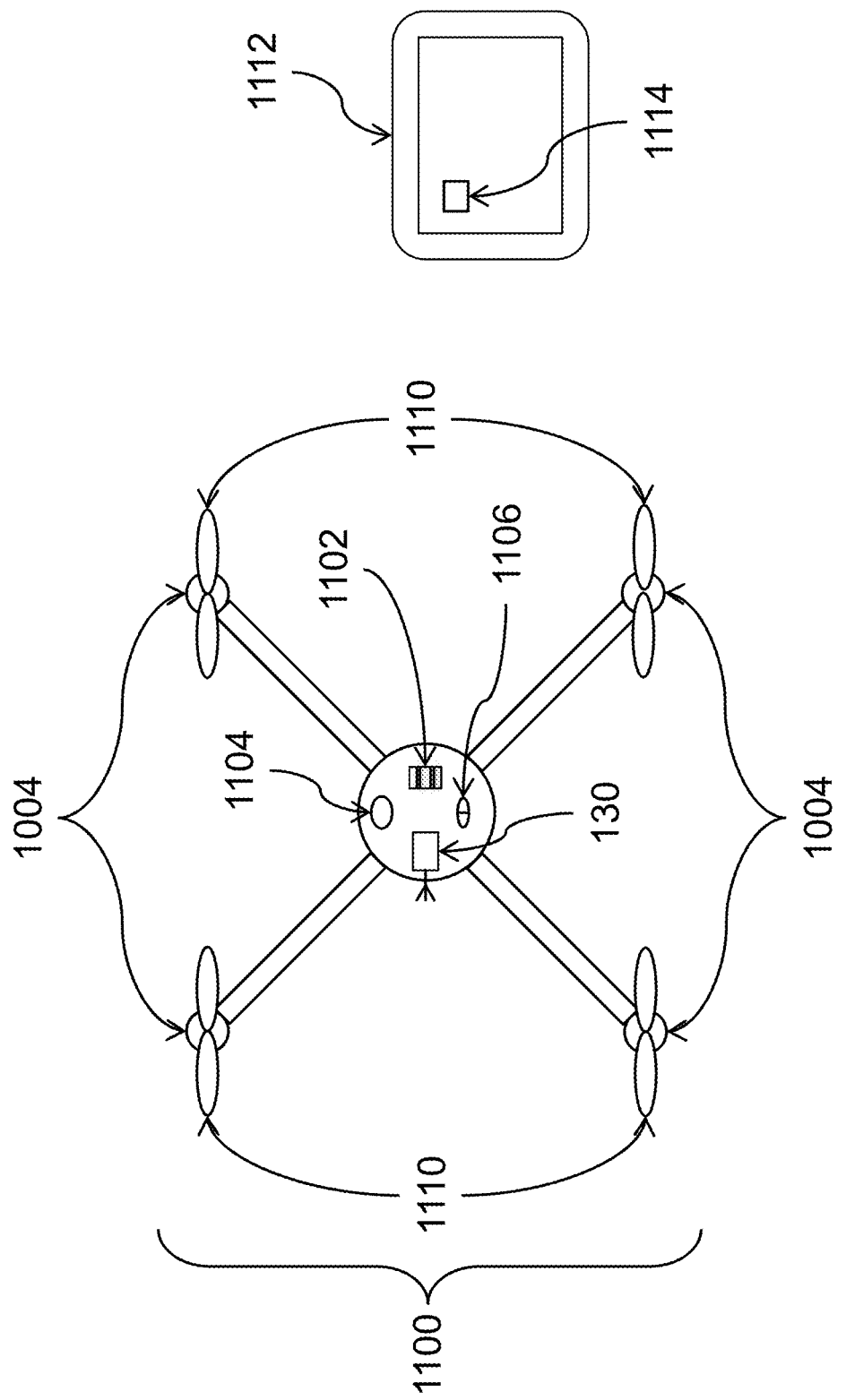
FIG. 11 shows an illustrative mobile robot comprising a self-localizing apparatus in accordance with some embodiments of the present disclosure.

FIG. 11 shows an illustrative mobile robot 1100 that includes a self-localizing apparatus 130 in accordance with some embodiments of the present disclosure. Mobile robot 1100 may also include one or more sensors (e.g., MEMS sensors and sensors 155). In some embodiments, mobile robot 1100 includes an accelerometer 1106 and a gyroscope 1104. In some embodiments, mobile robot 1100 additionally includes one or more of magnetometers, barometers, a GPS receiver, and proprioceptive sensors (e.g., sensors to monitor battery level and motor currents). Mobile robot 1100 as illustrated also includes actuators 1004 (e.g., four motors) that are used to rotate four propellers 1110 that allow the mobile robot to stay airborne and to control its movement through the space. In some embodiment, actuators 1004 are powered by a battery. In some embodiments, transceivers or apparatuses are powered by batteries.

Self-localizing apparatus 130 of FIG. 11 may be integrated with mobile robot's 1100 electronics. For example, apparatus 130 may have access to mobile robot's 1100 sensors (e.g., sensor 155, accelerometer 1106, and gyroscope 1104). This may, for example, be useful or convenient to achieve a certain weight distribution on a flying robot, to allow for better antenna reception, or to co-locate related electronic components.

Depending on the application, flight electronics may be more complex than the embodiments described here and may, e.g., comprise multiple electronic processing units, multiple antennas, or multiple self-localizing apparatuses.

Figure 12:
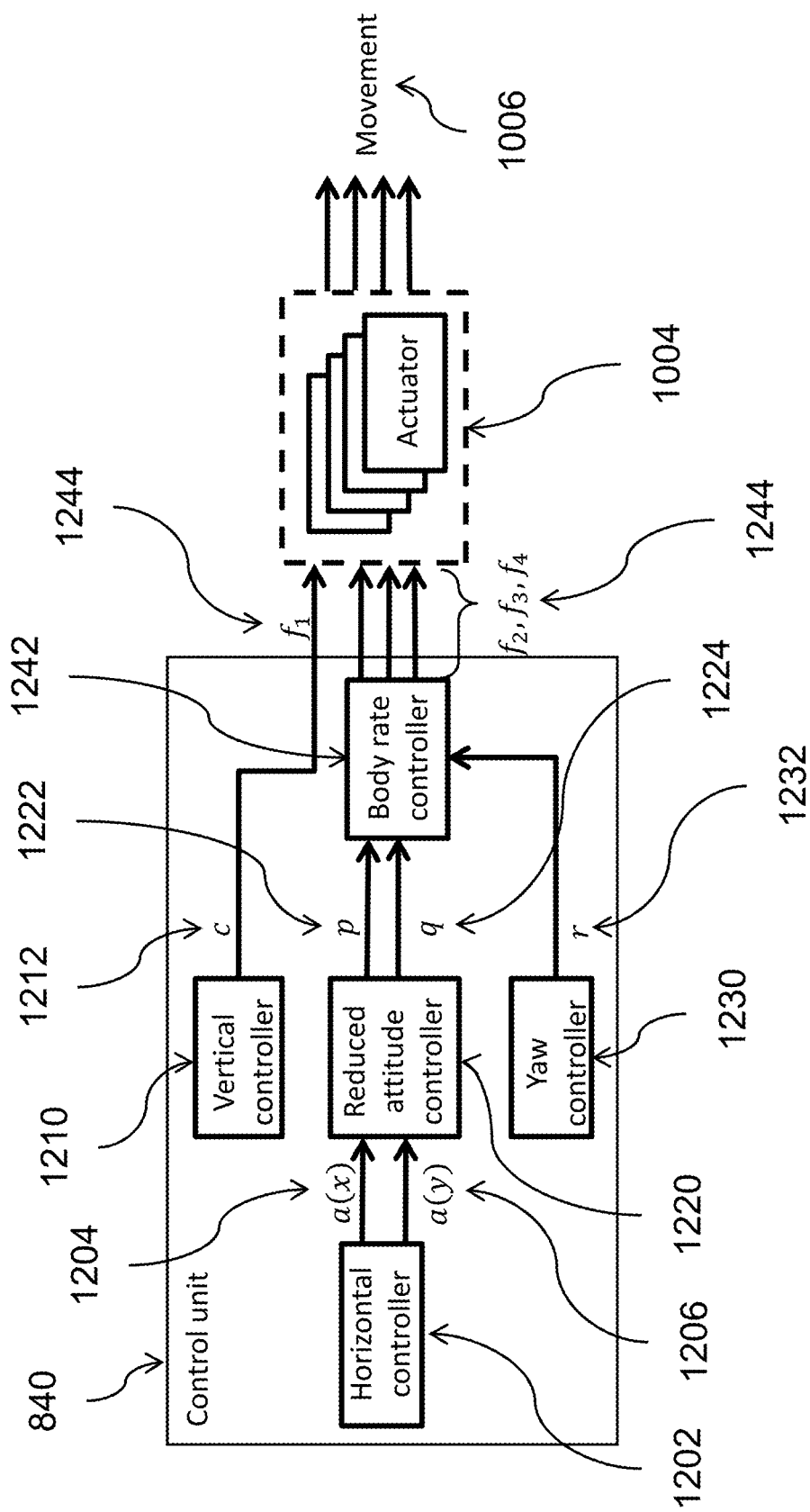
FIG. 12 is a block diagram of an illustrative control unit that may be used, for example, with the mobile robot of FIG. 11 in accordance with some embodiments of the present disclosure.

FIG. 12 is a block diagram of an illustrative control unit 840 that may be used, for example, with mobile robot 1100 of FIG. 11 in accordance with some embodiments of the present disclosure. Control unit 840 uses cascaded controllers (horizontal controller 1202, vertical controller 1210, reduced attitude controller 1220, yaw controller 1230, and body-rate controller 1242, with reference signal/feedback signal flow omitted for clarity).

The control scheme depicted in control unit 840 is used to follow desired vehicle position and yaw trajectories. The onboard control comprises four separate loops: horizontal 1202 and vertical position control 1210 loops, a reduced attitude control 1220 loop and a yaw control 1230 loop. It will be understood that the reference numerals used for controllers within control unit 840 of FIG. 12 are also used to refer to control loops associated with the controllers. The output of the four control loops are the three body rate commands to the flying mobile robot 1100 shown in FIG. 11, and the collective thrust produced by the mobile robot's four propellers 1110.

The control strategy shown in FIG. 12 is based on a cascaded loop shaping design strategy. The controller design is therefore split into the design of several controllers of lower-order dynamic systems. The vertical control loop 1210 is shaped such that it responds to altitude errors like a second-order system with collective thrust c. Similarly to the vertical control loop 1210, the two horizontal control loops 1202 are shaped to behave in the manner of a second-order system. However, no control inputs are directly calculated but the commanded accelerations a(x) and a(y) are given as set points to the attitude controller 1220. The attitude controller 1220 controls the reduced attitude of the mobile robot such that the commanded accelerations a(x) and a(y) are met. The commanded accelerations are then converted to commanded rotation matrix entries. Using the rotational kinematics of the mobile robot, the rate of change of the matrix entries can be used to compute the desired vehicle body rates p and q. The controllers described above fully define the translational behavior of the mobile robot. The yaw controller 1230 may then be implemented as a proportional controller from the measured yaw angle (e.g., as measured by a sensor 155 on the mobile robot 1100).

Figure 13A:
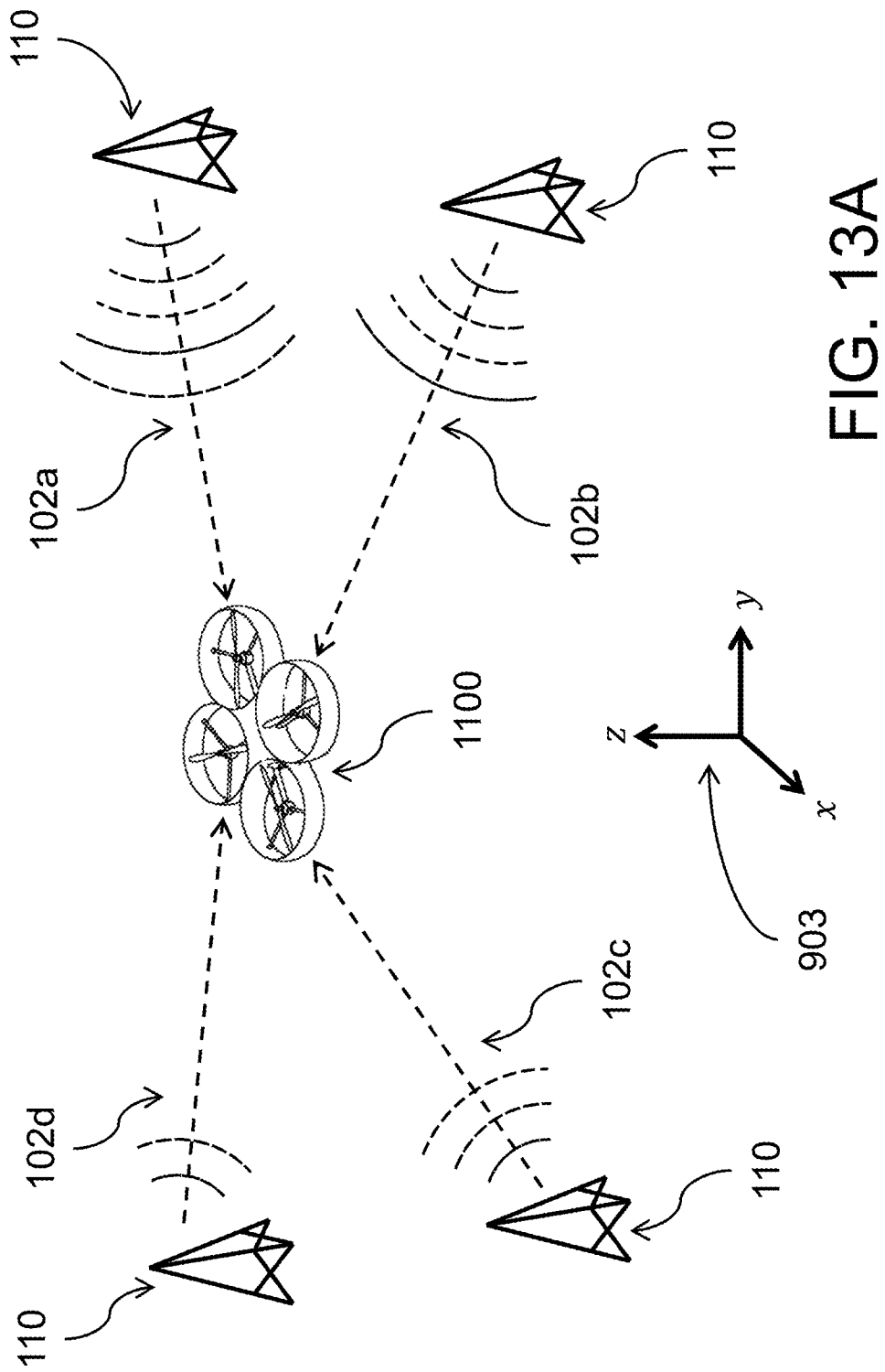
FIG. 13A shows an illustrative system use with an autonomous flying robot in accordance with some embodiments of the present disclosure.

FIG. 13A shows an illustrative system for use with an autonomous flying robot 1100 in accordance with some embodiments of the present disclosure. Autonomous flying robot 1100 receives UWB signals 102a-d transmitted by four UWB transceivers 110 placed in its vicinity. Flying robot 1100 is equipped with a self-localizing apparatus (not shown for clarity), rigidly attached to the robot's chassis.

Figure 13B:
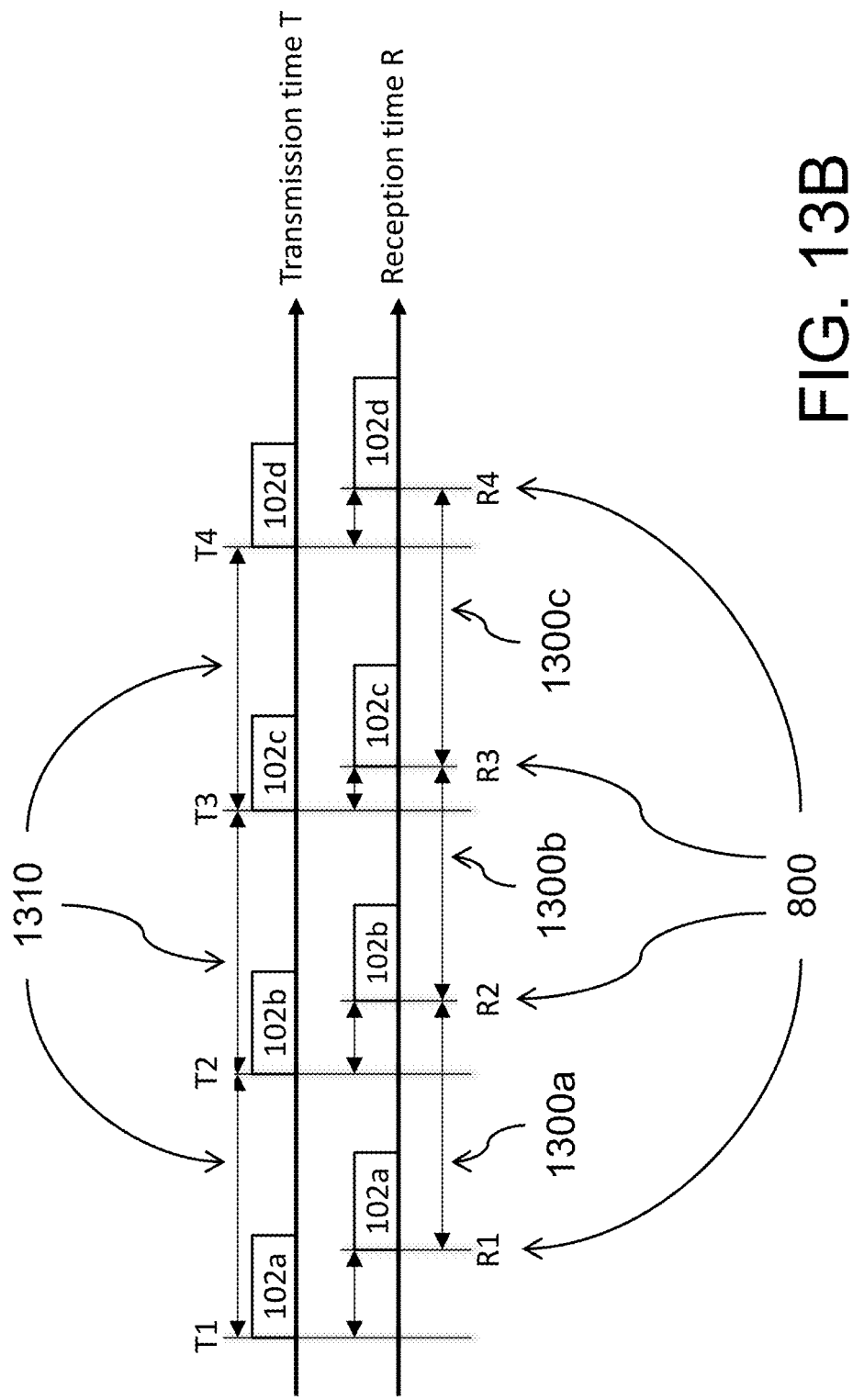
FIG. 13B shows a plot of illustrative transmission and reception times of UWB signals transmitted by four transceivers and received by a self-localizing apparatus or by a transceiver in accordance with some embodiments of the present disclosure.

FIG. 13B shows a plot of illustrative transmission and reception times of UWB packets of UWB signals 102 emitted by four transceivers 110 and received by a mobile robot. In some embodiments, the plot of FIG. 13B corresponds to transmission and receptions times of the UWB signals depicted in FIG. 13A. In some embodiments, the schedule according to which UWB signals 102 are transmitted is determined autonomously by transceivers 110. In some embodiments, the transmission schedule is predetermined. In some embodiments, the transmission schedule is updated during operation. In some embodiments, TDMA techniques are used to generate the transmission schedule, as further discussed below in reference to FIG. 14.

In the illustrative plot of FIG. 13B, at time T1 a first UWB packet 102a leaves the antenna of a first transceiver 110. Subsequent UWB packets 102b, 102c, and 102d of the other three transceivers 110 leave their respective transceivers' antennae at times T2, T3, and T4, respectively. In this scheme, the transceivers emit packets in a round-robin fashion and at regular intervals 1310:

$$T2-T1=T3-T2=T4-T3.$$

The four emitted UWB packets 102a, 102b, 102c, and 102d are received at the antenna of a self-localizing apparatus connected to mobile robot 1100 at reception times R1, R2, R3, and R4. Based on these measured reception times, the self-localizing apparatus computes the following time differences of arrival 1300a, 1300b, 1300c:

$$R2-R1;R3-R2;R4-R3.$$

In this scheme, the self-localizing apparatus can compute its location relative to the transceivers. This is achieved by accurately measuring the time differences of arrival 1300a, 1300b, 1300c, by converting these time differences to distances using an estimated speed of signals 102, and by using multilateration to compute the robot's location relative to the known locations of the transceivers.

Figure 14A:
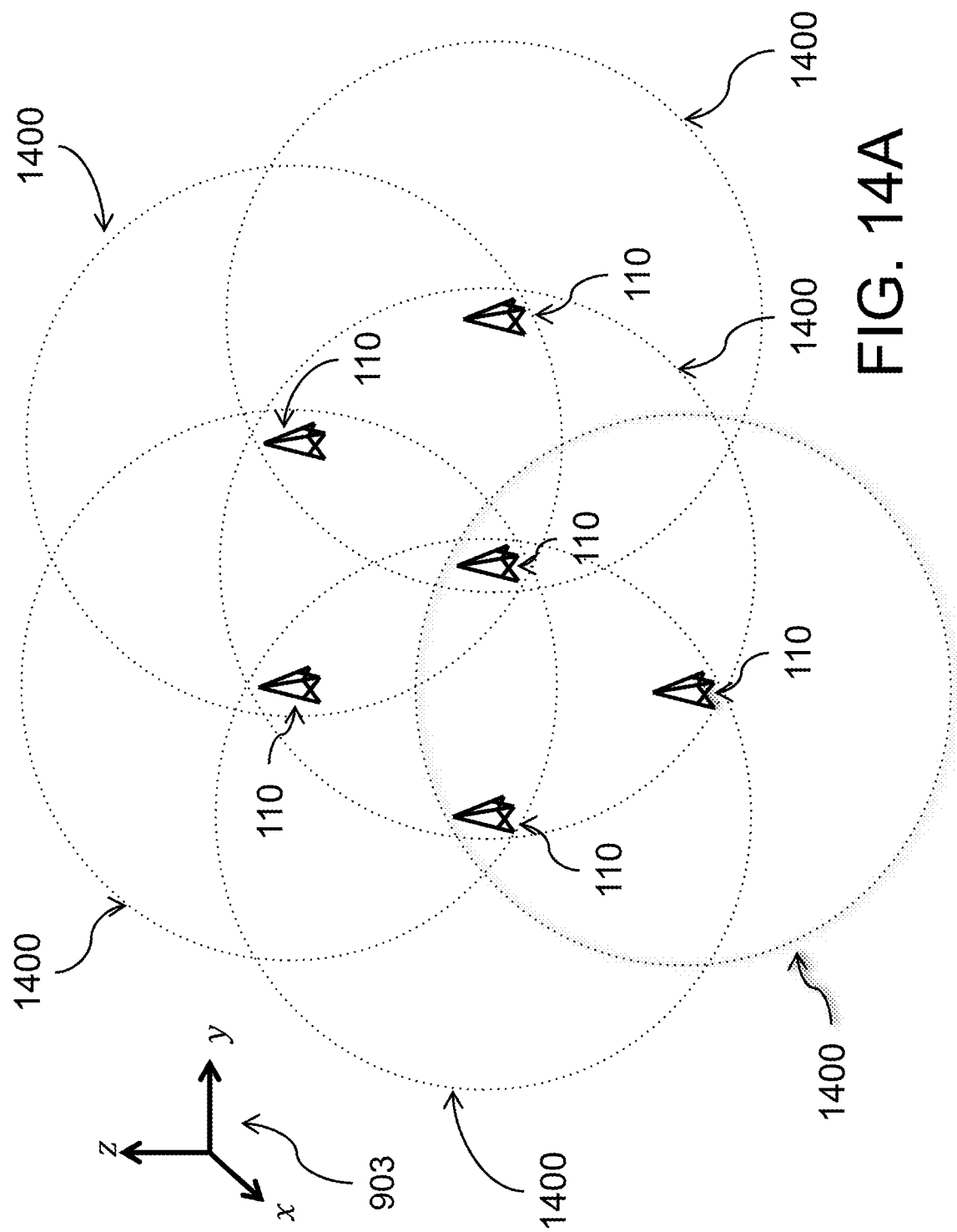
FIG. 14A shows an illustrative transceiver network with a large number of transceivers in accordance with some embodiments of the present disclosure.

FIG. 14A shows an illustrative transceiver network including multiple transceivers 110 in accordance with some embodiments of the present disclosure. Such a transceiver network may allow for the use of a self-localizing apparatus 130 in a wide geographic area by allowing for the simultaneous use of a large number of transceivers. As shown in FIG. 14A, in the case where transmission ranges 1400 of two transceivers overlap, the transceivers will be referred to as "interfering", because simultaneous transmission of UWB signals 102 by both transceivers may result in the UWB signals 102 interfering. In order to avoid signal interference, the signal emissions of transceivers in a particular area are typically coordinated. In some embodiments, this may be achieved by ensuring adequate separation of signals in time (e.g., through sufficient time between the emission of two signals, e.g., using a scheduling unit), in space (e.g., through sufficient geographic separation of transceivers) or in frequency (e.g., through sufficient separation of the UWB signals' transmission carrier frequencies).

The amount of time required for sufficient signal separation in time may depend on many factors (e.g., strength of the signal, size of a signal packet, pulse/peak shape of the signal, transceiver's antenna, receiver's antenna, the geographic location of transceivers (including their geographic separation), obstacles, background noise, etc.). Ensuring time separation of signals may mean that the duration between subsequent signals from any particular transceiver increases as the number of transceivers grows. This can be particularly problematic for dynamic autonomous mobile robots, where even relatively small reductions in update rates may result in a significant degradation in localization performance. A known method of ensuring time separation is Time Division Multiple Access (TDMA). Aloha methods may also be utilized in embodiments where occasional signal interference is acceptable, and where signal timing is unimportant.

Sufficient separation in space, related to the transmission range of each transceiver, may depend on many factors (e.g., strength of the signal, frequency of the signal, bandwidth of the signal, pulse/peak shape of the signal, transceiver's antenna, receiver's antenna, the geographic location of transceivers (including their geographic separation), obstacles, background noise, etc.). In some embodiments, typical spatial separation is 1-100 meters. In some embodiments, typical spatial separation is 10-500 meters. In some embodiments, typical spatial separation is 200-2000 m. In some embodiments, typical spatial separations are on the order of kilometers. In some embodiments, two transceivers may be co-located. In some embodiments, combinations of spatial separations are used. In FIG. 14A, transmission range 1400 is graphically represented as a circle for simplicity; however, it will be apparent to one skilled in the art that transmission range 1400 may be a more complex shape. When ensuring space separation of transmissions, it may be desirable to locate transceivers 110 such that a self-localizing apparatus 130 would be capable of receiving transmissions from a predetermined number of transceivers 110 at every point within a defined geographic area. This number of transceivers 110 may depend on many factors (e.g., desired update rate, desired system robustness, time separation of the transmissions, frequency separation of the transmissions, background noise, obstacles, etc.).

Achieving sufficient separation in space may be further aided by the selection of suitable antennas. Some embodiments use directional antennas. Some embodiments use omnidirectional antennas. In some embodiments, directional antennas are used to help ensure space separation of UWB signals. In some embodiments, by directing the transmissions of transceivers 110 using directional antennas, it may be possible to more accurately control which transceivers 110 transmit to which regions of a defined space and thus more accurately control the space separation of UWB signals 102. In some embodiments, by directing the transmissions of transceivers 110 using directional antennas, it may be possible to achieve a longer transmission range in a desired direction. Other methods that may aid spatial separation include shielding, placement (e.g., away from noise sources), optimizing radiation patterns, and combinations of the above. In some embodiments, by equipping a self-localizing apparatus 130 with a directional antenna, orientation information can be estimated based on a comparison of which signals are received with the known locations of transceivers 110.

In some embodiments, transceivers 110 are arranged such that coverage of a desired operating area is optimized with respect to some metric. In some embodiments, a transceiver's 110 operation is optimized with respect to some metric. Suitable metrics may include the number of transceivers in range, a signal strength, update rate from a specific combination of transceivers, multipath effects, or others, including combined metrics. Transceiver arrangement may comprise a transceiver's location, a transceiver's antenna orientation, a transceiver's operating frequency, a transceiver's bandwidth, or other factors. An operating area may be a geographic area, a flight volume for a flying robot 1100, a pre-defined operating volume, or another area. Optimization may concern physical parameters (e.g., geographic placement of transceivers, antenna orientations, etc.) or operational parameters (e.g., the operation of a scheduling unit 150).

Sufficient separation in transmission frequency may depend on many factors (e.g., strength of the signal, frequency of the signal, bandwidth of the signal, pulse/peak shape of the signal, transceiver's antenna, receiver's antenna, the geographic location of transceivers (including their geographic separation), obstacles, background noise, etc.). In some embodiments, separation is in the range of 1-50 MHz. In some embodiments, separation is in the range of 100-500 MHz. In some embodiments, separation is in the range of 200-1000 MHz. In some embodiments, overlapping transmission frequencies are used. When designing for frequency separation of signals, it may be important to consider that a self-localizing apparatus 130 may need to change its reception frequency in order to receive the frequency-separated UWB signals 102. A known method of ensuring frequency separation is Frequency Division Multiple Access (FDMA). In some embodiments, combinations of various frequency separations are used.

In some embodiments, TDMA may be employed to ensure time separation of UWB signals 102. In some embodiments, a simple approach may be employed, whereby if the transceiver network comprises N transceivers, N time slots will be allocated, one per transceiver 110. The time of cycling through all time slots is sometimes referred to as TDOA cycle time. In a case where all transceivers in a network are interfering, this allocation of N transceivers to N time slots is optimal. However, in a case as illustrated in FIG. 14B, where not all transceivers interfere, a more optimal TDMA allocation is possible, which uses fewer than N time slots and thus decreases the TDOA cycle time, and increases the average rate at which a self-localizing apparatus 130 would receive UWB signals 102.

Figure 14B:
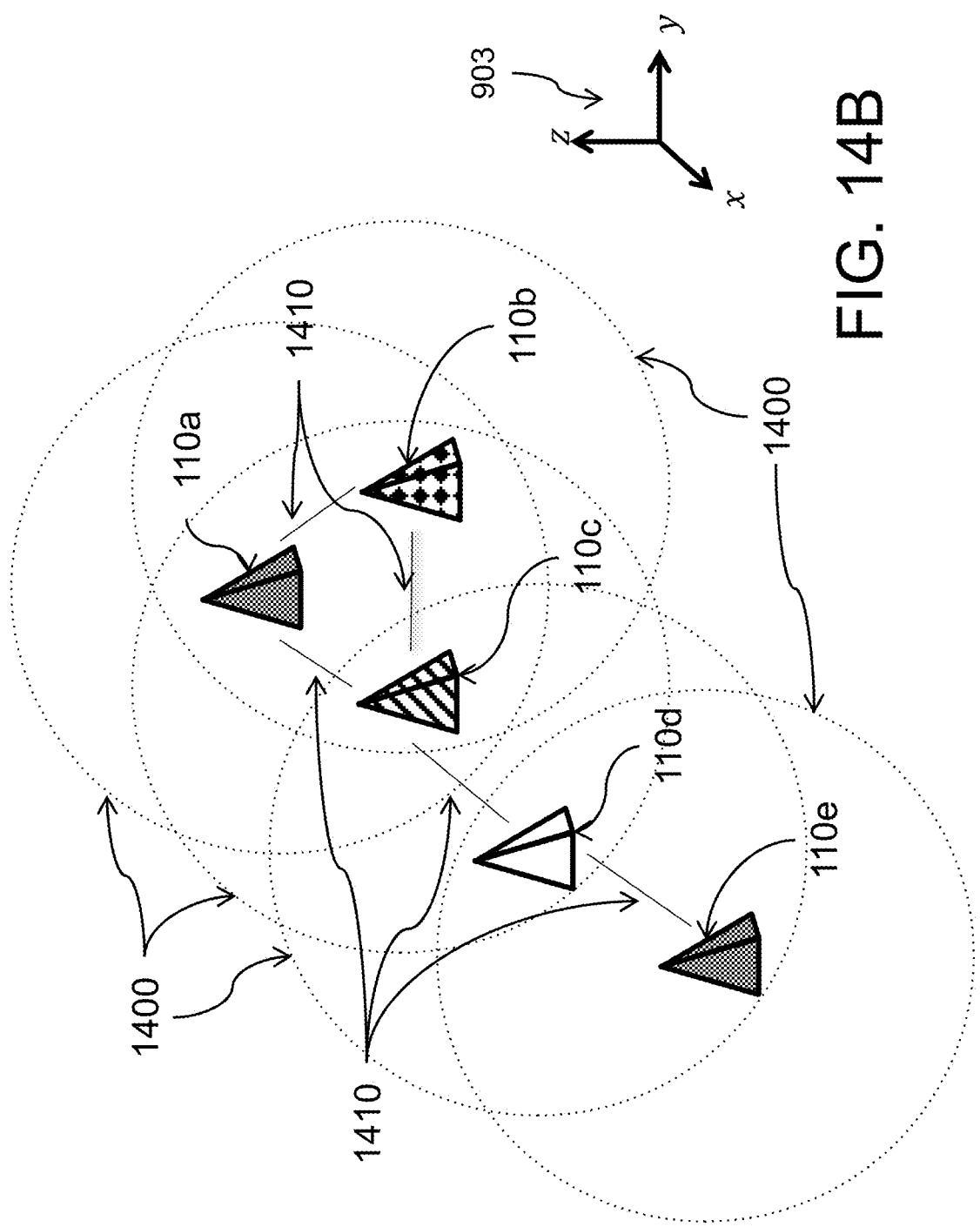
FIG. 14B shows an illustrative simplified transceiver network in accordance with some embodiments of the present disclosure.

FIG. 14B shows an illustrative simplified transceiver network in accordance with some embodiments of the present disclosure. In FIG. 14B, transceivers 110a and 110e do not interfere. It will be apparent to one skilled in the art that in this case, both transceivers 110a and 110e may utilize the same TDMA timeslot, since it is not possible for a self-localizing apparatus to simultaneously receive signals from both transceivers because of their separation in space, and thus simultaneous transmissions will not interfere. This is illustrated in FIG. 14B by transceivers 110a and 110e having the same shading.

In some embodiments, a scheduling unit 150 may coordinate the scheduling of TDMA timeslots. The synchronization of multiple transceivers 110 to achieve a consistent time schedule may in some embodiments be enabled by a synchronization unit 174 or may be enabled by transceivers 110 sharing a common clock 300. In some embodiments, timeslot allocation may be manually determined or programmed into the transceiver's memory (e.g., memory 170). In some embodiments, timeslot allocation may be performed autonomously by a scheduling unit 150.

To autonomously select timeslots, transceivers may first construct a graph of neighboring transceivers (as illustrated in FIG. 14B by connecting edges 1410). In some embodiments, this may be achieved by transceivers 110 sharing their connection information as the payload 716 of UWB signals 104. In some embodiments, this connection information may be preprogrammed. Once a graph of the network has been constructed, the problem of autonomous timeslot allocation may be simplified to a distributed graph-coloring problem—a problem for which there are numerous known, algorithmic solutions. An example solution to this graph coloring problem is illustrated in FIG. 14B, which depicts transceivers 110 with varying shadings, illustrating the timeslot during which they transmit.

In some embodiments, the process of graph-building and timeslot allocation may occur periodically or may be triggered by a transceiver 110 through transmission of an appropriate UWB signal 104. In some embodiments, this signal 104 is transmitted in response to an event. In some embodiments, an additional TDMA timeslot is allocated for transmission of arbitrary UWB signals 104. In some embodiments, usage of this TDMA timeslot is coordinated by ALOHA. In some embodiments, transceivers 110 use this TDMA timeslot to alert other transceivers 110 to the occurrence of an event. In some embodiments, this timeslot is used by a transceiver 110 to trigger reallocation of TDMA timeslots.

In some embodiments, periodic or triggered reallocation allows the network to adapt the allocation of TDMA timeslots in order to compensate for transceivers joining or leaving the transceiver network. Addition of a transceiver 110 to the network may, in some embodiments, be achieved by leaving one TDMA slot unallocated in order to allow new transceivers 110 to announce their addition to the network and trigger a reallocation of TDMA timeslots. Removal of a transceiver 110 from the network may, in some embodiments, be achieved by enabling transceivers to monitor for non-transmission of a transceiver 110 and trigger reallocation of TDMA timeslots if a transceiver 110 has not transmitted for a predetermined number of its TDMA timeslots.

In some embodiments, a TDMA time slot length less than 0.1 ms, 0.5 ms, 1 ms, 2 ms, 2.5 ms, 5 ms, 10 ms, or 50 ms is used.

In some embodiments, a transceiver 110 may include its estimated location or timing information within the payload 716 of its UWB signals 102 or 104. In some embodiments, a transceiver 110 is operable to receive these transmitted UWB signals 104. In some embodiments, the receiving transceiver 110 may include a synchronization unit 174 that acts to synchronize the time schedule of the receiving transceiver with the time schedule of the transmitting transceiver, based on received timing or location information. In some embodiments, the receiving transceiver 110 may include a scheduling unit 150 that adapts the local transmission schedule based on the received timing or location information. In some embodiments, this scheduling unit 150 updates a network graph based on the received timing or location information. In some embodiments, this scheduling unit 150 causes the receiving transceiver 110 to trigger TDOA reallocation based on the received timing or location information. In some embodiments, the receiving transceiver 110 may include a position calibration unit 180 that refines the location estimate of the receiving or transmitting transceiver 110 based on the received timing or location information. In some embodiments, where a coordinate system is estimated by transceivers 110, refining the location estimate of a single transceiver 110 causes the coordinate system to be refined.

In some embodiments, transceivers 110 may be allocated more than one TDMA timeslot, allowing them to transmit more often within one TDMA cycle. In some embodiments, allocation of multiple timeslots may, for example, be decided based on the Fisher Information added by the transceiver 110—a heuristic known to those skilled in the art, which can be calculated based on the transceiver's relative position.

In some embodiments, Frequency Division Multiple Access (FDMA) is used to mitigate transceiver interference, whereby interfering transceivers may be allocated different transmission frequencies such that they no longer interfere. In some embodiments, interfering transceivers may be allocated different preambles or pulse repetition frequencies to achieve a similar effect.

Figure 15A:
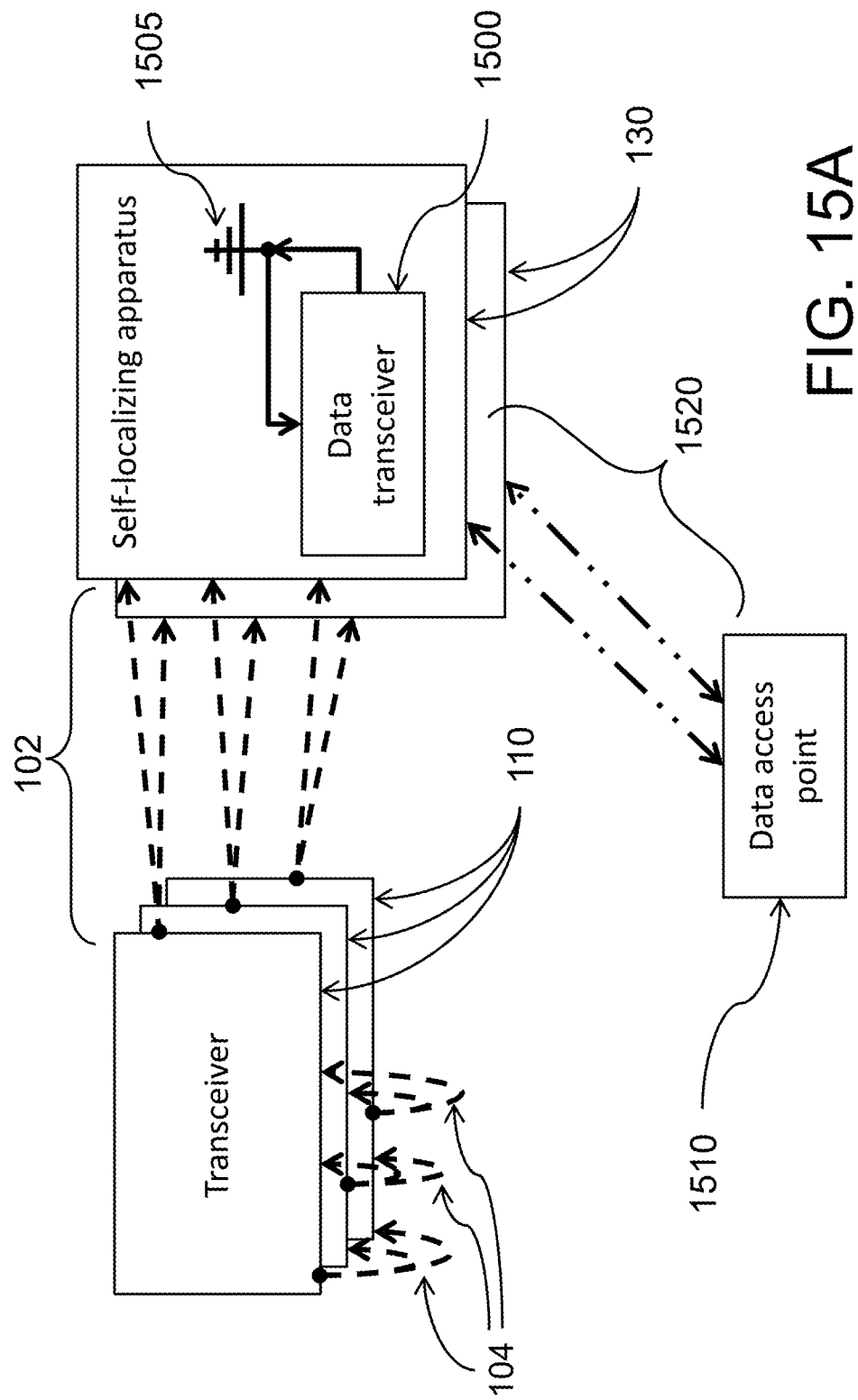
FIG. 15A is a block diagram of an illustrative localization system that uses a data access point in accordance with some embodiments of the present disclosure.

FIG. 15A is a block diagram of an illustrative localization system that uses a data access point 1510 in accordance with some embodiments of the present disclosure. The localization system also includes three transceivers 110 and two self-localizing apparatuses 130. In this illustrative system, each self-localizing apparatus 130 comprises a data transceiver 1500. Each self-localizing apparatus 130 receives UWB signals 102 from the transceivers 110. Transceivers 110 use UWB signals 104 to exchange data. Self-localizing apparatuses 130 exchange data with the data access point 1510 using a second, different type of signal 1520. This is accomplished using a data transceiver 1500 operationally coupled to the self-localizing apparatus. Signal 1520 may, for example, use a different technology (e.g., 802.11 Wi-Fi, Bluetooth, etc.). As another example, Signal 1520 may use a different set of UWB signals (e.g., different frequency, different preamble, different timing, etc.). Signals 1520 and UWB signals 102 may be designed to not interfere.

In FIG. 15A, each self-localizing apparatus comprises an antenna 1505 for communicating with data access point 1510. The antenna 1505 is operationally coupled to data transceiver 1500. Each transceiver 130 comprises an antenna 132 (omitted for clarity) for receiving signals from transceivers 110.

Using different signal types for the transceivers' signals 102 and for the self-localizing apparatus' signals 1520 as shown in FIG. 15A can have technical advantages. For example, the architecture shown in FIG. 15A decouples the localization system's performance from the number of self-localizing apparatuses 130. In principle, the system's transceivers 110 can therefore still support an infinite number of self-localizing apparatuses 130. The localization system's update rate and latency are still not affected by the number of self-localizing apparatuses 130 using the transceivers' signals 102. As another example, the architecture shown in FIG. 15A still makes the location information available on the self-localizing apparatus. This still allows the use of local sensor fusion (e.g., with data from an IMU) to improve the self-localizing apparatus' localization estimate without generating additional network load. At the same time, the signals 1520 may allow for one-way communication from the self-localizing apparatus to data access point 1510. This may, for example, allow a human or automated operator at the access point 1510 to monitor the self-localizing apparatuses (e.g., for a tracking application). As shown in FIG. 15A, signals 1520 may allow for two-way communication. This may, for example, allow implementation of a traffic management system, which sends monitoring data from self-localizing apparatuses 130 to data access point 1510, and which sends control data from data access point 1510 to self-localizing apparatuses 130.

More generally, this separation may allow separate optimization of the network properties of the transceivers 110 and the data access point 1510 (e.g., scalability, update rate, latency, bandwidth, transceiver placement, transceiver density, antenna design, antenna orientation, and many others) in order to meet the requirements of a specific use case. For example, localization data signals 102 may be provided in real-time, while tracking signals 1520 may be sent at a much lower rate.

Figure 15B:
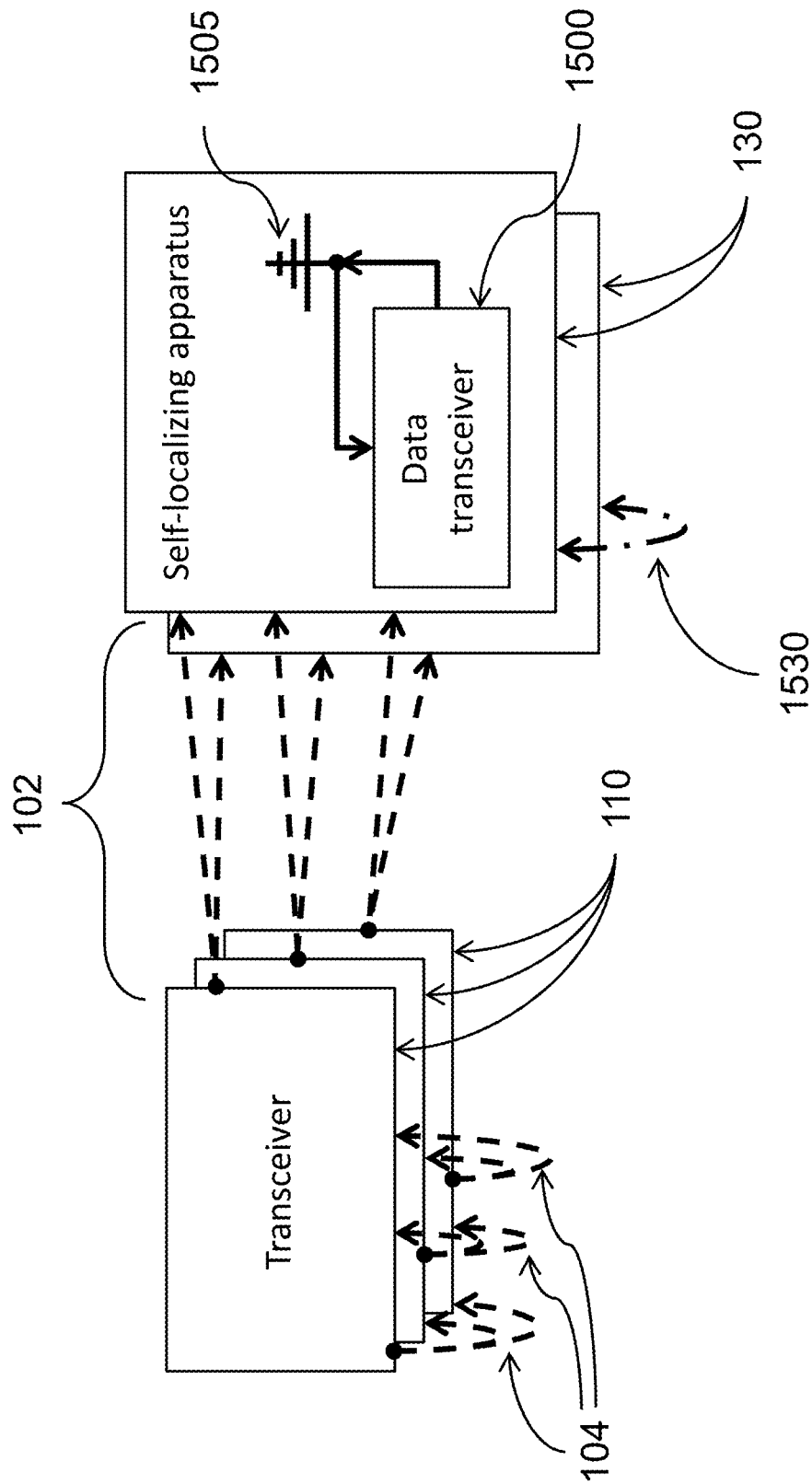
FIG. 15B is a block diagram of an illustrative localization system where the self-localizing apparatuses are equipped with data transceivers and where the self-localizing apparatuses are able to communicate with each other using the data transceivers in accordance with some embodiments of the present disclosure.

FIG. 15B is a block diagram of an illustrative localization system where self-localizing apparatuses 130 are equipped with data transceivers 1500 in accordance with some embodiments of the present disclosure. The localization system also includes three transceivers 110. In some embodiments, the localization system of FIG. 15B does not use a data access point 1510.

In the architecture shown in FIG. 15B, self-localizing apparatuses 130 can exchange signals 1530 directly. In some embodiments, signals 1530 are signals. This may, for example, allow the system to remain scalable. In some embodiments, signals 1530 may be the same as signals 1520. This may, for example, allow the same technical advantages listed in the previous section. As a further example, this architecture may also allow the implementation of an ad hoc network. Various network topologies (e.g., mesh, bus, star, etc.) may be used. Various communications protocols, including dynamic protocols (e.g., DHCP), may be used. Such local networks may reduce network load or maintain scalability, e.g., by restricting communication to a sub-set of data transceivers 1500.

The architecture shown in FIG. 15B may also be implemented by having one of the self-localizing apparatuses 130 act as a data access point 1510. This role may be statically assigned to a specific data transceiver 1500. This role may also be dynamically assigned to a data transceiver 1500, e.g., depending on its location, its connectivity, etc.

The architecture shown in FIGS. 15A and 15B may, for example, be used to implement behaviors controlled, implemented, or mediated by a self-localizing apparatus 130, by a data transceiver 1500, or by a data access point 1510. For example, a self-localizing apparatus 130 may control light as a function of its distance to another apparatus 130. As another example, a self-localizing apparatus 130 may implement a motion behavior of a mobile robot that depends on another self-localizing apparatus (e.g., swarming, flocking, herding, schooling, camera tracking, etc.). As another example, two self-localizing apparatuses 130 may exchange data for cooperation (e.g., to synchronize their motions, to carry a payload, to coordinate camera coverage of an area, or to provide feedback on each other's motion). As yet another example, a self-localizing apparatus may mediate or implement obstacle avoidance behavior in a mobile robot. As yet another example, two flying robots may each be equipped with a self-localizing apparatus comprising a data transceiver. In this example, each data transceiver may send data related to the robot's location to a central server comprising a data access point 1510. The central server may then provide air traffic control services (e.g., services related to collision prevention, services related to organizing traffic, services related to reserving flight paths). The central server may send data related to its services to a specific robot, or may broadcast data, or may make data available via a publisher-subscriber model. As another example, a self-localizing apparatus 130 equipped with a data transceiver 1500 may fuse data from UWB localization signals 102, local sensors 155, and global property sensors 156, 158 using a localization unit 152; record data related to its location using a memory 171; monitor the data for a trigger event using a control unit 840; and, upon detecting a trigger event, use a data transceiver 1500 to send a message to a data access point 1510. This may, for example, allow a doctor in a hospital to receive an alert message when a patient wearing a self-localizing apparatus falls to the ground, and to determine the fallen patient's location.

In some embodiments, the architectures in FIGS. 15A and 15B may be used with a cloud infrastructure. In some embodiments, a first and a second flying robot are each equipped with a self-localizing apparatus. Each self-localizing apparatus receives UWB signals 102 from a multitude of transceivers 110 positioned around the robots' operating environment. Each self-localizing apparatus receives images from an onboard camera. Each self-localizing apparatus uses a data transceiver to transmit data related to the camera data (e.g., key frames extracted from the camera feed) to a data access point. The data access point transmits the data to a cloud robotics infrastructure, which uses centralized computational infrastructure (e.g., a data center) to process the data (e.g., to perform cloud-based collaborative mapping). The data access point transmits the processed data (e.g., containing the robot's location in a map) back to each of the robots, which each use their localization unit to improve their location estimate by fusing the processed data with localization data from the UWB signals 102. This architecture allows self-localizing apparatuses to perform tasks that require heavy computation (e.g., planning, probabilistic inference, mapping, loop closure (e.g., as part of algorithms for Simultaneous Localization And Mapping (SLAM)), etc.). This architecture also allows self-localizing apparatuses to perform tasks that require cooperation (e.g., collaborative mapping, collaborative task planning, generating and maintaining consistent world state estimates, etc.).

In some embodiments, data access point 1510 comprises a global property sensor (not shown). This may, for example, allow the data access point 1510 to provide data to a self-localizing apparatus 130, which may be useful to compute an improved location estimate.

In some embodiments, data access point 1510 comprises a memory (not shown) or a processing unit (not shown). This may, for example, allow data access point 1510 to provide services. In some embodiments, data access point 1510 implements push services. In some embodiments, data access point 1510 implements pull services.

In some embodiments, data access point 1510 provides a communication link between two self-localizing apparatuses 130. This may allow two self-localizing apparatuses 130 to exchange sensor data (e.g., data from a global property sensor, data from a vision sensor). In some embodiments, exchanging data may help self-localizing apparatuses 130 to compute an improved estimate of their location using a localization unit.

According to a first aspect of the present disclosure, there is provided a localization system, comprising three UWB transceivers, each operable to emit an UWB signal at a scheduled transmission time with reference to the transceiver's clock, a self-localizing apparatus, operable to receive and time stamp the UWB signals with reference to the apparatus' clock, and a localization unit, operable to compute a relative location of the self-localizing apparatus to the three UWB transceivers based on the timestamps of the received UWB signals.

In some embodiments, the self-localizing apparatus may determine its location from signals broadcast by at least one, two, or three transceivers. This may be achieved based on the self-localizing apparatus' knowledge of (1) the locations of each of the at least one, two, or three transceivers, (2) the precise transmission time of at least one signal of each of the one, two, or three transceivers, (3) the accurate time intervals between the transmission times of the at least one, two, or three transceivers, and (4) the accurate time intervals between the transmission times of at least two subsequent signals of each of the at least one, two, or three transceivers. In some embodiments, the known locations (1), the precisely known transmission times (2), the accurately known time intervals between different transceivers' signals (3), or the accurately known time intervals between a single transceiver's signals (4) are pre-defined (e.g., they may be stored in the self-localizing apparatus' memory) or transmitted with the signal (e.g., as a payload).

In some embodiments, transceivers are wired and can communicate through a wired connection. In some embodiments, transceivers communicate through a wireless connection. In some embodiments, the same signals that allow the self-localizing apparatus' localization are used for communication between transceivers. In some embodiments, transceivers communicate using UWB signals. In some embodiments, transceivers' communication is embedded in the UWB signals (sometimes called "payload"). In some embodiments, transceivers communicate to synchronize their clocks.

In some embodiments, communication channels implement an error checking function (e.g., CRC generation and checking). In some embodiments, at least one Inter-Integrated Circuit bus (I2C) or Serial Peripheral Interface Bus (SPI) system is used.

Signals from transceivers may be received through cables (i.e., a wired setup) or through a wireless connection. When using a wired connection, transceivers may send communication signals to, and receive communication signals from, transceivers using digital transmission and digital reception electronics. The exchanged signals may be used primarily to synchronize transceivers' clocks. This is important because the rate at which clocks count time is not constant between clocks, and varies with time ("clock drift"), resulting in time differences between transceivers even if all transceivers' clocks were initially set accurately. Furthermore, different clocks may have a clock offset. Moreover, different clocks' rates may evolve differently over time. Such differences may influence the timestamping of signals and therefore result in reduced localization performance. Such differences can be avoided by using a wired setup with transceivers served by a single clock. In some embodiments, the wiring setup uses an identical length for each cable connecting a transceiver to the clock to ensure identical signal travel times from the clock to each transceiver.

In some embodiments, a transceiver is structured and arranged to receive a wireless signal. In some embodiments, a transceiver is structured and arranged to receive a timestampable signal. In some embodiments, a transceiver is structured and arranged to receive an UWB signal.

In some embodiments, the reception of a wireless signal may improve transceiver performance. For example, a first transceiver may use a wireless signal received from a second transceiver to adjust its internal clock. This may, e.g., be achieved by the synchronization unit storing in a memory the times at which the wireless signals were received from other transceivers in the network, and subsequently adjusting the local clock based on these times. In some embodiments, improved clock synchronization results in less variation between the rate at which different transceivers transmit signals. In some embodiments, measurement of the variation between transmission rates may be a metric used to assess the performance of a localization network.

In some embodiments, the localization system further comprises a scheduling unit, operationally coupled to the three transceivers.

In some embodiments, the localization system comprises an onboard actuator, operable to influence a motion of the apparatus, and a control unit, operable to produce a control signal for the apparatus' onboard actuator in dependence of the relative location. In some embodiments, the control unit is further operable to compute the control signal in less than 0.1, 0.2, 0.5, 1, or 5 seconds from receiving data representative of the relative location and the onboard actuator is further structured and arranged to influence the apparatus' motion in less than 0.1, 0.2, 0.5, 1, or 5 seconds from receiving the control signal such that the apparatus can be controlled in real-time.

In some embodiments, the localization system is structured and arranged to move the apparatus in response to a disturbance to the relative location, wherein the movement reduces the disturbance in less than 5, 1, or 0.2 seconds. In some embodiments, the disturbance is an instantaneous event.

In some embodiments, the disturbance changes the apparatus' or robot's actual position by at least 1 m or by 10 cm. In some embodiments, the disturbance changes the apparatus' or robot's actual orientation by at least 45 deg or by 10 deg.

In some embodiments, the system for apparatus localization is operable to react to a disturbance to the position of the three transceivers by causing the apparatus to move to reduce the disturbance in less than 0.1, 0.2, 0.5, 1, or 5 seconds. In some embodiments, the disturbance changes the three transceivers' actual position by 1 m, 50 cm, 30 cm or 10 cm. In some embodiments, the disturbance is a simultaneous, sudden, linear shift in the position of all of the three transceivers.

In some embodiments, the localization system comprises a compensation unit, and a memory unit, and the localization unit is further operable to compute the relative location in dependence of a compensation computed by the compensation unit, and data provided by the memory unit. In some embodiments, the relative location is computed using a time difference of arrival (TDOA) technique. In some embodiments, the memory unit is operable to store a position and an identifier for each of the three UWB transceivers. In some embodiments, the memory unit is operable to store a time difference of arrival.

In some embodiments, the self-localizing apparatus 130 further comprises a sensor, which is structured and arranged to detect an absence of motion, and the self-localizing apparatus' localization unit is further operable to compute the relative location in dependence of the absence of motion.

In some embodiments, each of the three UWB transceivers further comprises a sensor, structured and arranged to detect a disturbance to the UWB transceiver's position or orientation. In some embodiments, the disturbance is one of a change in orientation or position. In some embodiments, the disturbance is a vibration. In some embodiments, the sensor is an accelerometer. In some embodiments, the sensor is operationally coupled to the transceiver's digital transmission electronics and the transceiver's digital transmission electronics are operable to transmit data representative of the disturbance to the self-localizing apparatus.

In some embodiments, the self-localizing apparatus further comprises a compensation unit. In some embodiments, the compensation unit is operationally coupled to the apparatus' digital reception electronics or to a memory unit, and operable to compute one of (i) a compensation for a time difference of arrival between a first UWB signal traveling from a first transceiver to the apparatus and a second UWB signal traveling from a second, different transceiver to the apparatus, and (ii) a compensation for the time stamp of a first UWB signal traveling from the first transceiver to the apparatus.

In some embodiments, the system for apparatus localization is operable to maintain the apparatus' position relative to the three transceivers in spite of a disturbance to the orientation of the apparatus' antenna in any of the antenna's axes. In some embodiments, the disturbance changes the orientation of the apparatus' antenna by more than 10 degrees, 30 degrees, or 60 degrees. In some embodiments, the disturbance changes the orientation of the apparatus' antenna in any of its three axes.

In some embodiments, the system for apparatus localization is further operable to compute the compensation in dependence of a model of the apparatus' movement. In some embodiments, the system for apparatus localization is further operable to compute the compensation in dependence of a model of the apparatus' motion.

In some embodiments, the system for apparatus localization is further operable to compute the compensation to within 0.6, 3, or 15 nanoseconds. In some embodiments, the compensation unit is further operable to compute the compensation such that the statistical mean error of the actual time difference of arrival or the actual time of arrival and the computed compensation is smaller than 0.6, 3, or 15 nanoseconds.

In some embodiments, a centralized clock is used to synchronize wired transceivers. In some embodiments, the clock synchronization UWB signals are UWB signals.

In some embodiments, the transceiver's antenna is structured and arranged to (i) send the UWB signal and (ii) receive the UWB clock synchronization signal. In some embodiments, separate antennae are used for the UWB signal and the UWB clock synchronization signal. In some embodiments, each of the at least three UWB transceivers' antennae is structured and arranged to transmit and to receive an UWB clock synchronization signal.

In some embodiments, the sensor comprises at least one of a camera, accelerometer, magnetometer, and gyroscope. In some embodiments, the sensor belongs to the group of accelerometers, gyroscopes, magnetometers, cameras, optical flow sensors, barometers, encoders, and infra-red sensors. In some embodiments, the sensor belongs to the larger group of accelerometers, gyroscopes, magnetometers, cameras, optical flow sensors, laser or sonar range finders, radar, barometers, thermometers, hygrometers, bumpers, chemical sensors, electromagnetic sensors, air flow sensors and relative airspeed sensors, ultra sound sensors, microphones, radio sensors, and other height, distance, and range sensors, and infra-red sensors, time-of-flight sensors, and encoders. In some embodiments, the orientation sensor is one of a magnetometer or accelerometer. In some embodiments, the apparatus comprises a sensor structured and arranged to detect data representative of the operation of at least one of the actuators used for the movement of the apparatus.

According to another aspect of the present disclosure, a mobile robot is provided that is operable to move in dependence of an UWB signal, an onboard sensor signal, and a comparison of a global property at a first and second location.

In some embodiments, the mobile robot's reference signal is representative of a desired position or orientation of the mobile robot (or the mobile robot's antenna), and the movement reduces a disturbance to the mobile robot's (or its antenna's) actual position or orientation relative to the mobile robot's (or its antenna's) desired position or orientation caused by at least one of a change in the mobile robot's (or antenna's) orientation, position, or movement.

According to another aspect of the present disclosure, an onboard signal may be produced based on a self-localizing apparatus' position relative to at least four UWB transceivers with known relative locations. In some embodiments, the transceivers' clocks may be synchronized and each of the four transceivers may transmit an UWB signal at a scheduled transmission time. The self-localizing apparatus may receive and timestamp the signals using its clock and retrieve each signals' transmission time stamp in the synchronized transceiver clocks' time (e.g., by retrieving them from a memory or by decoding them from UWB signal(s)). The position of the self-localizing apparatus relative to the transceivers may then be computed based on the known relative locations, the four transmission time stamps, and the four reception time stamps and compared to a reference position or a threshold. The self-localizing apparatus may then produce a control signal for an onboard actuator, a signal for an onboard speaker, a signal for an onboard display, or a wireless signal based on the comparison.

In some embodiments, a self-localizing apparatus is wearable. In some embodiments, a self-localizing apparatus is operable to provide user feedback (e.g., provide audio via a speaker, provide images or video via a display).

According to another aspect of the present disclosure, an onboard signal may be produced based on a self-localizing apparatus' position relative to at least three UWB transceivers with known relative locations. The self-localizing apparatus may transmit at least one UWB signal and store at least one transmission time stamp of the at least one UWB signal in the self-localizing apparatus clock's time in a memory. The three UWB transceivers may then each receive and reception time one of the at least one UWB signal and each transmit an UWB signal. These transmitted signals may then be received and time stamped by the self-localizing apparatus in its clock's time. First, second, and third transmission delays between the reception and transmission of the first, second, and third transceiver may then be retrieved from a memory or decoding from an UWB signal and the position of the self-localizing apparatus relative to the transceivers may then be computed based on the known locations, the reception time stamps, the delays, and at least one transmission time stamp and compared to a reference position or a threshold. The self-localizing apparatus may then produce a control signal for an onboard actuator, a signal for an onboard speaker, a signal for an onboard display, or a wireless signal based on the comparison.

According to another aspect of the present disclosure, the effects of a movement of an UWB transceiver that is part of an UWB transceiver network with known relative positions and each comprising a sensor may be mitigated by detecting movement using the sensor, wirelessly transmitting information indicating the movement, and performing one or more of computing a compensation, adjusting a computation of a position, or triggering an alert.

According to another aspect to the present disclosure, there is provided a system for apparatus localization comprising three UWB transmitters and a self-localizing apparatus, wherein one of the UWB transmitters and the apparatus each comprise a global property sensor and wherein the self-localizing apparatus further comprises central processing electronics operable to compute a location of the apparatus relative to the three UWB transceivers based on the received UWB signals and sensor data from the two global property sensors. In some embodiments, the global property sensed may be one of an atmospheric pressure, a magnetic field, a landmark, GPS signals, and gravity. In some embodiments, the computation may be further based on a comparison of the sensor data, or use a global property model for the sensor data, or use data representative of an orientation or a motion of the apparatus. In some embodiments, the central processing electronics is further operable to compute control signals for an actuator based on the comparison, the use of the global property model, or the use of the data representative of an orientation or a motion of the apparatus.

According to another aspect to the present disclosure, there is provided a mobile robot, comprising an actuator operable to affect a movement of the mobile robot based on at least one time stamped UWB signal and a reference signal. In some embodiments, the actuator is further operable to affect the movement based on a comparison of an onboard sensor signal with an offboard sensor signal received from an offboard sensor at a remote location and produced based on the global property at the remote location. In some embodiments, the mobile robot is operable to use a global property model to compare the onboard sensor signal with the offboard sensor signal. In some embodiments, the actuator is further operable to affect the movement based on a signal indicative of at least one of a position, an orientation, and a movement of an UWB transmitter producing the UWB signal. In some embodiments, the mobile robot comprises a localization unit and a control unit operable to produce a control signal for the actuator.

In some embodiments, an additional UWB transceiver may be added to an UWB transceiver network. The UWB network may comprise at least a first, second, and third UWB transceiver with known relative positions to each other. In some embodiments, each of the first, second, and third UWB transceiver and the additional wireless UWB transceiver may comprise a clock.

In some embodiments, the additional UWB transceiver may be activated within wireless reception range of the first, second, and third UWB transceivers. The additional UWB transceiver may have a partially or wholly unknown relative position to the first, second, and third UWB transceivers.

In some embodiments, each of the three UWB transceivers may be configured to wirelessly transmit UWB signals. Each of the three UWB transceivers may be configured to generate a timestamp whenever an UWB signal is transmitted by that UWB transceiver. The additional UWB transceiver may be configured to receive UWB signals transmitted by any of the other UWB transceivers. In some embodiments, the additional UWB may be configured to timestamp a reception time of any UWB signal received from any of the other UWB transceivers. For example, in some embodiments, when an UWB signal is transmitted by the first UWB transceiver, the first UWB transceiver may create a transmission timestamp, while the additional UWB transceiver may create a reception timestamp when it receives the UWB signal.

In some embodiments, first UWB transceivers may transmit a first UWB signal, and create a first transmission timestamp based on the clock of the first UWB transceiver. The second UWB transceivers may transmit a second UWB signal, and create a second transmission timestamp based on the clock of the second UWB transceiver. The third UWB transceivers may transmit a third UWB signal, and create a third transmission timestamp based on the clock of the third UWB transceiver.

In some embodiments, the additional UWB transceiver may receive the first UWB signal, and generate a first reception timestamp based on the clock of the additional UWB transceiver. The additional UWB transceiver may also receive the second UWB signal, and generate a second reception timestamp based on the clock of the additional UWB transceiver. The additional UWB transceiver may also receive the third UWB signal, and generate a third reception timestamp based on the clock of the additional UWB transceiver.

In some embodiments, a position calibration unit may compute the position of the additional UWB transceiver relative to the first, second, and third UWB transceivers based on the reception of the first, second, and third received UWB signals and the known relative locations of the first, second, and third UWB transceivers. In some embodiments, a position calibration unit may compute the position of the additional UWB transceiver relative to the first, second, and third UWB transceivers based on the first, second, and third reception timestamps and the known relative locations of the first, second, and third UWB transceivers.

In some embodiments, the UWB network may comprise a fourth UWB transceiver. The fourth UWB transceiver may have a known location relative to the first, second, and third UWB transceivers and comprise a clock.

In some embodiments, the additional UWB transceiver may be within reception range of the fourth UWB transceiver. The fourth UWB transceivers may transmit a fourth UWB signal, and create a fourth transmission timestamp based on the clock of the fourth UWB transceiver. The additional UWB transceiver may also receive the fourth UWB signal, and generate a fourth reception timestamp based on the clock of the additional UWB transceiver. In some embodiments, the fourth reception timestamp may also be used to compute the position of the additional UWB transceiver relative to the first, second, third, and fourth UWB transceivers.

In some embodiments, the clocks of the first, second, and third UWB transceivers may be synchronized. In some embodiments, first, second, and third transmission timestamps may be known in the synchronized clocks' time. In some embodiments, first, second, and third transmission timestamps may be retrieved from memory of the additional UWB transceiver. In some embodiments, first, second, and third transmission timestamps may be decoded from an UWB signal. In some embodiments, first, second, and third transmission timestamps may also be used to compute the position of the additional UWB transceiver relative to the first, second, and third UWB transceivers.

In some embodiments, the additional UWB transceiver may wirelessly transmit at least one additional UWB signal prior to the wireless transmission of the first, second, and third UWB signals. The additional UWB transceiver may generate and store an additional transmission timestamp based on the clock of the additional UWB transceiver in a memory.

In some embodiments, the first UWB transceiver may receive the additional UWB signal and generate a first additional reception timestamp based on the clock of the first UWB transceiver. The second UWB transceiver may receive the additional UWB signal and generate a second additional reception timestamp based on the clock of the second UWB transceiver. The third UWB transceiver may receive the additional UWB signal and generate a third additional reception timestamp based on the clock of the third UWB transceiver.

In some embodiments, a first transmission delay between a reception of an UWB signal at the first UWB transceiver and a corresponding transmission of an UWB signal from the first UWB transceiver is known. In some embodiments, a second transmission delay between a reception of an UWB signal at the second UWB transceiver and a corresponding transmission of an UWB signal from second UWB transceiver is known. In some embodiments, a third transmission delay between a reception of an UWB signal at the third UWB transceiver and a corresponding transmission of an UWB signal from the third UWB transceiver is known.

In some embodiments, the first, second, and third transmission delays may be retrieved from a memory on the additional UWB transceiver. In some embodiments, the first, second, and third transmission delays may be decoded from one or more UWB signals received by the additional UWB transceiver. In some embodiments, the first, second, and third transmission delays and the stored additional transmission timestamp may be used to compute the position of the additional UWB transceiver relative to the first, second, and third UWB transceivers.

In some embodiments, a scheduling unit may be used to adjust a transmission schedule of UWB signals to include scheduled transmissions of UWB signals from the additional UWB transceiver. In some embodiments, scheduling may compromise allocating time division multiple access (TDMA) slots. In some embodiments, at least one TDMA time slot may be allocated for transmission of UWB signals from the additional UWB transceiver.

In some embodiments, a plurality of UWB signals may be wirelessly transmitted from the first, second, and third UWB transceivers and the additional UWB transceiver such that each of the plurality of UWB signals comprises embedded relative position information of the transmitting UWB transceiver.

In some embodiments, a self-localizing apparatus may receive the plurality of UWB signals and compute a relative position of the self-localizing apparatus based on the received plurality of UWB signals.

In some embodiments, the computing of the position of the additional UWB transceiver relative to the first, second, and third UWB transceivers by the position calibration unit may be based on the transmission timestamps of the first, second, and third UWB signals.

In some embodiments, the transmission timestamps of the first, second, and third UWB signals may be either retrieved from a memory or received as payload of, and decoded from, at least one UWB signal.

In some embodiments, determining when to wirelessly transmit the at least one additional UWB signal may be based on (1) one or more predetermined rules or (2) data received by the additional UWB transceiver. In some embodiments, the determining of a scheduled transmission time slot for the additional UWB transceiver may be performed using a scheduling unit or performed based on at least one of (i) the scheduling of the first, second, and third transmission times, (ii) a desired time separation between UWB signals of the first, second, or third transceiver and UWB signals of the additional transceiver, or (iii) a scheduling protocol.

In some embodiments, the method may further comprise determining a scheduled transmission time slot for the additional UWB transceiver, and wirelessly transmitting, using the additional UWB transceiver, an additional UWB signal may be based on the scheduled transmission time slot.

In some embodiments, the computing of the position of the additional UWB transceiver may further be based on the transmission timestamp of the fourth UWB signal.

In some embodiments, a method is used for calibrating UWB transceivers in an UWB transceiver network. The UWB network may comprise at least a first, second, and third UWB transceiver. Initially, the relative positions of the three transceivers may be fully or partially unknown in relations to each other. One goal of the calibration may be to compute relative positions of the first, second, and third UWB transceivers.

In some embodiments, each of the three UWB transceivers may be configured to wirelessly transmit UWB signals. Each of the three UWB transceivers may also be configured to receive UWB signals transmitted by any of the other UWB transceivers. In some embodiments, each of the three UWB transceivers may be configured to timestamp a transmission time of any UWB signal it transmits, and to timestamp a reception time of any UWB signal received from any of the other UWB transceivers. For example, in some embodiments, an UWB signal transmitted by the first UWB transceiver may be received by both the second and third UWB transceivers. Each of the second and third UWB transceivers may then generate a reception timestamp indicating a time when the UWB signal from the first UWB transceiver was received.

In some embodiments, the relative positions of the three UWB transceivers may be determined based on reception timestamps generated by the at least two of the three UWB transceivers.

In some embodiments, at least three reception timestamps may be used to determine the relative positions of the three UWB transceivers. For example, the first UWB transceiver may transmit a first UWB signal which may be received by the second and third UWB transceiver, where each of the second and third UWB transceivers generate a respective reception timestamp at the time of reception of the first UWB signal. The second UWB transceiver may also transmit a second UWB signal which may be received at least by the third UWB transceiver, where the third UWB transceiver generates a reception timestamp at the time of reception of the second UWB signal.

In some embodiments, the first UWB transceiver may transmit a first UWB signal which may be received and timestamped by the second UWB transceiver. The second UWB transceiver may transmit a second UWB signal which may be received and timestamped by the third UWB transceiver. The third UWB transceiver may transmit a third UWB signal which may be received and timestamped by the first UWB transceiver.

Thus, in some embodiments, at least two of the first, second, and third UWB transceivers are used to transmit at least two UWB signals. One or more of the at least two UWB signals are then received by at least two of the first, second, and third UWB transceivers resulting in at least three receptions of the at least two UWB signals. Each of the at least three receptions may be timestamped by at least two of the first, second, and third UWB transceivers resulting in generation of at least three reception timestamps.

In some embodiments, the at least three reception timestamps may then be received at a position calibration unit. The position calibration unit may then compute relative positions of the first, second, and third UWB transceivers based on the at least three reception timestamps. In some embodiments, the position calibration unit may solve a system of hyperbolic equations or a linearized version of a system of hyperbolic equations to compute relative positions of the first, second, and third UWB transceivers.

In some embodiments, the position calibration unit may also receive at least two transmission timestamps of the at least two UWB signals. In some embodiments, the at least two transmission timestamps may either have been received from memory or received as payload and decoded from the at least two or from other UWB signals. In some embodiments, the position calibration unit may then compute relative positions of the first, second, and third UWB transceivers based on the at least three reception timestamps and at least two transmission timestamps.

In some embodiments, the first UWB transceiver comprises a first clock, the second UWB transceiver comprises a second clock, and the third UWB transceiver comprises a third clock. In some embodiments, a synchronization unit may be used to synchronize the first, second, and third clocks, reducing timing offsets or differences in rates.

In some embodiments, some of the first, second, and third UWB transceivers may comprise a sensor. In some embodiments, each of the sensors may be configured to measure at least one common global property such as gravitational force, an electromagnet force, a fluid pressure, a gas pressure, a global positioning signal, or a radio time signal. For example, a first UWB transceiver may comprise a first gravitational force sensor, and a second UWB transceiver may comprise a second gravitational force sensor.

In some embodiments, the first UWB transceivers may receive first data from a first sensor, and the second UWB transceivers may receive second data from a second sensor, and the third UWB transceiver may receive third data from a third sensor. In some embodiments, UWB signals generated by the first UWB transceivers may comprise payload data representative of the first data, UWB signals generated by the second UWB transceivers may comprise payload data representative of the second data, and UWB signals generated by the third UWB transceivers may comprise payload data representative of the third data. In some embodiments, computing relative positions of the may further be based on at least two of first data, second data, and third data.

In some embodiments, the UWB transceiver network may comprise a fourth UWB transceiver. In some embodiments, the relative positions of the fourth UWB transceiver may be fully or partially unknown in relations to the positions of the first, second, and third UWB transceivers. In some embodiments, the fourth UWB transceiver may similarly wirelessly transmit UWB signals, and receive and timestamps UWB signals transmitted by other UWB transceivers.

In some embodiments, at least six reception timestamps may be used to determine the relative positions of the four UWB transceivers. Thus, in some embodiments, at least three of the first, second, third, and fourth UWB transceivers are used to transmit at least three UWB signals. Two or more of the at the least three UWB signals are then received by at least three of the first, second, third, and fourth UWB transceivers resulting in at least six receptions of the at least three UWB signals. Each of the at least six receptions may be timestamped by at least three of the first, second, third, and fourth UWB transceivers resulting in generation of at least six reception timestamps.

In some embodiments, the at least six reception timestamps may then be received at a position calibration unit. The position calibration unit may then compute relative positions of the he first, second, third, and fourth UWB transceivers based on the at least six reception timestamps.

In some embodiments, data representative of the relative positions of the first, second, third, and fourth UWB transceivers may be sent to self-localizing apparatus within a range of at least one of the first, second, third, and fourth UWB transceivers.

In some embodiments, at least one of the first, second, and third UWB transceivers may comprise a sensor configured to detect movement of that UWB transceiver. In some embodiments, the at least one of the first, second, and third UWB transceivers may wirelessly transmit information indicating its movement in response to detection of the movement.

In some embodiments, a scheduling unit may schedule transmissions of UWB signals from the first, second, and third UWB transceivers. In some embodiments, scheduling may compromise scheduling time division multiple access slot allocation.

In some embodiments, the UWB transceiver network may comprise an additional UWB transceiver. The transmission of the additional UWB transceiver may be configured not to interfere with transmissions of a particular one of the first, second, and third UWB transceiver. In some embodiments, a scheduling unit may allocate one TDMA time slot to both the additional UWB transceiver and to the particular one of the first, second, and third UWB transceivers.

In some embodiments, a position calibration unit may be used to refined relative positions of the first, second, and third UWB transceivers based on at least two subsequently transmitted UWB signals.

In some embodiments, initial relative positions of UWB transceivers in the position calibration unit may be initialized based on partial knowledge. The initializing may comprise initializing a position estimate. In some embodiments, a position calibration unit may continuously maintain an estimate of relative positions of UWB transceivers. The maintaining may comprise computing updated position estimates.

While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. For example, specific aspects of the present disclosure that apply to timestampable signals may apply equally well to UWB signals, or vice versa. As a further example, specific aspects of the present disclosure that apply to signals 102 may apply equally well to signals 104, or vice versa. As a further example, specific aspects of the present disclosure that apply to signals 104 may apply equally well to signals 1530, or vice versa. As a further example, specific aspects of the present disclosure that apply to a localization unit 152 may apply equally well to a position calibration unit 180, or vice versa.

It will also be understood that the transceivers, apparatus, and components of the present disclosure may comprises hardware components or a combination of hardware and software components. The hardware components may comprise any suitable tangible components that are structured or arranged to operate as described herein. Some of the hardware components (e.g., the scheduling unit, synchronization unit, scheduling unit, localization unit, compensation unit, control unit, etc.) may comprise processing circuitry (e.g., a processor or a group of processors) to perform the operations described herein. The software components may comprise code recorded on tangible computer-readable medium. The processing circuitry may be configure by the software components to perform the described operations.

It is therefore desired that the present embodiments be considered in all respects as illustrative and not restrictive.

FIGURE NUMERALS

100 Localization system
102 Timestampable signal
104 Timestampable signal between transceivers
110 Transceiver
110a Transceiver 0
110b Transceiver 1
110c Transceiver 2
112 Transceiver's antenna
116 Transceiver's analog transmission electronics
118 Transceiver's digital transmission electronics
130 Self-localizing apparatus
132 Self-localizing apparatus' antenna
136 Self-localizing apparatus' analog reception electronics
148 Self-localizing apparatus' digital reception electronics
150 Scheduling unit
152 Localization unit
154 Transceiver's sensor
155 Self-localizing apparatus' sensor
156 Transceiver's global property
158 Self-localizing apparatus' global property
160 Transceiver's analog reception electronics
164 Transceiver's digital reception electronics
170 Transceiver's memory
171 Self-localizing apparatus' memory
174 Synchronization unit
180 Position calibration unit
202 Mobile transmitter
204 Stationary receiver
206 Centralized localization system
208 Signal sent from mobile transmitter
252 Mobile transceiver
254 Stationary transceiver
258 Two-way signals sent between stationary and mobile transceivers 300 Clock
304 Synchronization signal
500 Compensation unit
600 Progression of time as measured in the clock of self-localizing apparatus A
602 Arrival time of first message at self-localizing apparatus A's antenna
604 Difference between time-stamp of first message by self-localizing apparatus A's digital reception electronics and arrival time of first message at self-localizing apparatus A's antenna
606 Time-stamp of first message by self-localizing apparatus A's digital reception electronics
612 Arrival time of second message at self-localizing apparatus A's antenna
614 Difference between time-stamp of second message by self-localizing apparatus A's digital reception electronics and arrival time of second message at self-localizing apparatus A's antenna
616 Time-stamp of second message by self-localizing apparatus A's digital reception electronics
700 Channel Impulse Response (CIR)
702 UWB signal noise floor level
710 UWB signal preamble
712 UWB signal start frame delimiter (SFD)
714 UWB signal packet header
716 UWB signal payload
720 Progression of time during UWB signal transmission
722 Time at which UWB signal transmission begins
724 Time at which UWB signal transmission ends
800 Reception timestamp
802 Clock correction
804 Effect compensation
806 Corrected time of arrival
810 Remote global property
812 Compare
814 Global property model
820 Extended Kalman filter process update
822 Prior
824 Extended Kalman filter measurement update
826 Posterior
830 Location
840 Control unit
900 Relative angle between self-localizing apparatus and transceiver
900a Relative angle between self-localizing apparatus and transceiver 0
900b Relative angle between self-localizing apparatus and transceiver 1
902 Reception delay of UWB signal caused by relative angle between self-localizing apparatus and transceiver
902a Reception delay of UWB signal caused by relative angle between self-localizing apparatus and transceiver 0
902b Reception delay of UWB signal caused by relative angle between self-localizing apparatus and transceiver 1
903 Coordinate system
904 Distance between self-localizing apparatus and transceiver
904a Distance between self-localizing apparatus and transceiver 0
904b Distance between self-localizing apparatus and transceiver 1
906 Reception delay of UWB signal caused by distance between self-localizing apparatus and transceiver
906a Reception delay of UWB signal caused by distance between self-localizing apparatus and transceiver 0
906b Reception delay of UWB signal caused by distance between self-localizing apparatus and transceiver 1
908 Equivalent obstruction width between self-localizing apparatus and transceiver
908c Equivalent obstruction width between self-localizing apparatus and transceiver 2
910 Reception delay of UWB signal caused by equivalent obstruction width between self-localizing apparatus and transceiver
910a Reception delay of UWB signal caused by equivalent obstruction width between self-localizing apparatus and transceiver 0
910b Reception delay of UWB signal caused by equivalent obstruction width between self-localizing apparatus and transceiver 1
910c Reception delay of UWB signal caused by equivalent obstruction width between self-localizing apparatus and transceiver 2
1004 On-board actuator
1006 Movement
1008 Reference signal
1100 Mobile robot
1102 Central processing electronics
1104 Gyroscope
1106 Accelerometer
1110 Propeller
1112 Off-board controller
1114 Off-board sensor
1202 Horizontal controller
1204 Command specifying vehicle acceleration in the x-direction
1206 Command specifying vehicle acceleration in the y-direction
1210 Vertical controller
1212 Command specifying vehicle acceleration in the z-direction
1220 Reduced attitude controller
1222 Command specifying vehicle pitch rate
1224 Command specifying vehicle roll rate
1230 Yaw controller
1232 Command specifying vehicle yaw rate
1242 Body rate controller
1244 Actuator commands
1300a Time Difference of Arrival (TDOA) between reception of packet 120a at time R1 and reception of packet 120b at time R2
1300b Time Difference of Arrival (TDOA) between reception of packet 120b at time R2 and reception of packet 120c at time R3
1300c Time Difference of Arrival (TDOA) between reception of packet 120c at time R3 and reception of packet 120d at time R4
1310 Regular time intervals between transmitting packets sent in round-robin fashion (T2−T1=T3−T2=T4−T3)
1400 Radial coverage of transceiver signal
1410 Wireless communication between two in-range transceivers
1420 Overlapping spatial coverage by multiple transceivers within one cell
1440 Overlapping spatial coverage by multiple transceiver cells
1500 Data transceiver
1505 Data transceiver antenna
1510 Data access point
1520 Two-way signaling between data transceiver and data access point
1530 Two-way signaling between two data transceivers

What is claimed:

1. A mobile robot, comprising:
   an antenna;
   analog reception electronics operationally coupled to the antenna;
   a clock;
   digital reception electronics operationally coupled to the analog reception electronics and to the clock, wherein the digital reception electronics are operable to timestamp a signal received by the antenna with reference to the clock, wherein the signal is spread over a bandwidth that exceeds the lesser of 125 MHz and 5% of an arithmetic center frequency of the signal; and
   an actuator operable to affect a movement of the mobile robot based on:
      at least one timestamped signal; and
      a reference signal.

2. The mobile robot of claim 1, further comprising:
   an onboard sensor operable to produce an onboard sensor signal based on a global property at an onboard location,
   wherein the actuator is further operable to affect the movement based on a comparison of the onboard sensor signal with an offboard sensor signal received from an offboard sensor at a remote location and produced based on the global property at the remote location.

3. The mobile robot of claim 2, wherein the mobile robot is operable to use a global property model to compare the onboard sensor signal with the offboard sensor signal, wherein the global property model relates the onboard sensor signal and the offboard sensor signal to location, orientation, or motion of the mobile robot.

4. The mobile robot of claim 1, further comprising:
   a sensor operable to produce a sensor signal representative of an orientation of the antenna, wherein the actuator is further operable to affect the movement based on the sensor signal.

5. The mobile robot of claim 1, wherein the reference signal is representative of a desired position or orientation of the mobile robot, and wherein the movement reduces a disturbance to the mobile robot's actual position or orientation relative to the mobile robot's desired position or orientation caused by at least one of:
   a change in the antenna's orientation;
   a change in the antenna's position; and
   a change in the antenna's movement in less than 1 second.

6. The mobile robot of claim 1, further comprising:
   a compensation unit operable to compute a compensation for effects on the signal.

7. The mobile robot of claim 6, further comprising:
   a sensor operable to provide data representative of an orientation of the mobile robot, wherein the compensation unit is operable to compute a compensation for an effect of the orientation of the mobile robot on the signal.

8. The mobile robot of claim 6, wherein:
   the received signal comprises payload data representative of an orientation of a transceiver that transmitted the signal; and
   the compensation unit is operable to compute a compensation for an effect of the orientation of the transceiver on the signal.

9. The mobile robot of claim 6, wherein:
   the mobile robot is operable to determine a relative orientation of the antenna of the mobile robot and an antenna of a transceiver that transmitted the signal; and
   the compensation unit is operable to compute a compensation for an effect of the relative orientation on the signal.

10. The mobile robot of claim 6, wherein the compensation unit is operable to compute a compensation for an effect of a reception angle of the signal.

11. The mobile robot of claim 6, wherein:
    the analog reception electronics comprise an amplifier operable to amplify the signal prior to timestamping; and
    the compensation unit is operable to compute a compensation for an effect of the amplifier on the signal.

12. The mobile robot of claim 1, wherein the mobile robot is operable to receive two signals within a time window of 10 seconds, wherein the time difference between the timestamps of the two signals is within 3 nanoseconds of the time difference between their reception times at the antenna with reference to the clock.

13. The mobile robot of claim 1, further comprising:
    at least one of a gyroscope, an accelerometer, an odometer, or an encoder,
    wherein the actuator is further operable to affect the movement based on the at least one of the gyroscope, the accelerometer, the odometer, or the encoder to reduce a disturbance to the mobile robot's location in less than 1 second.

14. The mobile robot of claim 1, wherein the actuator is further operable to affect the movement based on a signal indicative of at least one of a position, an orientation, and a movement of a transmitter producing the signal.

15. The mobile robot of claim 14, further comprising:
    a localization unit operationally coupled to the digital reception electronics and operable to compute a location of the mobile robot based on a multiple of timestamped signals; and
    a control unit operable to produce a control signal based on the location,
    wherein the actuator is responsive to the control signal.

16. The mobile robot of claim 1, wherein:
    the digital reception electronics of the mobile robot are operable to timestamp at least three signals received by the antenna with reference to the clock, wherein each of the at least three signals is spread over a bandwidth that exceeds the lesser of 125 MHz and 5% of an arithmetic center frequency of the signal;
    the mobile robot is a first mobile robot in a system of at least two mobile robots; and
    a second mobile robot of the system of at least two mobile robots is configured to timestamp the same at least three signals and affect a movement of the second mobile robot based on the at least three timestamped signals.

17. A method of operating a mobile robot, comprising:
    receiving, using an antenna, a signal, wherein the signal is spread over a bandwidth that exceeds the lesser of 125 MHz and 5% of an arithmetic center frequency of the signal;
    timestamping, using digital reception electronics, the received signal in reference to a clock coupled to the digital reception electronics after the signal passes through analog reception electronics operationally coupled to the antenna; and
    affecting, using an actuator, movement of the mobile robot based on:
       at least one timestamped signal; and
       a reference signal.

18. The method of claim 17, wherein the reference signal is representative of a desired position or orientation of the mobile robot, and wherein the movement reduces a disturbance to the mobile robot's actual position or orientation relative to the mobile robot's desired position or orientation caused by at least one of:
- a change in the antenna's orientation;
- a change in the antenna's position; and
- a change in the antenna's movement in less than 1 second.

19. The method of claim 17, further comprising:
- computing, using a compensation unit, a compensation for effects on the signal, wherein the effects on the signal comprise one or more of: an orientation of the mobile robot, an orientation of a transceiver that transmitted the signal, a relative orientation of the antenna of the mobile robot and an antenna of a transceiver that transmitted the signal, a reception angle of the signal, and an analog reception electronics amplifier setting.

20. The method of claim 17, further comprising:
- computing, using a localization unit operationally coupled to the digital reception electronics, a location of the mobile robot based on a multiple of timestamped signals; and
- producing, using a control unit, a control signal based on the location, wherein the actuator is responsive to the control signal.

* * * * *